US007510116B2

(12) United States Patent
Robb et al.

(10) Patent No.: US 7,510,116 B2

(45) Date of Patent: Mar. 31, 2009

(54) LOTTERY AND GAMING SYSTEMS WITH DYNAMIC LOTTERY TICKETS

(75) Inventors: Arthur S. Robb, Hackensack, NJ (US); Stephen Penrice, Morristown, NJ (US); Alan Kyle Bozeman, Rutherford, NJ (US)

(73) Assignee: Scientific Games International, Inc., Newark, DE (US)

(*) Notice: Subject to any disclaimer, the term of this patent is extended or adjusted under 35 U.S.C. 154(b) by 1324 days.

(21) Appl. No.: 10/681,442

(22) Filed: Oct. 8, 2003

(65) Prior Publication Data

US 2008/0132314 A1 Jun. 5, 2008

(51) Int. Cl.
*G06K 5/00* (2006.01)

(52) U.S. Cl. ...................................... 235/381; 235/380

(58) Field of Classification Search ................ 235/381, 235/383, 382; 463/17, 42, 25; 273/139, 273/49

See application file for complete search history.

(56) References Cited

U.S. PATENT DOCUMENTS

| | | | | |
|---|---|---|---|---|
| 3,982,102 A | | 9/1976 | Cidade | |
| 4,764,666 A | | 8/1988 | Bergeron | |
| 4,892,310 A | | 1/1990 | Patterson | |
| 5,186,463 A | | 2/1993 | Marin et al. | |
| 5,232,221 A | | 8/1993 | Sludikoff et al. | |
| 5,499,816 A | * | 3/1996 | Levy | 273/139 |
| 6,017,032 A | | 1/2000 | Grippo et al. | |
| 7,118,476 B1 | * | 10/2006 | White et al. | 463/17 |
| 7,153,206 B2 | * | 12/2006 | Bennett, III | 463/17 |
| 2003/0080548 A1 | * | 5/2003 | Borowski et al. | 283/49 |
| 2003/0114210 A1 | | 6/2003 | Meyer et al. | |
| 2003/0181235 A1 | * | 9/2003 | Bennett, III | 463/17 |
| 2003/0228910 A1 | * | 12/2003 | Jawaharlal et al. | 463/42 |
| 2008/0132314 A1 | * | 6/2008 | Robb et al. | 463/17 |

* cited by examiner

*Primary Examiner*—Thien M Le

(74) *Attorney, Agent, or Firm*—Dority & Manning, P.A.

(57) ABSTRACT

In one aspect, the invention is directed to a method for conducting a dynamic lottery game, and may include determining an opening entry for the player for the dynamic lottery game. The method may also include dispensing a dynamic lottery game ticket to the player, the dynamic lottery game ticket having indicia disposed thereon corresponding to the opening entry for the player for the dynamic lottery game, reading player selection indicia on the dynamic lottery game ticket, wherein the player selection indicia on the dynamic lottery game ticket corresponds to a dynamic lottery game selection for the player, and determining an outcome of the dynamic lottery game, the outcome being determined based on the player selection indicia. Still further, the method may include dispensing a continuation ticket to the player, the continuation ticket having indicia disposed thereon corresponding to the outcome of the dynamic lottery game for the player, reading the indicia corresponding to the outcome of the dynamic lottery game for the player, determining whether the outcome of the dynamic lottery game is a winning outcome based on the indicia corresponding to the outcome of the dynamic lottery game for the player, and dispensing value to the player in response to determining that the outcome of the dynamic lottery game for the player is a winning outcome.

46 Claims, 25 Drawing Sheets

LOTTERY AND GAMING SYSTEMS WITH DYNAMIC LOTTERY TICKETS

BACKGROUND

This invention relates to lottery systems for conducting lottery games and, more particularly, to lottery systems incorporating dynamic lottery tickets used as playslips and providing dynamic lottery and betting games as stand-alone games and/or as extension games in addition to the standard lottery game.

Various lottery systems incorporating play slips for the lottery games have been previously described. For example, U.S. Pat. No. 5,818,026 to Melling et al. discloses a system and method for capturing hand-marked cells from a lottery selection slip. The lottery slip includes a conventional play region of cells (labeled sequentially from 1 to 49, for example) for receiving indicia to be captured, after receiving indicia the play region of cells includes a plurality of occupied cells defined by marked cells and a plurality of non-occupied cells defined by unmarked cells. The lottery slip also includes row-identifier bar codes located at opposite boundaries of the play region. The bar codes are electro-optically scannable and readable and are arranged in a plurality of ordered rows tiered along the transverse direction over the transverse distance of the play region. A scanner is used to generate scan lines that extend over the play region of cells occupied by the indicia and over each bar code and for decoding the row identifier data for each scan line as each line transverses the boundaries of the play region of cells, the occupied cells having different light reflectivity than the non-occupied cells. A decoder captures the identity and the location of the occupied cells and the non-occupied cells and stores the digitized signal. A ticket receipt is then issued representative of the numbers selected by the player. By using a bar code scanner to read both the row identifier codes and the actual hand-marked play region the need for precise positioning within traditional terminals was obviated.

U.S. Pat. No. 5,156,397 to Valenza, Jr. discloses an apparatus for automated marking of bet slips for use in entering a customer wager into an independent lottery terminal includes a housing for receiving a bet slip. A selector actuatable by the customer is provided within the housing for permitting the customer to select a desired mode of operation from a plurality of alternative operational modes for marking the bet slip. A control within the housing communicates with the selector for identifying the mode selected by the customer and for generating electrical control signals in response to the selected mode. A printer within the housing communicates with the control for receiving the bet slip, for receiving the electrical control signals and for marking the bet slip in accordance with the received control signals.

SUMMARY OF THE INVENTION

In one aspect, the invention is directed to a gaming system for conducting a dynamic lottery game, wherein the gaming system may include a plurality of terminal units and a host computer operatively coupled to the plurality of terminal units. Each of the terminal units may include an input device for inputting a plurality of input selections, the input device may be capable of reading encoded information disposed on a substrate material, a terminal unit memory device, a currency-accepting mechanism that is capable of allowing the player to deposit a medium of currency, a value-dispensing mechanism that is capable of dispensing value to the player, an output device, and a terminal unit controller operatively coupled to the input device, the terminal unit memory device, the currency-accepting mechanism, the value-dispensing mechanism, and the output device. The host computer may include a host computer memory device, and a host computer controller operatively coupled to the host computer memory device.

One of the terminal unit controller and the host computer controller may be programmed to determine an opening entry for the player for the dynamic lottery game. The terminal unit controller may be programmed to cause the output device to dispense a dynamic lottery game ticket to the player, with the dynamic lottery game ticket having indicia disposed thereon corresponding to the opening entry for the player for the dynamic lottery game, and to allow the input device to receive the dynamic lottery game ticket and to read player selection indicia on the dynamic lottery game ticket, wherein the player selection indicia on the dynamic lottery game ticket corresponds to a dynamic lottery game selection for the player.

Further, one of the terminal unit controller and the host computer controller may be programmed to determine an outcome of the dynamic lottery game in response to the reading of the player selection indicia by the input device, the outcome being determined based on the player selection indicia, and the terminal unit controller may be programmed to cause the output device to dispense a continuation ticket to the player, the continuation ticket having indicia disposed thereon corresponding to the outcome of the dynamic lottery game for the player, and to allow the input device to receive the continuation ticket and to read the indicia corresponding to the outcome of the dynamic lottery game for the player. One of the terminal unit controller and the host computer controller may programmed to determine whether the outcome of the dynamic lottery game is a winning outcome based on the indicia corresponding to the outcome of the dynamic lottery game for the player, and the terminal unit controller may be programmed to cause the value-dispensing mechanism to dispense value to the player in response to the one of the terminal unit controller and the host computer controller determining that the outcome of the dynamic lottery game for the player is a winning outcome.

In another aspect, the invention is directed to a method for conducting a dynamic lottery game that may include determining an opening entry for the player for the dynamic lottery game. The method may also include dispensing a dynamic lottery game ticket to the player, the dynamic lottery game ticket having indicia disposed thereon corresponding to the opening entry for the player for the dynamic lottery game, reading player selection indicia on the dynamic lottery game ticket, wherein the player selection indicia on the dynamic lottery game ticket corresponds to a dynamic lottery game selection for the player, and determining an outcome of the dynamic lottery game, the outcome being determined based on the player selection indicia. Still further, the method may include dispensing a continuation ticket to the player, the continuation ticket having indicia disposed thereon corresponding to the outcome of the dynamic lottery game for the player, reading the indicia corresponding to the outcome of the dynamic lottery game for the player, determining whether the outcome of the dynamic lottery game is a winning outcome based on the indicia corresponding to the outcome of the dynamic lottery game for the player, and dispensing value to the player in response to determining that the outcome of the dynamic lottery game for the player is a winning outcome.

In a further aspect, the invention is directed to a terminal unit for conducting a dynamic lottery game. The terminal unit may include an input device for inputting a plurality of input selections, the input device being capable of reading encoded information disposed on a substrate material, a terminal unit memory device, a currency-accepting mechanism that is capable of allowing the player to deposit a medium of currency, a value-dispensing mechanism that is capable of dispensing value to the player, an output device, and a terminal unit controller operatively coupled to the input device, the terminal unit memory device, the currency-accepting mechanism, the value-dispensing mechanism, and the output device. The terminal unit controller may be programmed to determine an opening entry for the player for the dynamic lottery game, and to cause the output device to dispense a dynamic lottery game ticket to the player, the dynamic lottery game ticket having indicia disposed thereon corresponding to the opening entry for the player for the dynamic lottery game.

The terminal unit controller may also be programmed to allow the input device to receive the dynamic lottery game ticket and to read player selection indicia on the dynamic lottery game ticket, wherein the player selection indicia on the dynamic lottery game ticket corresponds to a dynamic lottery game selection for the player, to determine an outcome of the dynamic lottery game in response to the reading of the player selection indicia by the input device, the outcome being determined based on the player selection indicia, and to cause the output device to dispense a continuation ticket to the player, the continuation ticket having indicia disposed thereon corresponding to the outcome of the dynamic lottery game for the player. The terminal unit controller may further be programmed to allow the input device to receive the continuation ticket and to read the indicia corresponding to the outcome of the dynamic lottery game for the player, to determine whether the outcome of the dynamic lottery game is a winning outcome based on the indicia corresponding to the outcome of the dynamic lottery game for the player, and to cause the value-dispensing mechanism to dispense value to the player in response to the terminal unit controller determining that the outcome of the dynamic lottery game for the player is a winning outcome.

In yet another aspect, the invention is directed to a gaming system for conducting a dynamic betting game corresponding to the occurrence of a sporting event. The gaming system may include a plurality of terminal units operatively coupled to a host computer. Each of the terminal units may include an input device for inputting a plurality of input selections, the input device being capable of reading encoded information disposed on a substrate material, a terminal unit memory device, a currency-accepting mechanism that is capable of allowing the player to deposit a medium of currency, a value-dispensing mechanism that is capable of dispensing value to the player, an output device, and a terminal unit controller operatively coupled to the input device, the terminal unit memory device, the currency-accepting mechanism, the value-dispensing mechanism, and the output device. The host computer may include a host input device, a host computer memory device, and a host computer controller operatively coupled to the host input device and the host computer memory device.

One of the terminal unit controller and the host computer controller may be programmed to allow the entry of current information for the occurrence of the sporting event at a corresponding one of the terminal input device and the host input device, and to store the current information at least one of the terminal unit memory device and the host computer memory device. The terminal unit controller may be programmed to cause the output device to dispense a dynamic bet slip to the player, the dynamic bet slip having indicia disposed thereon corresponding to the current information for the occurrence of the sporting event stored at the at least one of the terminal unit memory device and the host computer memory device, and to allow the terminal input device to receive the dynamic bet slip and to read player selection indicia on the dynamic bet slip, wherein the player selection indicia on the dynamic bet slip corresponds to the player's entry for the dynamic betting game for the occurrence of the sporting event.

Further, the terminal unit controller may be programmed to allow the currency-accepting mechanism to receive a wager from the player corresponding to the player's entry for the dynamic betting game for the occurrence of the sporting event, and to cause the output device to dispense a continuation ticket to the player, the continuation ticket having indicia disposed thereon corresponding to the player's entry for the dynamic betting game for the occurrence of the sporting event. In addition, one of the terminal unit controller and the host computer controller may be programmed to allow the entry of outcome information for the occurrence of the sporting event at a corresponding one of the terminal input device and the host input device, and to store the outcome information at least one of the terminal unit memory device and the host computer memory device. The terminal unit controller may also be programmed to allow the input device to receive the continuation ticket and to read the indicia corresponding to the player's entry for the dynamic betting game for the occurrence of the sporting event.

One of the terminal unit controller and the host computer controller may be programmed to determine whether the player's entry for the dynamic betting game for the occurrence of the sporting event is a winning entry based on a comparison of the player's entry to the outcome information for the occurrence of the sporting event, and the terminal unit controller may be programmed to cause the value-dispensing mechanism to dispense value to the player in response to the one of the terminal unit controller and the host computer controller determining that the player's entry for the dynamic betting game is a winning entry.

In an additional aspect, the invention is directed to a method for conducting a dynamic betting game corresponding to the occurrence of a sporting event. The method may include storing current information for the occurrence of the sporting event at a computer memory device, dispensing a dynamic bet slip to the player, the dynamic bet slip having indicia disposed thereon corresponding to the current information for the occurrence of the sporting event stored at the computer memory device, and reading player selection indicia on the dynamic bet slip, wherein the player selection indicia on the dynamic bet slip corresponds to the player's entry for the dynamic betting game for the occurrence of the sporting event. The method may further include receiving a wager from the player corresponding to the player's entry for the dynamic betting game for the occurrence of the sporting event, dispensing a continuation ticket to the player, the continuation ticket having indicia disposed thereon corresponding to the player's entry for the dynamic betting game for the occurrence of the sporting event, and storing outcome information for the occurrence of the sporting event at a computer memory device. Still further, the method may include reading the indicia on the continuation ticket corresponding to the player's entry for the dynamic betting game for the occurrence of the sporting event, determining whether the player's entry for the dynamic betting game for the occurrence of the sporting event is a winning entry based on a comparison of the player's entry to the outcome information for the occurrence of the sporting event, and dispensing value to the player in response to determining that the player's entry for the dynamic betting game is a winning entry.

In an additional and further aspect, the invention is directed to a terminal unit for conducting a dynamic betting game corresponding to the occurrence of a sporting event. The terminal unit may include an input device for inputting a plurality of input selections, the input device being capable of reading encoded information disposed on a substrate material, a terminal unit memory device, a currency-accepting mechanism that is capable of allowing the player to deposit a medium of currency, a value-dispensing mechanism that is capable of dispensing value to the player, an output device, and a terminal unit controller operatively coupled to the input device, the terminal unit memory device, the currency-accepting mechanism, the value-dispensing mechanism, and the output device. The terminal unit controller may be programmed to allow the entry of current information for the occurrence of the sporting event at the terminal input device, and to store the current information at the terminal unit memory device, and to cause the output device to dispense a dynamic bet slip to the player, the dynamic bet slip having indicia disposed thereon corresponding to the current information for the occurrence of the sporting event stored at the terminal unit memory device.

The terminal unit controller may also be programmed to allow the terminal input device to receive the dynamic bet slip and to read player selection indicia on the dynamic bet slip, wherein the player selection indicia on the dynamic bet slip corresponds to the player's entry for the dynamic betting game for the occurrence of the sporting event, to allow the currency-accepting mechanism to receive a wager from the player corresponding to the player's entry for the dynamic betting game for the occurrence of the sporting event, and to cause the output device to dispense a continuation ticket to the player, the continuation ticket having indicia disposed thereon corresponding to the player's entry for the dynamic betting game for the occurrence of the sporting event. The terminal unit controller may still further be programmed to allow the entry of outcome information for the occurrence of the sporting event at the terminal input device, and to store the outcome information at the terminal unit memory device, to allow the input device to receive the continuation ticket and to read the indicia corresponding to the player's entry for the dynamic betting game for the occurrence of the sporting event, to determine whether the player's entry for the dynamic betting game for the occurrence of the sporting event is a winning entry based on a comparison of the player's entry to the outcome information for the occurrence of the sporting event, and to cause the value-dispensing mechanism to dispense value to the player in response to the terminal unit controller determining that the player's entry for the dynamic betting game is a winning entry.

Additional aspects of the invention are defined by the claims of this patent.

DETAILED DESCRIPTION OF VARIOUS EMBODIMENTS

Although the following text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '______' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Lottery Network

Figure 1:
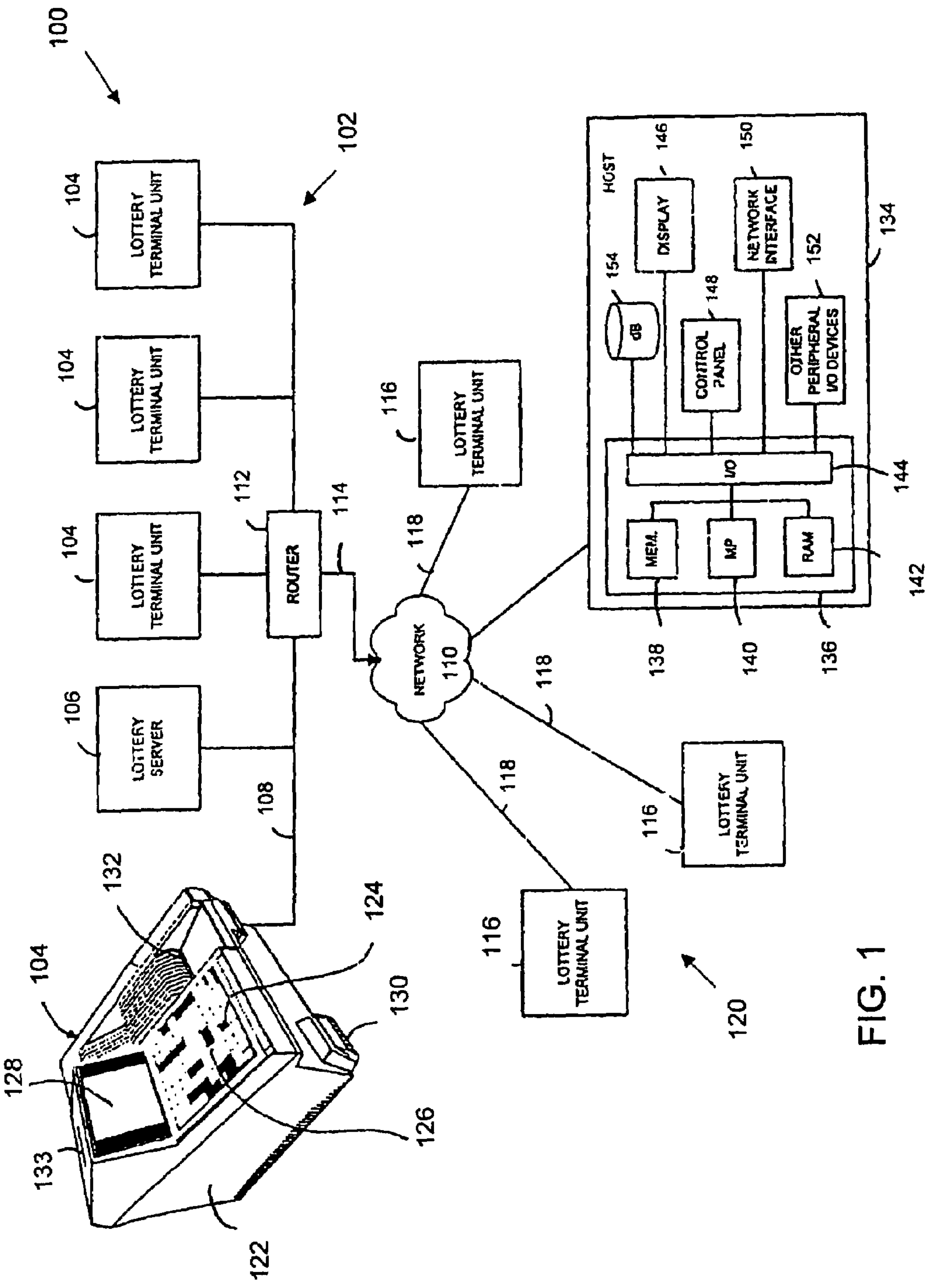
FIG. 1 is a block diagram of an embodiment of a networked lottery system.

FIG. 1 illustrates one possible embodiment of a lottery network 100 that may implement a multi-theme instant win game in conjunction with a lottery-type game. Referring to FIG. 1, the lottery network 100 may include a first group or network 102 of lottery terminal units 104 operatively coupled to a lottery network computer or server 106 via a network data link or bus 108. The lottery network 100 may be coupled to a network 110, which may be, for example, the Internet, a wide area network (WAN), or a local area network (LAN) through a network hub or router 112 via a first network link 114. In one possible configuration, the first network 102 may be a state lottery system operating within an individual state or region of states.

In this configuration, the individual lottery terminal units 104 may be interconnected to a central system for tracking and coordination of the state lottery system, including issued tickets, drawn numbers, and/or amounts waged.

The lottery network 100 may further include other lottery terminal units 116 that may be directly connected to the network 110 through a plurality of direct network links 118, thereby eliminating the need for the bus 108, router 112 or other networking equipment. Each lottery terminal unit 116 in this configuration may represent a group of lottery retailers participating in the state lottery, as described above, or a plurality of the lottery terminal units 116 may be grouped together to form a lottery node 120. The lottery nodes 120, in turn, may be directly connected and/or multiplexed to the network 110 via the direct network links 118. Further, the direct network links 118 may represent secure communications channels physically hardened against tampering and/or the communications may be encrypted to prevent unauthorized access to information transmitted thereon.

FIG. 1 further illustrates a perspective view of one possible embodiment of a lottery terminal unit 104. Although the following description relates to the design of the lottery terminal unit 104 depicted in FIG. 1, it should be understood that the lottery terminal units 104 and 116 may include similar features or may be configured with functionality to allow the entry of the information required for a player to participate in a lottery game. The exemplary lottery terminal unit 104 may include a housing or casing 122, and one or more input and output devices, which may be, among other things, a control panel 124 having a plurality of input keys 126, a display 128, a value input device such as a card reader 130, a lottery play slip or ticket reader 132, and a lottery ticket printer 133. The lottery play slip reader 132 may be configured to read bar codes, user selections, magnetically stored information or any other desired input information or media used to encode information on a play slip or lottery ticket.

The input keys 126 may allow the player or sales agent to select the game to be played, input the value to be wagered, manually enter the selected lottery characters, and input any other information necessary to play a given lottery game. The display 128 may be a LCD, a CRT, a touch-screen capable of receiving and displaying information, or any other suitable device capable of displaying the information input via the input keys 126, the lottery play slip reader 132 or the touch-screen input. The value input device may include any device that can accept value or a wager from a customer, such as the card reader 130 or an optical currency collector. The value input device may further be integrated with external devices, such as cash registers or other retail terminals, communicatively connected to the lottery terminal unit 104, to exchange information necessary to receive and record the wagering transactions. The lottery ticket printer 133 may be used to print or otherwise encode lottery tickets with information selected or required to play a given lottery game. Further, the lottery ticket printer 133 may provide lottery tickets, or even completed lottery slips if the selections were generated automatically, that could be used by the player in other lottery terminal units 116 equipped with lottery play slip or ticker readers 132.

Moreover, the lottery terminal units 104, 116 and lottery nodes 120 may include centralized or shared display mechanisms such as a scrolling digital signs or messaged boards configured to display the outcome of a completed lottery game and advertises or attract players to upcoming games. In one exemplary configuration, at least one lottery terminal unit 104 or 116 includes software for generating graphics and is communicatively connected to an external LCD suitable for displaying graphics. Upon completion of a lottery drawing, the results or winning information can be formatted by the graphical software and displayed, in an eye-catching manner, on the external LCD. Alternatively, the graphical software may be stored on a peripheral device, such as a CD-ROM, and the result of the lottery drawing communicated thereto for formatting and display.

The network 110, and hence the individual lottery terminal units 104 and 116, may be communicatively connected to a central host computer 134. The central host computer 134 may be a single networked computer, or a series of interconnected computers having access to the network 110 via a gateway or other known networking system. Generally, the central host computer 134 may include a central lottery controller 136 configured to manage, execute and control the individual lottery elements 104, 116 and 120 and the routines used to play the various lottery games. The central lottery controller 136 may include a memory 138 for storing lottery programs and routines, a microprocessor 140 (MP) for executing the stored programs, a random access memory 142 (RAM) and an input/output bus 144 (I/O). The memory 138, microprocessor 140, RAM 142 and the I/O bus 144 may be multiplexed together via a common bus, as shown, or may each be directly connected via dedicated communications lines, depending on the needs of the lottery system 100.

Further, the central lottery controller 136 may be directly connected, hardwired, or indirectly connected through the I/O bus 144 to external components such as a display 146, a control panel 148, a network interface device 150 and other peripheral I/O devices 152. Examples of other peripherals device include, but are not limited to, storage devices, wireless adaptors, printers, and the like. In addition, a database 154 may be communicatively connected to the central lottery controller 136 and provide a data repository for the storage and correlation of information gathered from the individual lottery terminal units 104, 116 or lottery nodes 120. The information stored within the database 154 may be information relating to individual lottery terminal units 104, 116 such as terminal specific information like a terminal identification code, sales agent code, and location for each lottery ticket printed. The database 154 may further include ticket specific information such as the type of game played (Lotto, Pick-3, Pick-4 etc.), or game specific information such as the total lottery sales, drawing outcomes, amounts wagered, numbers selected by the players, and the like.

In operation, the central lottery controller 136 may operate as a clearing-house for the lottery terminal units 116 and the first lottery network 102, whereby the lottery network computer 106 collects, stores and analyzes status and operational information relating to each lottery terminal unit 104. For example, the lottery network computer 106 may continuously receive transactional data from the individual lottery terminal unit 104 indicative of the number of tickets sold and associated dollar amounts, and the lottery numbers and number order generated at each lottery terminal unit. The transactional data collected by the lottery network computer 106 may be communicated to the central host computer 134 continuously or may be processed into a batch format and transmitted periodically for storage in the database 154. If, for example, the central lottery controller 136 and the lottery network computer 106 are communicating continuously, it may be desirable for the central lottery controller 136 to execute the actual lottery routine and transmit the results to the lottery network computer 106 for distribution to the lottery terminal units 104 and directly to the lottery terminal units 116. In addition, it may be desirable for the central lottery controller 136 to include, via the peripheral device input 152, a scanner, such as the lottery play slip reader 132, for directly importing/reading manual selections into the database 154.

It will be understood that the lottery network 100 illustrated in FIG. 1 may alternatively represent the network layout within a gaming establishment providing a lottery-type game. In this alternate configuration, each stand-alone lottery terminal unit 104 may be an interactive player terminal capable of playing a variety of lottery or casino games, such as a lottery game, Keno, Bingo, video poker, video blackjack, slots, and the like. The lottery terminal units 104 may be distributed throughout a single gaming establishment or casino and connected with a LAN, or throughout multiple casino sites and connected with a WAN. Further, the LAN and/or WAN connecting each of the lottery terminal units 104 may include one or more separate and secure buses 108, routers 112, web servers, gateways and other networking equipment to provide continuous and/or redundant connectivity to the network 110. The network 110, configured in this manner, provides a system for players to collectively participate in a centralized lottery-type game. Further, the network 110 may include express gaming stations at which players may generate predefined or automatically selected lottery tickets simply by making a selection and a wager. As discussed above, the network 110 may be communicatively connected to the central host computer 134, the central lottery controller 136, and the database 142 to allow for implementation, storage, tracking and analysis of the lottery game.

The central host computer 134 may store the software for managing one or more lottery games offered in the lottery system 100. Some jurisdictions may limit the number of lottery games that may be offered by a lottery system. Consequently, once a lottery system offers the maximum number of lottery games allowed by the jurisdiction, it may be necessary to remove or otherwise decommission an existing lottery game in order to implement a new lottery game. Moreover, when a new game is implemented in the lottery system, it may be necessary to perform certification testing on the new lottery game to ensure compliance of the lottery game with the applicable gaming regulations. Therefore, it may be desirable to be able to reuse lottery game functionality in order to avoid certifying or recertifying lottery game software, and to conserve the limited number of available lottery game positions available in the lottery system.

Lottery Unit

Figure 2:
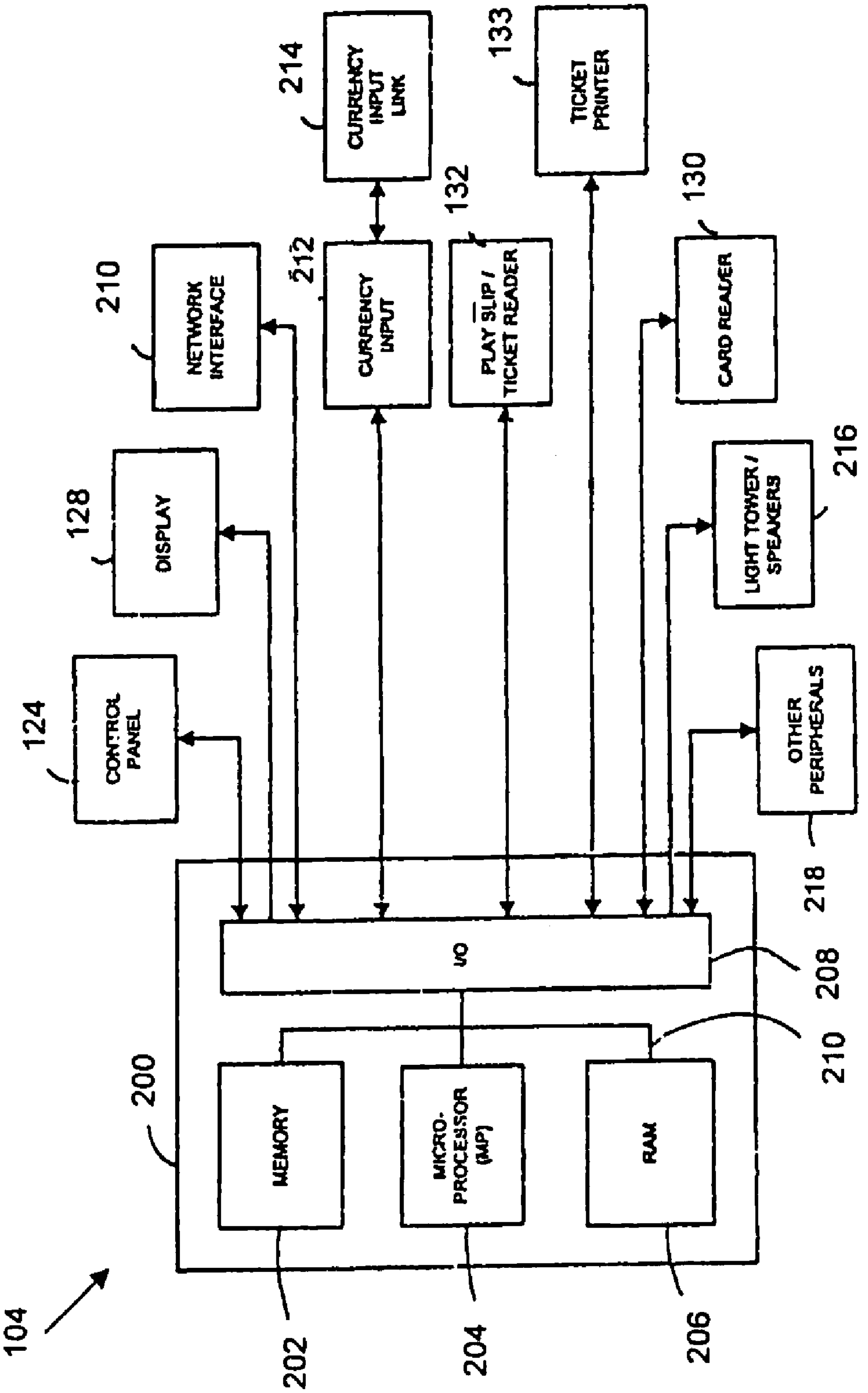
FIG. 2 is a block diagram of the electronic components of the lottery terminal unit shown in FIG. 1.

FIG. 2 illustrates a block diagram of an embodiment of the internal electronic components of the lottery terminal unit 104. The lottery terminal unit 116 may have the same or a different design, but may be configured to receive player entries into the lottery games and process winning lottery tickets. Referring to FIG. 2, the exemplary lottery terminal unit 104 may include a number of internal components such as a controller 200 having a program memory 202, a microcontroller or microprocessor (MP) 204, a random access memory (RAM) 206, and an input/output (I/O) bus 208, all of which may be interconnected via an address or data bus 210. It should be understood that while only one microprocessor 204 is shown herein, the controller 200 may be designed to support multiple microprocessors 204 arranged to operate in parallel or in any other known configuration. Similarly, the controller 200 may include multiple, and even redundant, program memories 202 and random access memories 206 to increase expandability, capacity and/or processing speed. The multiple processor and memory configurations may be used, for example, to isolate the individual lottery functions such as basic lottery operation, random number generation, information tracking, and the like. Although the I/O bus 208 is shown as a single addressable and integral block, it should be understood that direct I/O connections may be made, as well as any other desired I/O connection scheme. The program memory 202 and random access memory 206 may be implemented as a solid-state memory, an integrated circuit, a magnetically readable memory, and/or optically readable memories. Further, the program memory 202 may be read only memory (ROM) or may be read/write memory such as a hard disk. In the event that a hard disk is used as the program memory, the data bus 210 may comprise multiple address/ data buses, which may be of differing types, and there may be a separate I/O circuit between the data buses.

FIG. 2 schematically illustrates that the controller 200 may be communicatively connected to the control panel 124, the display 128, the card reader 130, the lottery play slip or ticket reader 132 and the lottery ticket printer 133. The controller 200 may further be communicatively connected to a network interface card (NIC) or device 210, a currency input device 212 including a currency input link 214, and a light and speaker link 216. The network interface card 210 may be configured to allow the lottery terminal unit 104 to communicate information with other networked devices similarly connected to the network 110 using any known protocol or standard suitable for a lottery or network application. The currency input device 212 may be any kind of value input device discussed above, or may include a currency input link 214 communicatively connected to a cash register (not shown) or other device for tracking and/or totaling currency or transactions. The light and speaker link 214 may be used to integrate visual and/or audio displays into the design of the lottery terminal unit 104.

FIG. 2 illustrates the components 124, 128-132, and 210-218 directly connected the I/O bus 208 via dedicated circuits or conductors. However, it will be understood that different connections schemes may be used. For example, some of the components requiring limited communications with the controller 200 may be communicate via an auxiliary I/O bus (not shown) in a scheduled manner, while other components requiring fast communications or large data transfers may be directly connected to the I/O bus 208. Furthermore, depending on the needs of the system, some of the components may be directly connected to the microprocessor 184 without having to pass through the I/O bus 208.

Lottery Play Slips and Tickets

Regardless of the configuration or layout of the lottery system 100, it may often be the case that the lottery terminal unit 104, 116 will include lottery play slip or ticket readers 132 which may be used to scan an instant game ticket or a lottery play slip 300 (FIG. 3), which may, for example, be a play slip for a Keno game, completed by the player, and a lottery ticket 302 (FIG. 4), which may be, for example, a Keno game lottery ticket, previously generated at a lottery ticket printer 133, to determine whether the ticket contains a winning combination. The lottery play slip 300 and the lottery ticket 302 may be composed of paper, Mylar, cardboard or any other suitable printable or encodable material. The lottery play slip 300 and ticket 302 may include informational, instructional or security information such as a bar code, award details, authentication numbers, or any other desired information. Further, it will be understood that different ticket types and formats may be used depending on the theme, format and rules of the game. The lottery ticket 302 may be printed with any optically readable material such as ink, or encoded with data on a magnetic material, smart chip or other media for encoding data.

Figure 3:
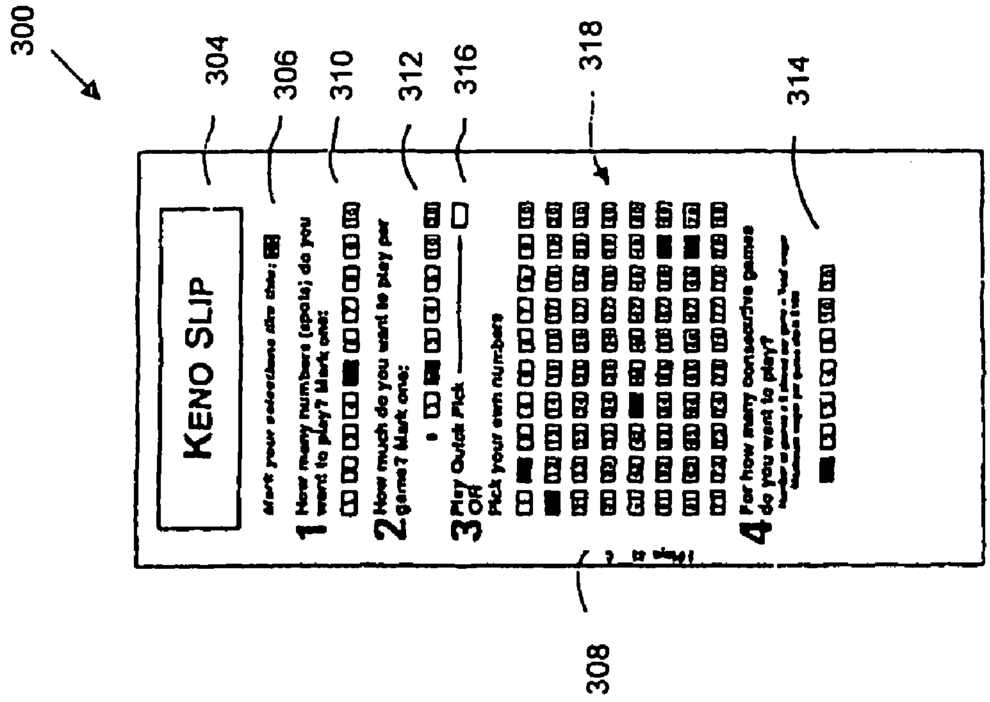
FIG. 3 illustrates an embodiment of a lottery play slip that may be read by the lottery terminal unit of FIG. 2.

Referring to FIG. 3, the lottery play slip 300 can be configured and arranged in any number of variations for use in lottery games such as Keno, Lotto, Powerball-style games, Pick-3 and Pick-4 games, and the like, but may typically include a number of common indicia or information. For example, the exemplary Keno play slip 300 may include a title 304 indicative of the associated game, a set of directions or instructions 306, and a plurality of game specific selections, as generally indicated by the numeral 308. The game specific selections may allow the player to define how many numbers or characters associated with the lottery game to play 310, the exact amount to be wagered 312, and the number of games or drawings to be entered 314. Further, the lottery play slip 300 may be arranged with indicia 316 to allow a player to play the lottery game with Quick Pick selections (i.e. selections automatically and randomly determined by one of the lottery terminal units 104, 116 or the central lottery controller 136), and/or with manual selection indicia 318 arranged to allow the player to select the player's entry from a predefined list of numbers, letters or characters associated with the lottery game. In this manner, the player or a sales agent can fill-out, code or otherwise record the information necessary to participate in a specific lottery game, and provide that information to a central collection point, such as the lottery terminal unit 104, 116 or the central host computer 136 for processing and/or recordation. The reverse side of the play slip 300 may also have indicia (not shown) thereon with information relating the lottery game, such as instructions on how to play the game, win and claim prizes, schedules or tables of prize amounts and odds of winning, requirements for playing or filling out play slips, lottery disclaimers, and the like.

The exemplary lottery play slip 300 illustrated in FIG. 3 is configured to allow the player to make entry in a Keno game. The player may select how many numbers or spots are to be matched in a given Keno game at 310, thereby decreasing the odds of winning and simultaneously increasing the potential payout of a winning selection. By selecting a Quick Pick at area 316, the player may allow the lottery terminal unit 104 to randomly select a plurality of numbers equal to the number of spots indicated at 310. However, the player may opt to manually select the numbers by choosing numbers, or spots, between 1 and 80, as indicated in the manual selection area 318. Finally, the manual or automatic selections may be consecutively played by indicating the desired number of games, for example one, two, three, four, five, ten or twenty, at area 314.

Figure 4:
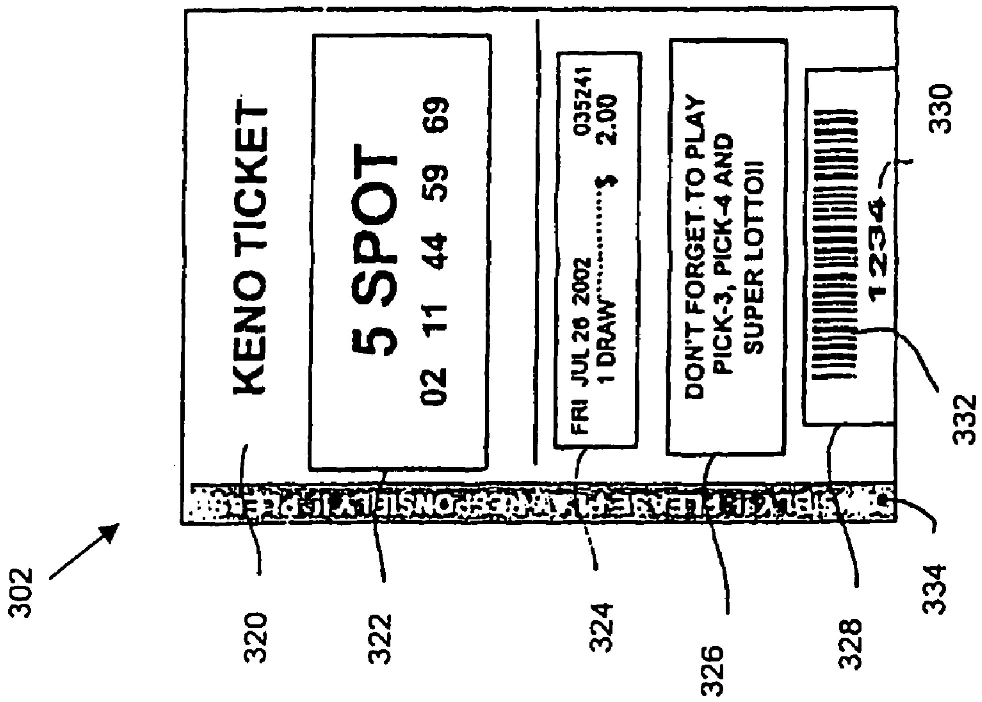
FIG. 4 illustrates an embodiment of a lottery ticket that may be generated by the lottery terminal unit of FIG. 2.

FIG. 4 illustrates the exemplary lottery ticket 302 that may be generated in response to the selections made by the player on the lottery slip 300. For example, the lottery ticket 302 may include a title 320 indicative of the game being played, a game area 322 that may provide results, confirmation information or other game-related information, and a status area 324 that may include wager information, drawing date, tracking information and the like. Further, the lottery ticket 302 may include an advertising area 326 where messages or other consumer information may be printed, and a coding area 328 that may have a tracking number 330 and a machine-readable code 332, such as a barcode, that may be read by the play slip/ticket reader 132 to retrieve information for the ticket. The tracking code 330 and graphical code 332 may be used to confirm the validity of the ticket, the location of purchase, amount of wager, numbers selected or any other desired information. The lottery ticket stock, or blank, may be preprinted with additional information such as, a public service message 334, a disclaimer, game rules or any other desired end-user license or contract information.

It will be understood that to play the exemplary Keno game described above, the player may manually fill out the lottery play slip 300 using a pencil, pen or other input method, and the player slip 300 may be read by the lottery play slip reader 132 of the lottery terminal unit 116 to input the player's selections into the lottery system 100. Alternatively, the player may key-in the desired selections at the lottery terminal unit 104, or instruct a sales agent to key-in the desired selections. Once the player's selections are entered into the lottery system 100, the inputted data may then be used by the lottery terminal unit 104, the lottery server 106, and/or the central host computer 134 to generate the lottery ticket 302 with information corresponding to the player's selections. The ticket 302 may serve as the player's receipt, or the lottery terminal 104 unit may print an additional receipt for the player. At the same time, the information for the player selections may be stored in a database, such as in the memory of the lottery terminal unit 104 or server 106, in database 154 or memory 138 of central host computer 134, or other storage location for later use in ticket validation, auditing, compliance monitoring; and the like. At this point, the player may also pay for the wager and games being played.

Lottery Routine

In general, lotteries may be implemented as the networked games described above, or as an instant game. Networked lottery games, such as Lotto and Powerball-style games wherein players may enter a drawing at any one of a number of sales agent locations having lottery terminal units 104, 116, are typically communicatively connected through the network 110 to the central host computer 134, as described above. Lotto and Powerball-style games often offer multi-thousand or multimillion-dollar jackpots, in which five or six numbers are randomly drawn from a pool of twenty or more possible numbers, and the player(s) who has selected, or has had the system select, matching numbers is a winner. Network lotteries may further be implemented as a number game, in a "Pick-3" or "Pick 4" format, in which three or four numbers are drawn from the integers 0 through 9. Number games such as these, in contrast to typical Lotto or Powerball-style games, are often performed with replacements (e.g., the number 2 could be drawn twice) and may distinguish by order (e.g. 3-4-5 may be a different outcome than 5-4-3).

The instant or "scratch-off" lotteries may be implemented as an artfully decorated piece of cardboard or other material with game characters or indicia concealed by a covering material such as latex. In one embodiment, the player simply scratches off the covering material to reveal whether or not the ticket is a winner. An alternate embodiment requires the player to scratch off and reveal a subset of the indicia on the ticket, and the player may or may not win based on the revealed indicia. For example, the scratch-off ticket may include six covered indicia, and the player must uncover three matching indicia, such as three "$20 WIN" spots, in order to win the twenty-dollar prize on the ticket. If one or more selected indicia does not match the other indicia, the player loses the instant win game. It will be understood that the "scratch-off" game may be implement on a video terminal by presenting a variety of indicia hidden behind selectable images. A video scratch-off game would require a player to select an image in an attempt to match indicia hidden there under.

Figure 5:
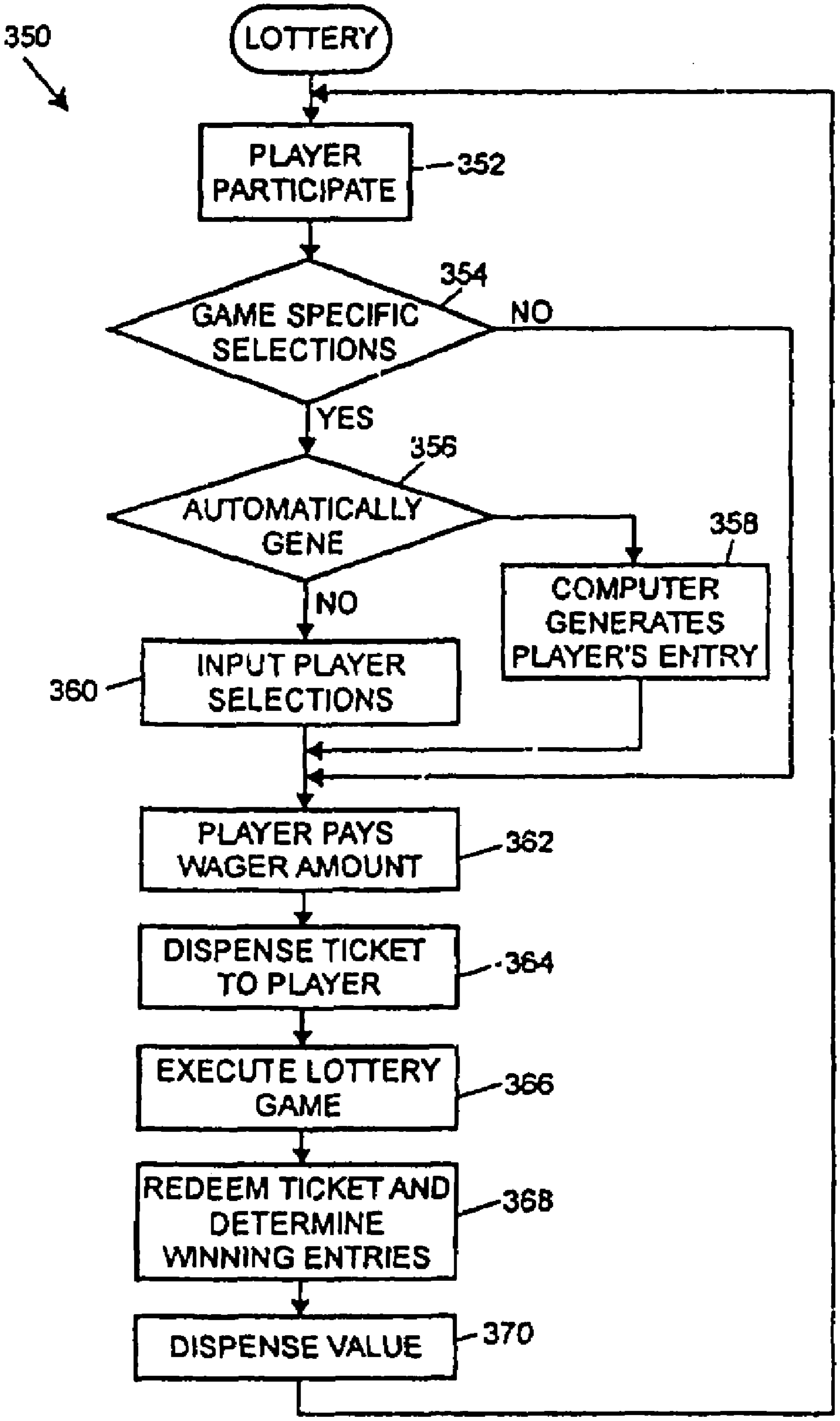
FIG. 5 is a flowchart of an embodiment of a lottery routine in which a player may participate.

FIG. 5 is a flowchart outlining a sample process flow of a lottery game 350 in which a player may participate. For the purpose of this example, and in order to describe various known lottery games, the routine is illustrated and described to implement and allow the player to participate in one of a plurality of lottery games. However, it will be understood by those skilled in the art that the routine may apply where any number of games is offered by the lottery system 100. Referring to FIG. 5, the manual lottery routine may begin at block 352 with a player deciding to participate in a lottery game. Based on the lottery game selected, the lottery game may require game-specific selections by the player when the player wagers or otherwise buys into the lottery game. If no game-specific selections are required at block 354, such as when purchasing an instant lottery and/or scratch-off ticket, the selection process is bypassed. If game-specific selections are required at block 354, a variety of game specific selections such as type of game to play, numbers or other game indicia to play in the game entry, the amount to wager, and number of times or drawings to play may be entered for the player. At block 356, the player may have the option to have the lottery system 100 automatically and randomly generate for the game characters or indicia to be played. If the player elects to automatically generate a ticket, control may pass to block 358 wherein one of the processors 140 or 204 may randomly generate a portion or all of the indicia for the player's entry. If the player elects to select characters or indicia to be used in the lottery game, either on a lottery play slip 300 or by input at the lottery terminal unit 104, they may do so at block 360.

Regardless of the manner in which the selections are made, upon completion of the selection process the player may pay the necessary wager amount at block 362 and the ticket may be dispensed as indicated at block 364. While shown and described as occurring in sequence with the player electing to participate, making game specific selections automatically or manually if necessary, paying the wager amount, and having a lottery ticket dispensed, the steps may occur in any order or concurrently as may be necessary or desired to implement a given lottery game or games. For example, the lottery terminal unit 104 may be configured to require a player to deposit money in a coin slot, currency reader, credit card reader or other value-deposit mechanism, before selecting a game and/or game-specific selections. Alternatively, sales agents may take all the information for the player's entry for the lottery game, print the corresponding lottery ticket and hand the ticket to the player before receiving the wager amount from the player. Those skilled in the art will understand that the steps of selecting a game, making game-specific selections, paying a wager amount and dispensing a lottery ticket may occur in any necessary sequence to accept player entries for the lottery games.

After the players' entries for the lottery game(s) are entered and the players have paid the necessary wager amounts, the lottery games may be executed at block 366. For lottery games involving a drawing, such as Lotto, Powerball-style games, Keno, Bingo, Pick-3 and Pick-4, the drawings may occur on a specified day and time, or at predetermined intervals, with the players being required to make their entries prior to the drawings. For other lottery games initiated by the players, such as instant win games and scratch-off games, the execution of the game occurs when the player performs the necessary actions with the lottery ticket to play the game. For each of these games, however, the execution of the lottery game involves a distinct process for determining the outcome of an occurrence of the game.

In a Lotto game, the players may wager on how many numbers they can match from a specified range of numbers or symbols. For example, during the game-specific selection, the players may select, or have the lottery system 100 select, six numbers from the range of whole numbers from, for example, 1 to 56. At the time of the drawing for the Lotto game, six numbers may be selected from the range of whole numbers from 1 to 56. The six numbers may be selected mechanically using a blower-type ball drawing machine containing a fifty-six balls, each having a number between 1 and 56 printed thereon, electronically using a random number generator or other random selection mechanism at, for example, the lottery host computer 134, or by any other mechanism for randomly selecting a subset of elements from a known set of elements. Winning player entries may be evaluated by comparing the players' selections to the drawing selections to, determine the level of correspondence between the players' selections and the drawing selections. The greater the correspondence, the greater the prize may be, up to the awarding of a jackpot where a player's selections exactly match the drawing selections.

Powerball-style games may be similar to Lotto games, with players selecting a subset of a known range of numbers or symbols from multiple ranges of numbers or symbols. In one example of a Powerball-style game, players' entries consist of five numbers selected from the range of 1 to 53, and one number selected from the range of 1 to 42. When the drawing occurs, five numbers are selected from the range of 1 to 53, and one number is selected from the range of 1 to 42. As with Lotto games, the players' entries may also be evaluated by comparing the players' selections with the drawn selections, with prizes being awarded based on the level of correspondence. Matching some or all of the five numbers from the range of 1 to 53 and not matching the one number from the range of 1 to 42, or matching the one number from the range 1 to 42 and none or up to four of the numbers from the range of 1 to 53 may result in winning a fixed prize amount, while matching all five numbers from the first range and the one number from the second range may result in winning a jackpot.

Keno games are well known for both lottery games and casino games. In typical Keno games, players select one to ten or one to fifteen numbers from the range of 1 to 80. At the time of the drawing, twenty numbers are selected from the range of numbers from 1 to 80. Players win based on the level of correspondence, or lack thereof, between the selected numbers and the drawn numbers, with the win amount for any player entry being determined based on the level of correspondence and the amount of numbers selected by the player. For example, a player may be awarded a larger prize for selecting five numbers and matching all five numbers, than for selecting ten numbers and matching five of those numbers.

Bingo is another common lottery and casino game. In Bingo, each player selects one or more game card consisting of a five-by-five matrix of numbers from the range of 1 to 75. The first column contains five numbers selected from the range of 1 to 15, the second column contains five numbers selected from the range of 16 to 30, the third column typically contains four numbers selected from the range of 31 to 45 and a square entitled "FREE SPACE" in the center, the fourth column contains five numbers selected from the range of 46 to 60, and the fifth column contains five numbers selected from the range of 61 to 75. At the time of the drawing, numbers from the range of 1 to 75 are drawn randomly until at least one player matches a predetermined winning pattern, such as matching all the numbers in a row, column or diagonal, matching the four corners of the Bingo card, or matching any other pattern designated as a winning pattern. The player or players matching a winning pattern first are awarded a prize for the game. Larger prizes may also be awarded for matching particular patterns, or for matching the winning pattern within a predetermined number of drawn balls.

Pick-3 and Pick-4 games are somewhat similar to Powerball-style and Lotto games, wherein players select numbers or symbols from a predetermined range of numbers or symbols. In a Pick-3 game, players select a three-digit number (from 000 to 999) for their entry. At the time of making an entry, the player may be able to elect whether the three digit number must match the drawn three digit number exactly (straight bet) or whether the selected digits may appear in any order in the drawn three digit number (box bet). For example, if a player plays "123" in the Pick-3 as a straight bet, the player may only wins if the number "123" is drawn, while a player playing "123" as a box bet may win if "123," "132," 213," "231," "312" or "321" are drawn. In order to allow for the increased probability of winning a box bet, the player may either be required to wager a larger amount to box the bet, or be awarded a smaller prize amount due to the increased probability of having a winning entry. At the time of the drawing, three numbers are each drawn randomly from a separate set of numbers in the range of 0 to 9 such that digits may be repeated in the drawn three-digit number. In one implementation, three separate blower-type ball machines are used to conduct the drawing, with each machine containing ten balls each having a number between 0 and 9 printed thereon. The first-drawn ball is the first digit of the winning number, the second-drawn ball is the second digit of the winning number, and the third-drawn ball is the final digit. Pick-4 games are conducted in a similar manner using four digit numbers.

As previously mentioned, scratch-off lotteries do not involve a separate drawing conducted by the lottery. Instead, the lottery ticket includes indicia for conducting and determining the outcome of the scratch-off game, with the indicia being covered by a material that may be scratched off to expose the indicia disposed there under. For other games, such as pull tab games, the game indicia and/or the entire ticket may be covered by a covering sheet or substrate, with all or portions thereof being removable to expose the game indicia when the game is played by the player. The scratch-off or pull tab games may configured so that each ticket is predetermined to be a winning or losing entry for the game, or configured so that the each ticket may be either a winning or losing entry, with the outcome being determined based on the order or manner in which the player exposes the covered game indicia on the lottery ticket. In the former type of scratch-off or pull tab game, the indicia is configured to indicate whether the ticket is winning or losing entry, and the player merely removes the covering to expose the indicia and evaluates the indicia to determine whether the ticket is a winning or losing ticket. Any player purchasing the ticket will achieve the same outcome.

In the latter type of scratch-off or pull tab game, the player typically removes the covering from a subset of the indicia disposed on the lottery ticket, and the player wins if the player selected a predetermined winning subset of the indicia. For example, the indicia on the lottery ticket may represent different dollar amounts that may be awarded for winning numbers with three of the dollar amounts being the same, and the three remaining dollar amounts being different. To play the game, the player may select and remove the covering from three of the dollar amounts. If the player exposes the three matching dollar amounts, the player wins the corresponding prize amount. If the player exposes one or more of the non-matching dollar amounts, the player does not win a prize for that lottery ticket. Consequently, each ticket may potentially be a winning ticket, but the ticket will only be a winning ticket if the player selects and uncovers the winning combination of indicia.

Upon completion of the lottery game, the lottery tickets may be redeemed by the players and the winning entries may be determined at block 368. For the lottery games for which a drawing is conducted with the outcome of the drawing being compared to each of the player's entries to determine whether the entries are winning entries, the results of the drawing may be entered and recorded in the lottery system 100 at the lottery host computer 134, for example. In implementations where the player entries are stored in databases at the lottery host computer 134 and/or the lottery terminal units 104, the player entries for the occurrence of the lottery game may be compared to the outcome of the lottery drawing to determine which player entries are winning entries. Based on the results of the comparison, the lottery system 100 may generate a listing of winning entries for the occurrence of the lottery game.

When a player presents a lottery ticket at a sales agent location for redemption, the lottery ticket may be inserted in the ticket reader 132 of the lottery terminal unit 104. The lottery terminal unit 104 may use the information encoded on the lottery ticket to retrieve information from the lottery system 100 to determine whether the lottery ticket is a winning ticket. Alternatively, where the player's selections are encoded on the lottery ticket, the lottery terminal unit 104 or central host computer 134 may compare the player's selections to the drawing outcome to determine whether the lottery ticket is a winning ticket, and determine the corresponding award amount. Still further, the lottery ticket, and in particular a scratch-off and pull tab tickets or Bingo card, may be evaluated by a sales agent to determine whether the lottery ticket is a winning ticket, and any corresponding prize award.

Once the prize award for the lottery ticket is determined, the value may be dispensed to the player corresponding to the prize amount determined for a winning lottery ticket at block 370. The dispensed value may be in an appropriate form, including direct cash payments by the sales agent to the players, printing and issuance of a credit voucher or check at the lottery terminal unit 104, applying credit to a debit card, credit card, smart card, player's lottery or bank account, or any other mechanism for dispensing value to the player.

Figure 6:
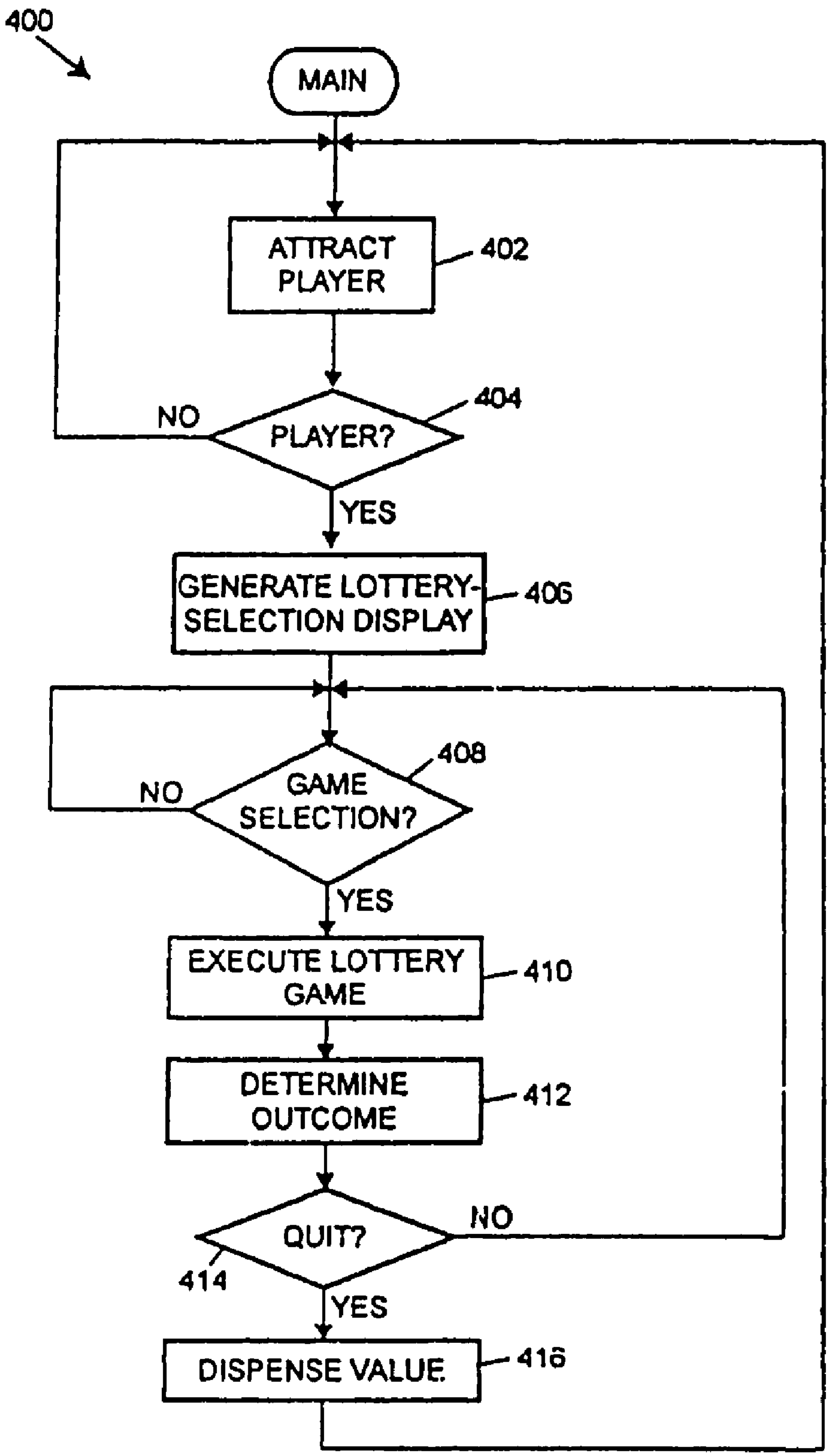
FIG. 6 is a flowchart of an embodiment of a main routine that may be performed during operation of one or more of the lottery terminal units of FIG. 1.

FIG. 6 is a flowchart of an alternative embodiment of an automated main operating routine 400 that may be stored in the memory 202 of the controller 200 of the lottery terminal unit 104 that may be adapted to allow the player to play interactive lottery games, such as video poker, video Keno, video blackjack, video Bingo and the like. The main routine 400 may begin operation at block 402 during which an attraction sequence may be performed in an attempt to induce a potential player to play the lottery terminal unit 104, 116. The attraction sequence 402 may be performed by displaying one or more video images on the display 128 and/or causing one or more sound segments, such as voice or music, to be generated via the speakers 216. The attraction sequence 402 may include a scrolling list of video lottery games that may be played on the lottery terminal unit 104, 116 and/or images of various lottery games being played, such as video poker, video Keno, video blackjack and the like.

During performance of the attraction sequence, if a potential player makes any input to the gaming unit 104 as determined at block 404, the attraction sequence may be terminated and a game-selection display may be generated on the display 128 at block 406 to allow the player to select a lottery available on the lottery terminal unit 104. The lottery terminal unit 104 may detect an input at block 404 in various ways. For example, the lottery terminal unit 104 could detect if the player presses any button on the control panel 124, could determine whether the player deposited currency into a coin slot or currency reader, inserted a smart card into the card reader 130, or recognized any other input of value by the player.

The game-selection display generated at block 406 may include, for example, a list of video lottery games that may be played on the lottery terminal unit 104 and/or a visual message to prompt the player to deposit value into the lottery terminal unit 104. While the game-selection display is generated, the lottery terminal unit 104 may wait for the player to make a game selection. At block 408, if no game selection is made within a given period, the operation may branch back to block 402. Upon selection of one of the games by the player as determined at block 408, the controller 200 may execute one of a number of lottery game routines at block 410 to allow player to play the selected lottery game. The lottery game routine executes and allows the player to play the selected lottery game. For example, when playing video poker, the player may be allowed to indicate whether to hold or drop cards dealt by the lottery terminal unit 104 to the player. In video Keno, the player may select up to ten or fifteen numbers from 1 to 80 to use as the player's game entry. In video blackjack, the player may indicate whether to hit or stand on a hand, or split or double down on a hand. At the end of the game, the outcome may be determined at block 412. The lottery terminal unit 104 may determine the amount of any prize won by the player and corresponding to the player's wager on the game, and increment the amount of credits for the player on the lottery terminal unit 104.

At this point, the player may elect to quit the game and cash out the player's credits at block 414. If the player wishes to stop playing the lottery terminal unit 104 and "Cash Out" any accumulated credits, the controller 200 may dispense value to the player at block 416 based on the outcome of the game(s) played by the player. The operation may then return to block 402. If the player does not wish to quit as determined at block 414, the routine may return to block 406 where the game-selection display may again be generated to allow the player to select another game.

Dynamic Lottery Tickets for Dynamic Lottery Games

Figure 7:
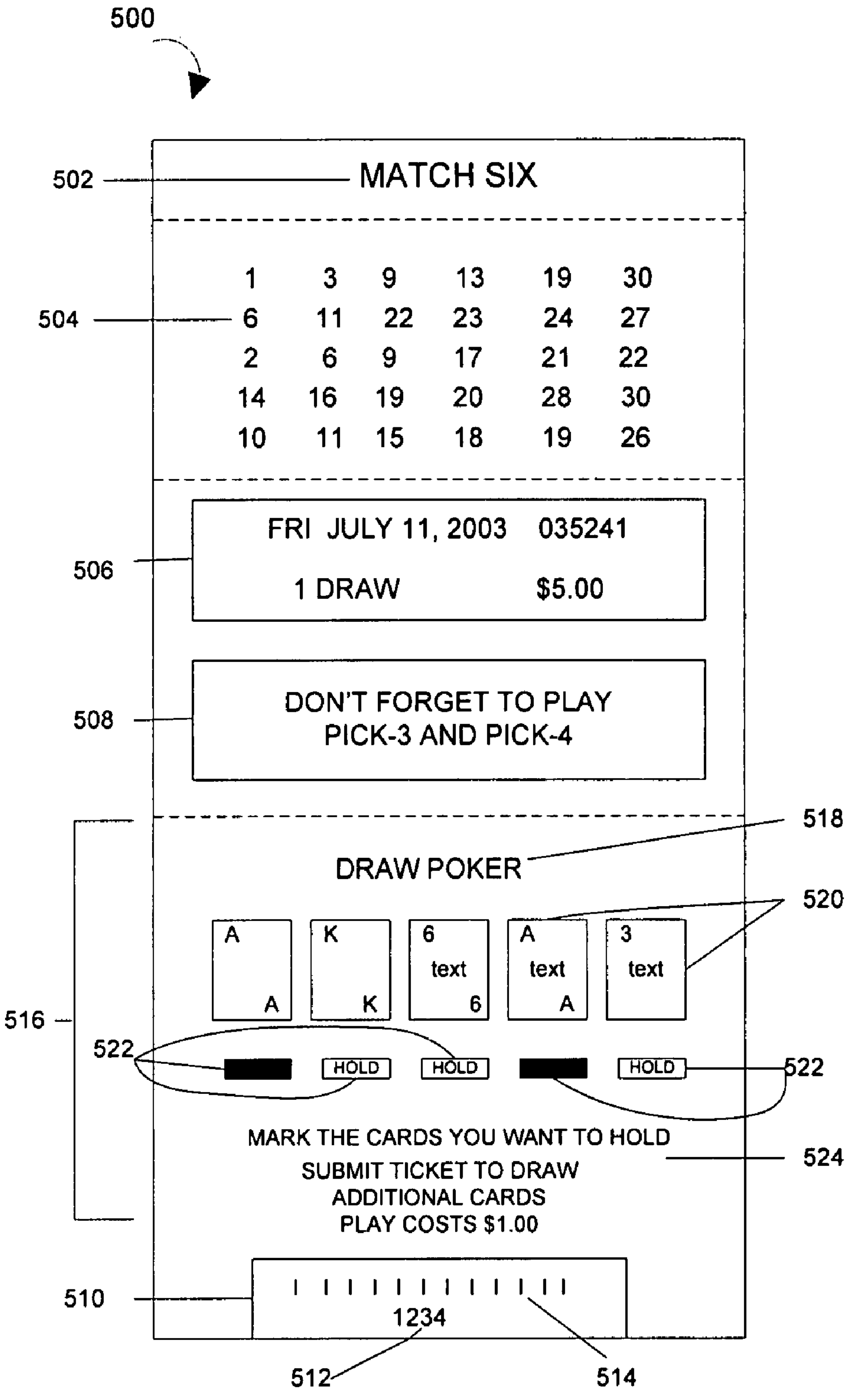
FIG. 7 illustrates an embodiment of a dynamic lottery ticket including a dynamic draw poker game.

In traditional lottery games, the players may have no opportunity to interact with the lottery game once their wager is placed and their lottery ticket, such as lottery ticket 302, is dispensed by the lottery terminal unit 104. In these traditional lottery games, the content of the lottery game tickets and the play slips are typically static, changing infrequently. In order to enhance the players' lottery experience, it may be desired to issue dynamic lottery tickets that may or may not include an entry in a traditional lottery game, including a dynamic lottery game that may allow the player to make selections on the dynamic lottery ticket and redeem the dynamic lottery ticket for determination of a dynamic lottery game outcome. FIG. 7 illustrates one embodiment of a dynamic lottery ticket 500 having a base lottery game and providing an additional dynamic extension draw poker game for the player. The dynamic lottery ticket 500 may include indicia corresponding to the base lottery game similar to the indicia of the lottery ticket 302 of FIG. 4, including title indicia 502, game area indicia 504, status indicia 506, advertising indicia 508, and a coding area 510 including tracking number indicia 512 and graphical code indicia 514. Additionally, the dynamic lottery ticket 500 may include an extension game area 516 having an extension game title indicia 518, one or more extension game symbol indicia 520, corresponding to one or more extension game selection indicia 522, and instruction indicia 524 informing the player how to play the extension game.

In the illustrated embodiment, the extension game may be in the form of a draw poker game wherein the game symbol indicia 520 may be images of five playing cards drawn from a standard deck of 52 playing cards. The poker game may further include a plurality of selection indicia 522 corresponding to the five playing cards 520, with the selection indicia 522 and/or the instruction indicia 524 instructing the player to mark the selection indicia 522 corresponding to the playing cards 520 that the player may desire to hold.

Figure 8:
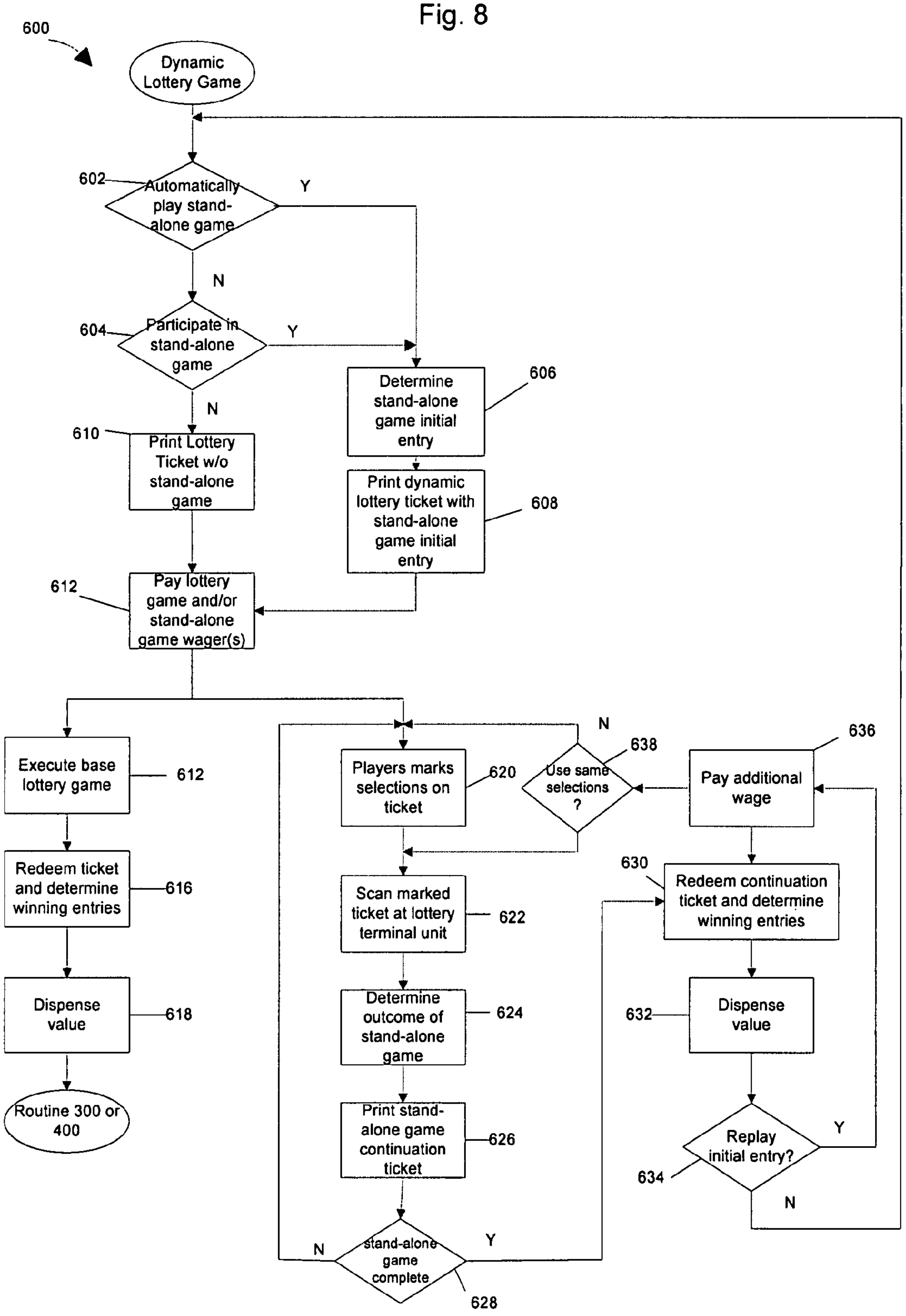
FIG. 8 is a flowchart of an embodiment of a dynamic lottery game routine.

FIG. 8 is a flow chart outlining a sample process flow of a dynamic lottery game that may be played in conjunction with the base lottery game as shown for the dynamic lottery ticket 500 of FIG. 7, or that may be offered separately from any base lottery game as a stand-alone game in a manner described more fully below. Control within the dynamic lottery game routine 600 may pass to a block 602 wherein the dynamic lottery game may be automatically offered to a player when the player enters the base lottery game. If a player has the option of playing or not playing the dynamic lottery game, or where the dynamic lottery game may be offered separately from any base lottery game, control may pass to a block 604 wherein the player may elect to participate in the dynamic lottery game. The lottery network 100 may be configured so that the player may be prompted to elect to participate in the dynamic lottery game by displaying a prompt graphic at the display 128 of the lottery terminal unit 104, or by providing dynamic lottery game election indicia on the play slip for the base lottery game, such as the play slip 300 of FIG. 3, wherein the player may mark an appropriate box on the play slip to indicate the players' election to participate in the dynamic lottery game, or the player may verbally request to participate in the dynamic lottery game.

If the player elects to participate in the dynamic lottery game at block 604, or if the lottery network 100 is configured to automatically provide each player with an entry for the dynamic lottery game along with the players' entry in the base lottery game at block 602, control may pass to a block 606 wherein the lottery network 100 may determine an initial entry for the player for the dynamic lottery game. For example, in the draw poker game illustrated in FIG. 7, the initial entry for the draw poker game may be the five playing cards 520 selected from a standard deck of 52 playing cards and printed on the dynamic lottery ticket 500.

In one embodiment, the initial entry for the dynamic lottery game may be determined at the lottery terminal unit 104 at which the player makes the entry for the base lottery game. In this embodiment, each lottery terminal unit 104 may be programmed with software configured to randomly determine the initial entry for the dynamic lottery game, such as randomly selecting five playing cards out of the 52 playing cards in a standard deck to be printed on the dynamic lottery ticket 500. The lottery terminal unit 104 may also be programmed to create a record corresponding to the players' entry in the base lottery game and/or to the players' initial entry in the dynamic lottery game, and to store the record in the memory 202 of the lottery terminal unit 104, or the memory 138 or database 154 of one of the host computers 134. Alternatively, the host computer 134 may be programmed to determine the initial entries for each player for the dynamic lottery game, to store records for the initial entries in the memory 138 or database 154, and to transmit a copy of the record to the lottery terminal unit 104 at which the player may be placing the entry for the base lottery game for use by the lottery terminal unit 104 in generating and printing the dynamic lottery ticket 500.

Once the initial entry for the dynamic lottery game is determined by the lottery network 100, control may pass to a block 608 wherein a dynamic lottery ticket may be printed at the ticket printer 133 of the lottery terminal unit 104. In the present example, the dynamic lottery ticket 500 may be printed with the players' selections for the base lottery game and with the initial entry for the dynamic lottery draw poker game. The graphical code 514 on the dynamic lottery ticket 500 may contain information about the specific selections for the base lottery game and the initial entry for the dynamic lottery game, or may contain a reference or identifier for a record stored at the lottery terminal unit 104 or host computer 134 corresponding to the base lottery game and/or the dynamic lottery game on the dynamic lottery ticket 500. If the dynamic lottery game is not automatically generated along with the base lottery game entry at block 602, and the player elects not to participate in the dynamic lottery game at block 604, control may pass to a block 610 wherein the lottery terminal unit 104 may print a standard lottery ticket without the dynamic lottery game that may contain information corresponding to the player's entry in the base lottery game.

After a standard lottery ticket is printed at block 610, or a dynamic lottery ticket with the initial entry for the dynamic lottery game is printed at block 608, control may pass to a block 612 wherein the player may pay the necessary wager amounts for the base lottery game and/or the initial entry in the dynamic lottery game. In order to play the dynamic lottery game, the player may be required to pay an additional wager amount for the game at the time the player elects to have the dynamic lottery game print, or to pay a wager when the dynamic lottery ticket 500 is turned in with the player's elections as described further below as indicated in the instruction indicia 524 of the dynamic lottery ticket 500. Alternatively, the dynamic lottery game may be offered along with a base lottery game for no additional wager amount as a bonus game in addition to the base lottery game. When offered in this manner, the prizes for the dynamic lottery game may be funded by a portion of the wagers for the base lottery game in lieu of wagers on the dynamic lottery game.

A base lottery game associated with a dynamic lottery game may be conducted in a similar manner as previously described in lottery routines 350 and 400 of FIGS. 5 and 6, respectively. The base lottery game may be executed at a block 614 wherein, for example, six numbers may be drawn from a predetermined range of numbers from which the numbers in the game area indicia 504 were selected. As with the previous examples, the dynamic lottery ticket 500 may serve as the bearer instrument for the player's entry in the base lottery game, with the dynamic lottery ticket 500 being redeemed at block 616 at one of the lottery terminal units 104 to collect any prize amount for the base lottery game, with the player's entry being evaluated to determine whether the entries in the game area indicia 504 are winning entries for the occurrence for the base lottery game. If the player's entry is determined to be a winning entry at block 616, control may pass to a block 618 wherein value may be dispensed to the player corresponding to the prize amount determined for the winning dynamic lottery ticket 500. After the value is dispensed at block 618, control may return to routine 350 or 400 wherein the player may participate in subsequent occurrences of the base lottery game.

With the dynamic lottery ticket 500 in hand, the player may evaluate the initial entry for the dynamic lottery game and determine which selections, if any, may be made to give the player the best opportunity of winning the dynamic lottery game. Once the player determines which selections to make for the dynamic lottery game, the player may mark the corresponding selection indicia 522 on the dynamic lottery ticket 500 at block 620. For example, in the draw poker game on the dynamic lottery ticket 500, the player may elect to hold one or more of the five playing cards 520 to hold, and to discard the remaining playing cards 520 in favor of replacement playing cards drawn from the remaining cards in the deck. As shown in FIG. 7, the player may elect to hold the ace of diamonds and the ace of hearts, and may indicate that selection by marking the corresponding hold boxes 522, while leaving unmarked the hold boxes 522 corresponding to the king of spades, six of spades and three of diamonds.

After the player marks the selections on the dynamic lottery ticket 500, the dynamic lottery ticket 500 may be scanned at the ticket reader 132 of a lottery terminal 104 at block 622. When the dynamic lottery ticket 500 is scanned, the ticket reader 132 may decode the information stored in the graphical code 514 and detect the marks made by the player at the marked selection indicia 522. As previously discussed, the graphical code 514 may contain information identifying the player's entries for the base lottery game and the initial entry for the dynamic lottery game, or may store a reference or identifier corresponding to a record for the dynamic lottery ticket 500 stored at a lottery terminal unit 104 and/or a host computer 134. Once the information for the player's initial entry for the dynamic lottery game is retrieved from the graphical code 514 or from a stored record, the initial entry for the dynamic lottery game and the player's marked selections may be used to determine the outcome of the dynamic lottery game at a block 624.

As with the determination of the initial entry for the dynamic lottery game, software for determining the outcome of the dynamic lottery game may be stored either at the lottery terminal unit 104 or at the host computer 134. Regardless of where the dynamic lottery game determination software may be stored, the software may be configured to use the player's selections in combination with the initial entry for the dynamic lottery game to determine the outcome of the dynamic lottery game. In the present example of the draw poker game, the software may be configured to retain the ace of diamonds and ace of hearts based on the player's marking of the hold boxes 522 corresponding to those cards, and to randomly select three additional playing cards from the remaining 47 playing cards in the standard poker deck. Depending on the implementation, the game determination software may be configured to randomly select the replacement playing cards such that the odds of completing a particular hand may correspond to the odds of making the hand in a real draw poker game or, if it is desired to have a predetermined number of winning outcomes, the software may be configured to randomly select an outcome from a pool of available dynamic lottery game outcomes subject to a probability distribution, and to reverse map a particular poker hand corresponding to the selected outcome and including the held cards. Alternatively, the dynamic lottery game determination software may be configured in any manner desired for determining the outcome of the particular dynamic lottery game to achieve a desired payout rate for the dynamic lottery game.

Figure 9:
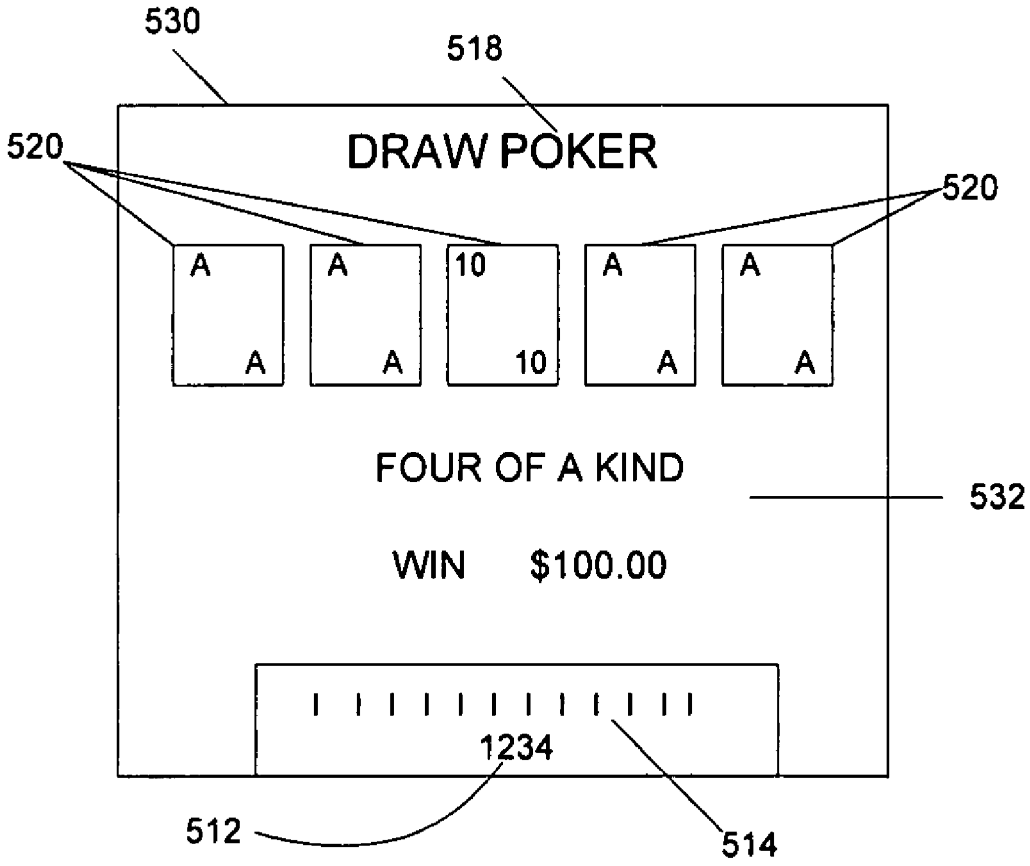
FIG. 9 illustrates an embodiment of a continuation ticket corresponding to the dynamic lottery ticket of FIG. 7.

Once the outcome for the dynamic lottery game is determined, a dynamic lottery game continuation ticket may be printed and dispensed to the player at a block 626. For example, as illustrated in FIG. 9, a continuation ticket 530 corresponding to the draw poker game of the dynamic lottery ticket 500 may be printed with the outcome of the dynamic lottery draw poker game, and may include title indicia 518, game symbol indicia 520 depicting the retained playing cards along with the newly drawn playing cards, outcome indicia 532 that may inform the player of the outcome of the dynamic lottery game and any corresponding prize amount, and a tracking number 512 and graphical code 514 corresponding to the player's entry in the dynamic lottery game. In the illustrated example, the playing cards 520 on the continuation ticket 530 may include the ace of diamonds and ace of hearts selected by the player to be held, and an ace of clubs, ten of diamonds and ace of spades that may have been drawn by the outcome determination software at block 624. As indicated by the outcome indicia 532, the player's resulting hand is four of a kind and corresponds to a dynamic lottery game prize amount of $100. The prize amount for the dynamic lottery game may be determined from a predetermined prize table associating prize amounts with particular poker hands, may reflect a progressive jackpot amount corresponding to a particular poker hand, may be associated with the winning outcome selected from a predetermined pool of outcomes as previously described, or may be determined by any other prize determining method known, by those skilled in the art. As with the graphical code 514 of the dynamic lottery ticket 500, the graphical code 514 of the continuation ticket 530 may contain information about the outcome of the dynamic lottery game and any associated prize amount, or may contain reference information corresponding to a record for the dynamic lottery game stored at the lottery terminal unit 104 or host computer 134.

Figure 10:
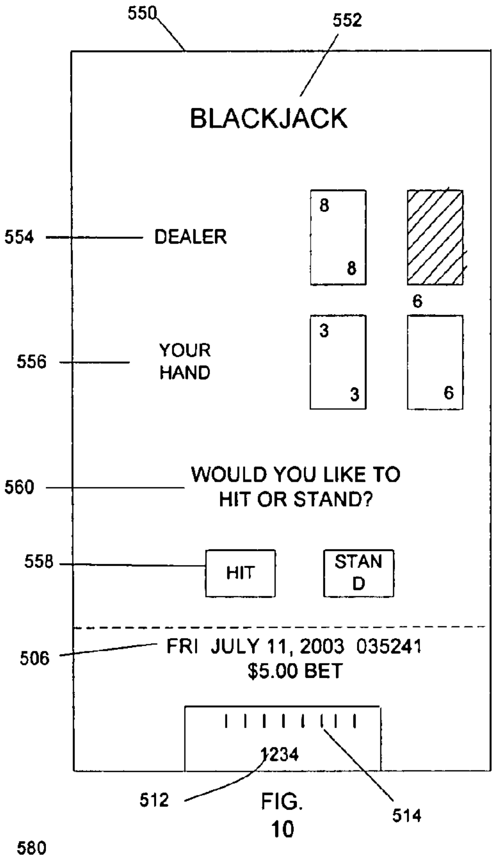
FIG. 10 illustrates an alternative embodiment of a dynamic lottery ticket including a dynamic blackjack game.
Figure 11:
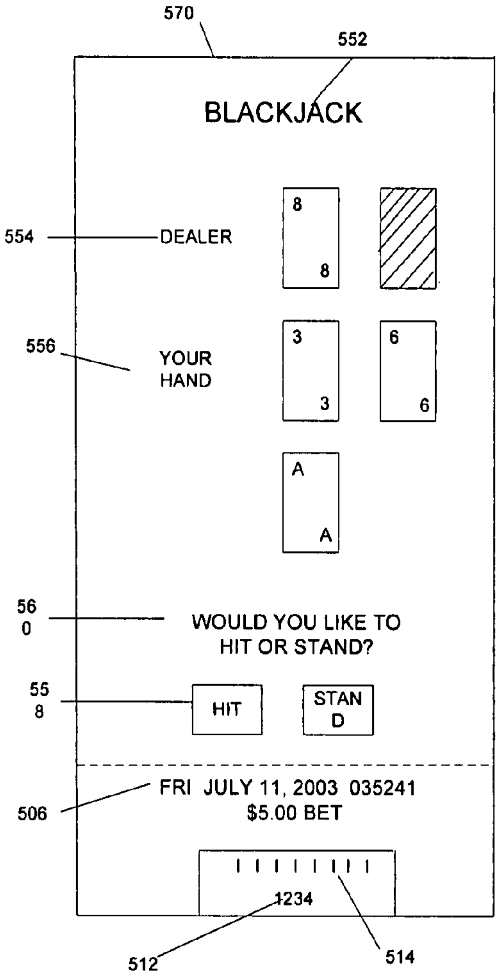
FIG. 11 illustrates an embodiment of a first dynamic lottery continuation ticket corresponding to the dynamic lottery ticket of FIG. 10.
Figure 12:
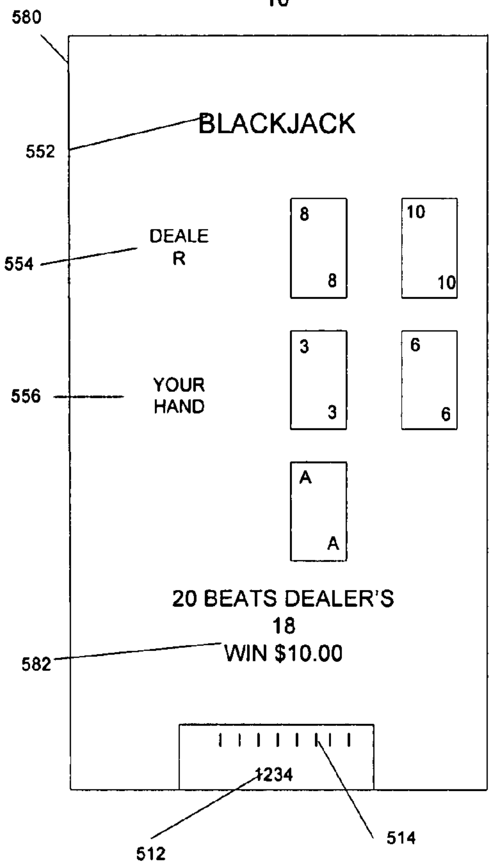
FIG. 12 illustrates an embodiment of a second continuation ticket corresponding to the dynamic lottery ticket of FIG. 10.

Once the dynamic lottery ticket 500 is scanned, the outcome of the dynamic lottery game determined, and the continuation ticket 530 is dispensed, the dynamic lottery game may be complete. In some implementation, it may be desired to dispense any prize amount for the dynamic lottery game at this time, with the continuation ticket serving as the player's receipt for the dynamic lottery game. However, depending on the dynamic lottery game and the implementation, the player may have the opportunity to make additional selections and continue playing the dynamic lottery game to arrive at a final outcome. For example, FIGS. 10-12 illustrate an alternative dynamic lottery blackjack game that may be played as a stand-alone game independent of a base lottery game. Referring to FIG. 10, a dynamic lottery game ticket 550 for the blackjack game may include status indicia 506, tracking number indicia 512 and graphical code indicia 514 as previously described along with title indicia 552 identifying the dynamic lottery game, game symbol indicia including playing cards 554 representing a dealer's hand and playing cards 556 representing the player's hand, selection indicia 558, and instruction indicia 560. In the blackjack game, the dealer may be dealt one playing card 554 face up and one playing card 554 face down, while the player may be dealt two playing cards 556 face up. The player may have the option to hit and have another card drawn for the player's hand or stand on the cards that have been dealt. In the present example, with the player having been dealt a total of nine and the dealer having an eight showing, the player may elect to hit by marking the hit box 558 at block 620.

The dynamic blackjack ticket 550 may be scanned at a lottery terminal unit 104, and the graphical code 514 may be used to retrieve information corresponding to the initial entry for the blackjack game at block 622 so that the blackjack game outcome determination software may determine an outcome for the blackjack game. The blackjack outcome determination software may use the initial entry for the blackjack game along with the player's selection to hit to randomly select one of the remaining 48 playing cards from a standard deck of cards to add to the player's hand.

After the additional playing card is selected, a first dynamic continuation ticket 570 may be printed by the ticket printer 133 and dispensed by the lottery terminal unit 104 at block 626. The first dynamic continuation ticket 570 may include similar information as the dynamic lottery game ticket 550, but may further include the additional playing card 556 drawn for the player's hand. The first dynamic continuation ticket 570 may offer the player the opportunity to either hit and draw a further card, or to stand with the player's current hand. For the blackjack game, the dynamic lottery game may not be completed until the player either busts, i.e., exceeds a total of 21, or stands. Because the blackjack game may not be complete at block 628 of FIG. 8, control may pass back to block 620 wherein the player may mark either the HIT box 558 or the STAND box 558 to enter a further selection in the blackjack game. In this example, the player may elect to stand with a total of 20 by marking the stand box 558 and having the first dynamic continuation ticket 570 scanned at one of the lottery terminals unit 104.

The final outcome of the blackjack game may be determined at block 624 wherein the outcome determination software may complete the dealers' hand based on predetermined rules for completing the dealers' hand that may require the dealer either to stand with a particular total or to draw additional cards. Once the outcome is determined at block 626, a second continuation ticket 580 may be printed by the ticket printer 133 and dispensed by the lottery terminal unit 104. The second continuation ticket 580 may include similar information as the original dynamic lottery game ticket 550 and the first dynamic continuation ticket 570, including the completed dealer's hand as illustrated by the playing cards 554. The second continuation ticket 580 may further include outcome indicia 582 that may inform the player of the outcome of the blackjack game, along with any prize amount associated with the outcome of the blackjack game.

The draw poker continuation ticket 530 of FIG. 9 and the second continuation ticket 580 of FIG. 12 may represent completed occurrences of the corresponding dynamic lottery games at block 628, and consequently may represent the bearer instruments that may be redeemed at block 630 for the player to claim any prize amounts associated with the outcome of the dynamic lottery game. When the continuation tickets 530, 580 are redeemed, the continuation tickets 530, 580 may be scanned at the ticket reader 132 of one of the lottery terminal units 104, with the graphical code 514 being used to retrieve information relating to the corresponding occurrence of the dynamic lottery game. The information for the occurrence of the dynamic lottery game may be used to determine any prize amount won by the player and to dispense value corresponding to any prize amount won by the player at block 632.

With the redemption of the continuation tickets 530, 580, the occurrence of the dynamic lottery game may be concluded, the continuation tickets 530, 580 may be voided and any corresponding records stored in the lottery network 100 may be updated to indicate that any prize amounts won in the dynamic lottery game have been dispensed. However, it may be desired to allow a player to wager on multiple occurrences of the dynamic lottery game using the same initial entry for the dynamic lottery game. In such implementations the player may, for an additional wager, replay the dynamic lottery game using the same initial entry. If the player does not desire to replay the dynamic lottery game at block 634, control may pass back to block 602 wherein the player may elect to play the dynamic lottery game with a new initial entry. If the player elects to replay the dynamic lottery game using the same initial entry, control may pass to a block 636 wherein the player may pay an additional wager to play the dynamic lottery game. If the player opts to use the same selections previously marked on the dynamic lottery ticket 500, 550 at block 638, control may pass back to block 622 wherein the dynamic lottery ticket 500, 550 may be scanned with the previous selections. If the player elects to change the selections on the dynamic lottery ticket 500, 550, control may pass to block 620 wherein the player may change the marks on the dynamic lottery tickets 500, 550 to reflect the player's newly desired selections. In either case, the game may proceed in a similar manner as previously described, and with the player having the option of replaying the initial entry multiple times.

Figure 13:
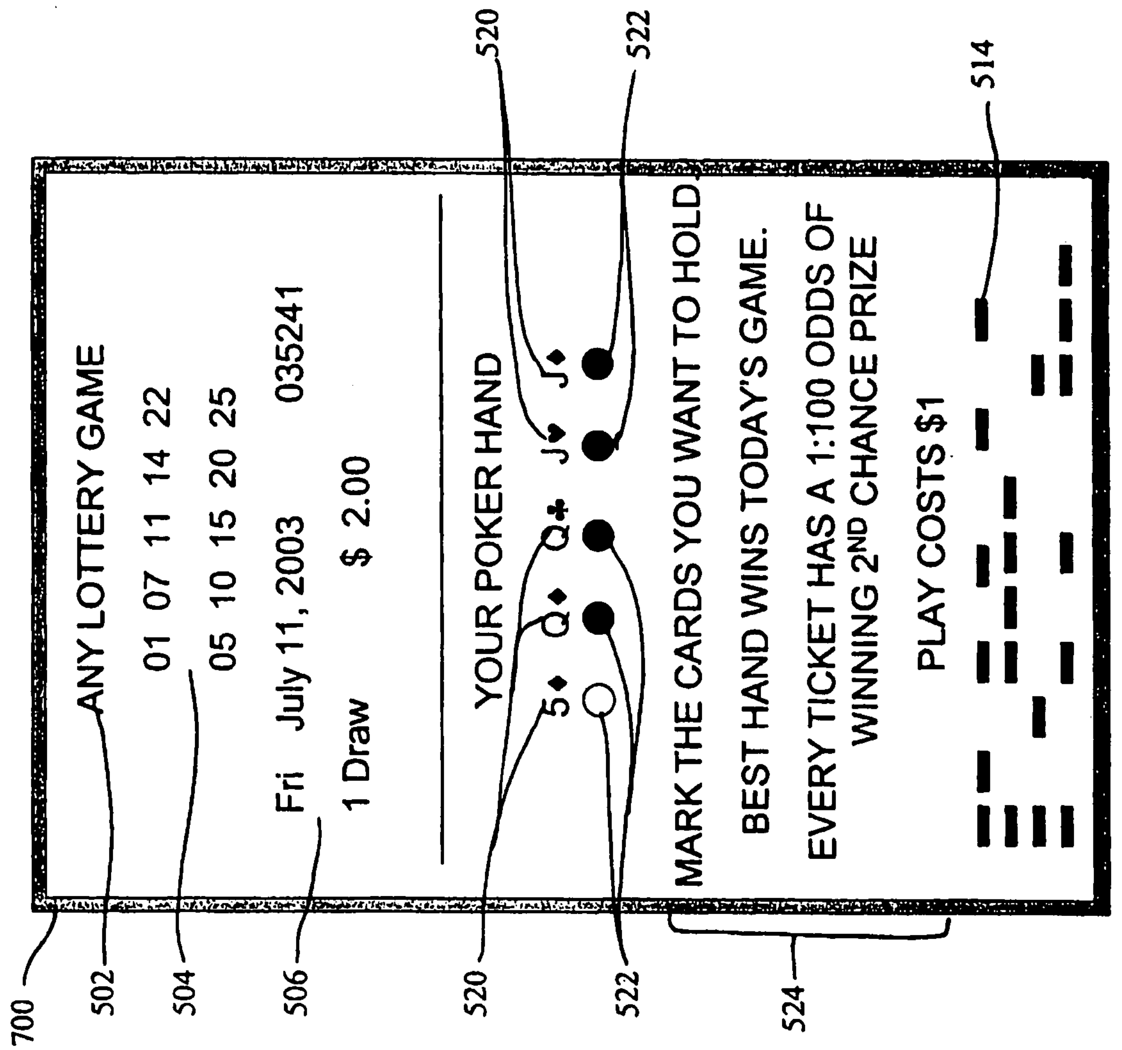
FIG. 13 illustrates an alternative embodiment of a dynamic lottery ticket including an alternative dynamic draw poker game.
Figure 14:
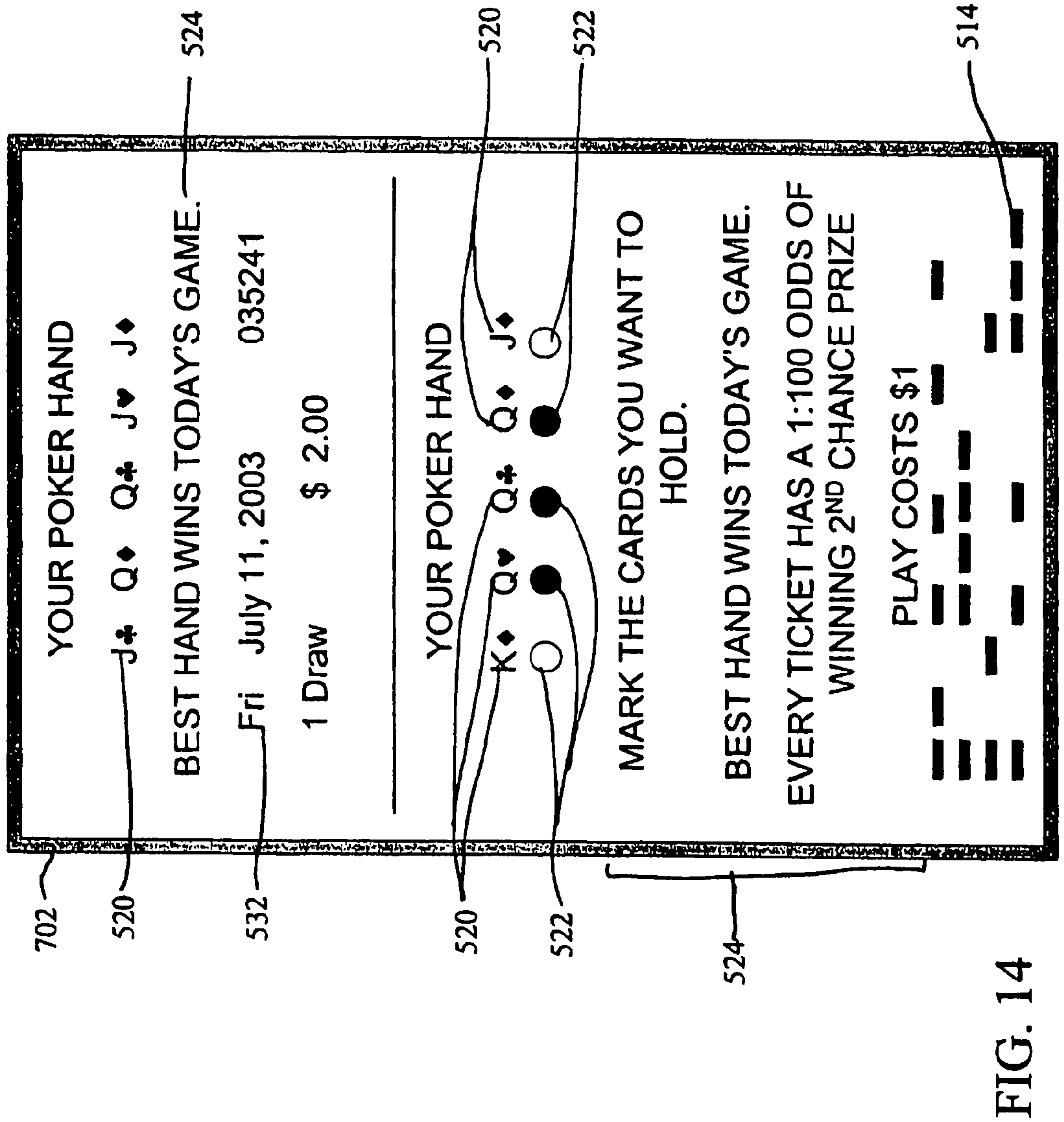
FIG. 14 illustrates an embodiment of a dynamic lottery continuation ticket corresponding to the lottery ticket of FIG. 13.

FIGS. 13 and 14 illustrate an alternative embodiment of a dynamic lottery draw poker game wherein any prize amount won for the draw poker is determined based on a comparison of the draw poker game entries for all players for a given day. Referring to FIG. 13, the dynamic lottery ticket 700 may be similar to the dynamic lottery ticket 500 of FIG. 7 with the same reference numerals corresponding to similar elements in both drawing figures. The draw poker game may include an initial entry having five playing cards 520 drawn form a standard deck of 52 playing cards, with the player marking the selection indicia 522 corresponding to the playing cards 520 the player may wish to hold. As may be noted in the instruction indicia 524, a prize amount may be awarded to the dynamic lottery draw poker game entries having the best hand for a given day. The dynamic lottery game routine 600 may proceed as described above for the draw poker game. At block 630, the lottery network 100 may determine winning entries by evaluating the stored records for the draw poker game entries for the corresponding day to determine which entry or entries may have the best poker hand on that day. The evaluation may be performed by software stored at one of the host computers 134, or by software stored at the lottery terminal units 104. After the draw poker game entries for a given day have been evaluated and the winning entry or entries have been determined, the draw poker game entry for continuation ticket 702 may be compared to the winning poker entries for the day to determine whether the entry on the continuation ticket 702 is one of the best hands for that day's occurrence of the draw poker game. If the draw poker game entry of the continuation ticket 702 is one of the best hands for that day, the player may receive a corresponding prize amount, which may be a fixed prize amount based on the poker hand, a share of a prize jackpot that may be divided equally between all entries having the best hand for the given day, or a prize amount determined in any other manner to achieve a desired payout rate for the dynamic lottery draw poker game.

FIGS. 13 and 14 illustrate a further alternative embodiment of a dynamic lottery game wherein a further initial entry for the dynamic lottery game may be provided on a dynamic continuation ticket 702 in lieu of allowing a player to replay the initial entry on the dynamic lottery ticket 700 multiple times. As illustrated in FIG. 14, the dynamic continuation ticket 702 may include game symbols 520, an outcome indicia 532 corresponding to the initial entry for the draw poker game from the dynamic lottery ticket 700, along with game symbol indicia 520, selection indicia 522, and instruction indicia 524 corresponding to a second initial entry for the draw poker game. After the dynamic lottery ticket 700 is scanned at block 622, and in addition to determining the outcome of the dynamic lottery game at block 624, the lottery terminal unit 104 or host computer 134 may determine a second dynamic lottery game initial entry as previously described at block 606, and print the second dynamic lottery game initial entry on the continuation ticket 702 in addition to the outcome of the first initial entry for the dynamic lottery game. If the player wishes to play an additional draw poker hand, the player may mark the selection indicia 522 on the dynamic continuation ticket 702, have the dynamic continuation ticket 702 scanned at a lottery terminal unit 104, and have a second dynamic continuation ticket 702 print out with the outcome of the draw poker game corresponding to the second initial entry for the draw poker game.

In this embodiment, the dynamic continuation ticket 702 displaying the outcome of a given draw poker hand may serve as the bearer instrument for that occurrence of the dynamic lottery game, with the dynamic continuation ticket 702 being redeemed at a lottery terminal unit 104 to claim any prize award associated with the outcome of the occurrence of the dynamic lottery game. Moreover, when the dynamic lottery ticket 700 and/or dynamic continuation ticket 702 is scanned to determine an outcome of the dynamic lottery game, the corresponding record for the dynamic tickets 700 or 702 stored in the lottery network 100 may be updated to indicate that the ticket 700 or 702 has been scanned for an occurrence of the dynamic lottery game and may no longer be valid for replaying the initial entry for the dynamic lottery game to determine subsequent outcomes of the dynamic lottery game.

Figure 15:
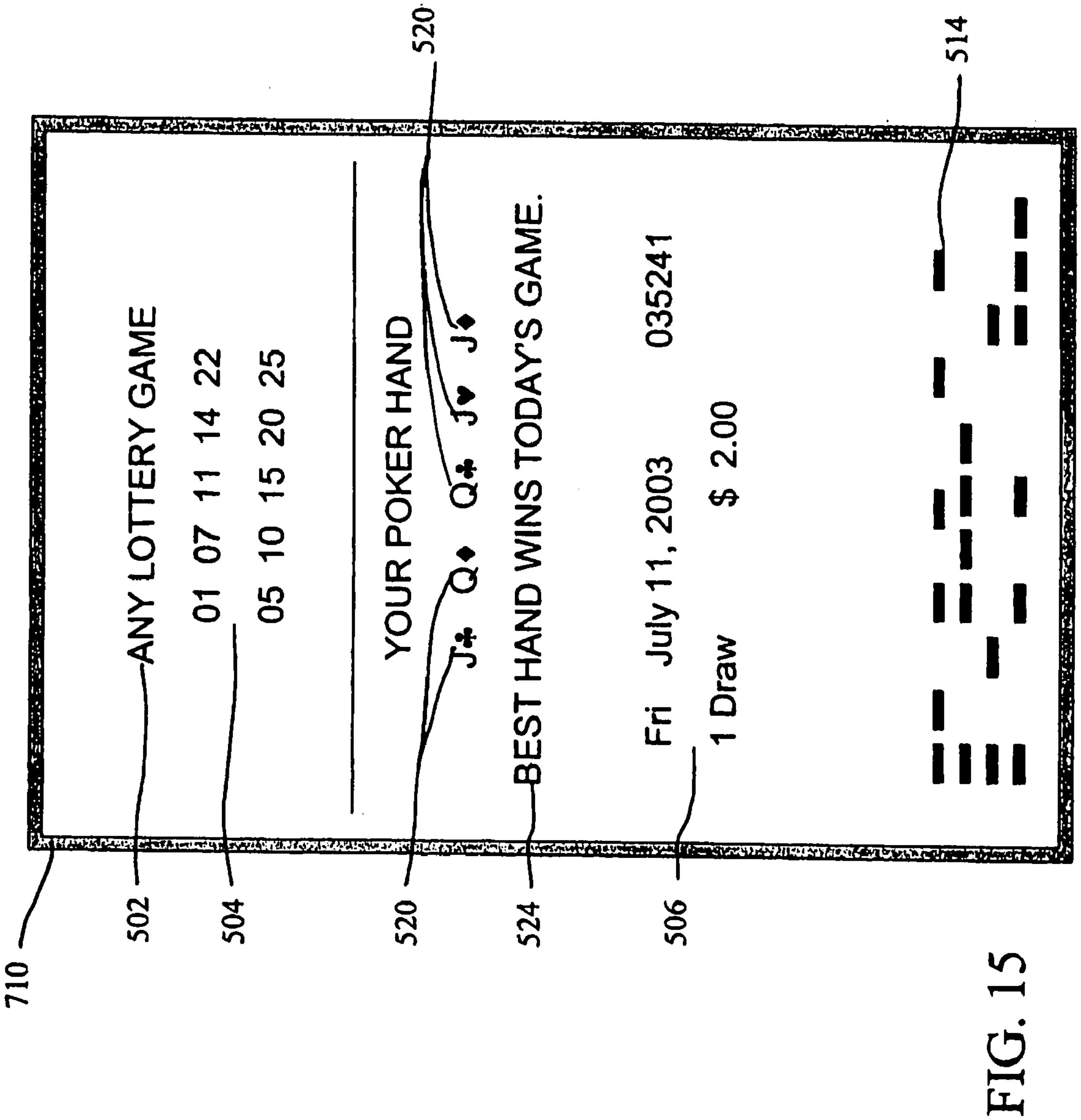
FIG. 15 illustrates an alternative embodiment of a continuation ticket corresponding to the dynamic lottery ticket of FIG. 13.
Figure 17:
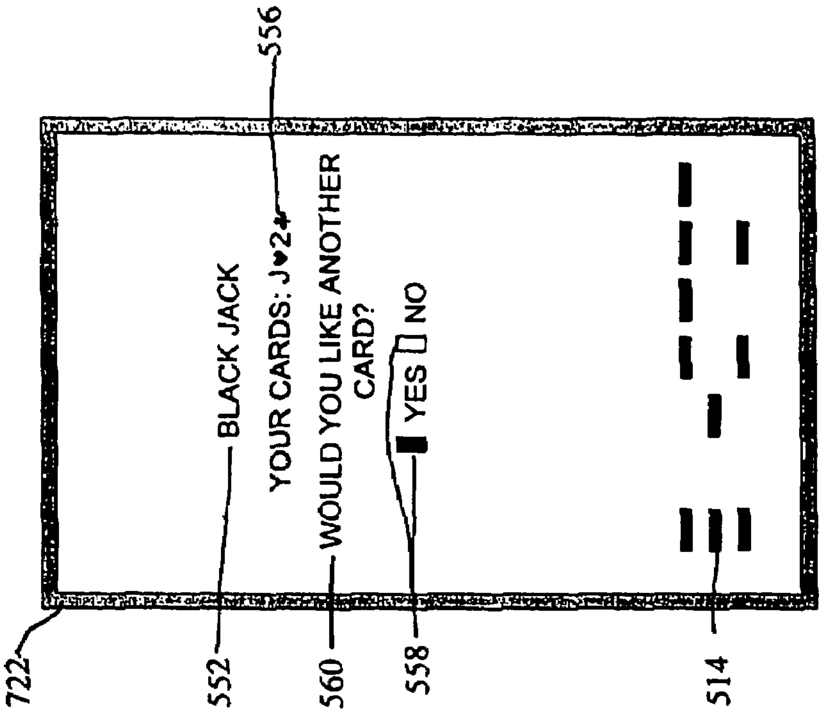
FIG. 17 illustrates an embodiment of a first dynamic lottery continuation ticket corresponding to the dynamic lottery ticket of FIG. 16.

FIG. 15 illustrates a further alternative embodiment wherein a continuation ticket 710 may serve as the bearer instrument for both the base lottery game and the dynamic lottery game for the player. The continuation ticket 710 may be printed with title indicia 502, game area indicia 504, and status indicia 506 corresponding to the base lottery game, along with game symbol indicia 520 for the corresponding outcome of the dynamic lottery game played by the player. In order to prevent players from redeeming multiple tickets for the same base lottery game entry and, consequently, claiming multiple base game lottery prizes to which they may not be entitled, the original dynamic lottery ticket 700 may not be returned to the player, or the stored record corresponding to the original dynamic lottery ticket 700 may be updated to indicate that the original dynamic lottery ticket 700 may be void and that a player should not be permitted to redeem the original dynamic lottery ticket 700 to claim a prize for the base lottery game. Instead, any prize awarded for the base lottery game may be dispensed to the player along with any prize award corresponding to the outcome of the dynamic lottery game outcome of the continuation ticket 710 when the player redeems the continuation ticket 710.

Figure 16:
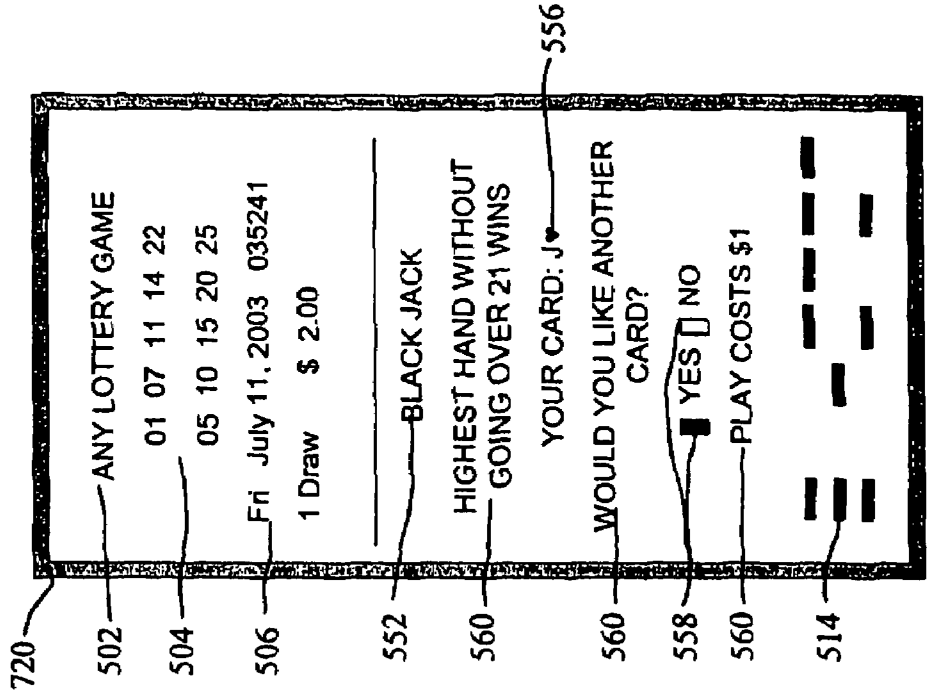
FIG. 16 illustrates a further alternative embodiment of a dynamic lottery ticket including an alternative dynamic blackjack game.

FIGS. 16-19 illustrate an alternative embodiment of a dynamic lottery blackjack game played along with a base lottery game. Referring to FIG. 16, a dynamic lottery ticket 720 may include title indicia 502, game area indicia 504, status indicia 506, and graphical code indicia 514 as previously described for a base lottery game, along with title indicia 552, player game symbol indicia 556, selection indicia 558, and instruction indicia 560 for the dynamic lottery blackjack game. In this embodiment of the blackjack game, instead of playing against a dealer, the players may be competing to achieve the highest hand without going over 21 for the blackjack game outcomes for a given day. The player may indicate a selection to draw another card by marking the YES box 558 of the dynamic lottery ticket 720. When the dynamic lottery ticket 720 is scanned at a lottery unit terminal 104, the blackjack games outcome determination software may randomly select one of the remaining playing cards from a standard deck of cards, and the lottery terminal unit 104 may print a first dynamic continuation ticket 722 illustrating the player's hand updated with the additional playing card 556, and providing additional selection indicia 558 to allow the player to either draw an additional card or to stand on the player's current hand.

Figure 19:
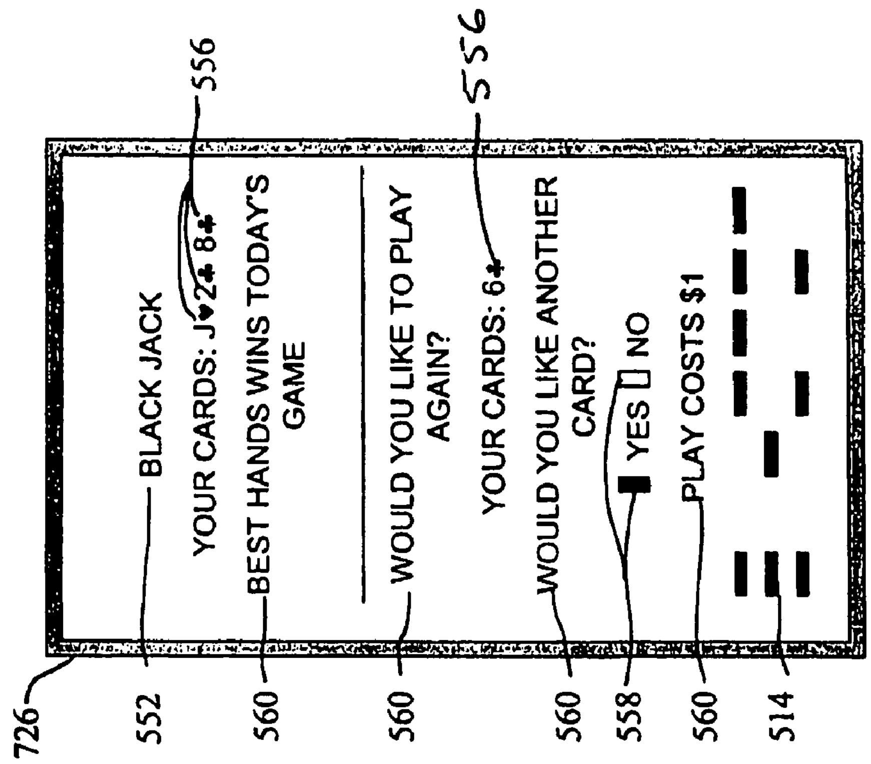
FIG. 19 illustrates an embodiment of a third dynamic lottery continuation ticket corresponding to the dynamic lottery ticket of FIG. 16.
Figure 18:
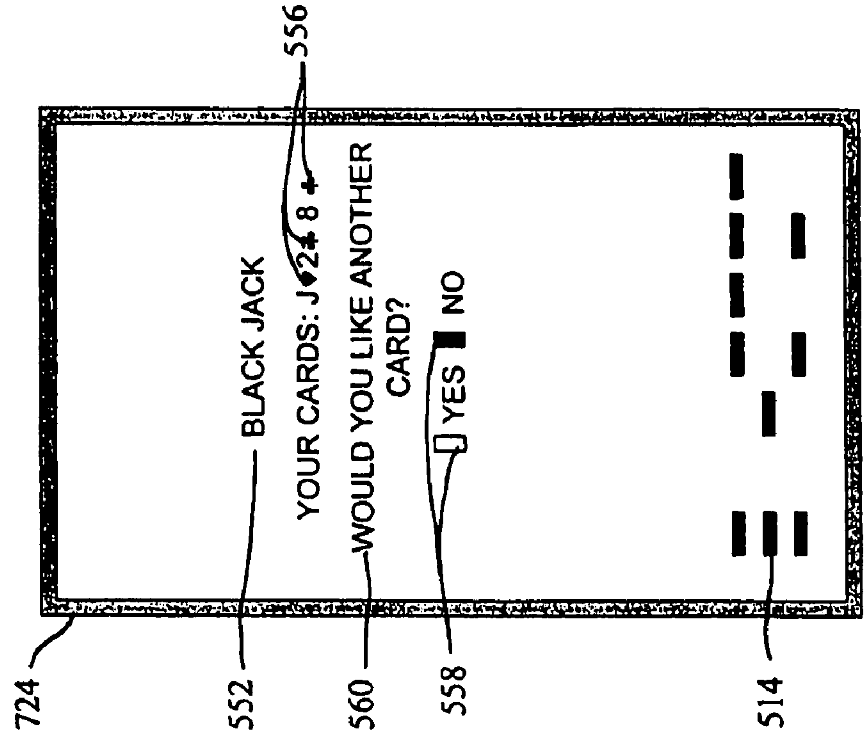
FIG. 18 illustrates an embodiment of a second dynamic lottery continuation ticket corresponding to the dynamic lottery ticket of FIG. 16.

If the player elects to draw again as indicated by the marked YES box 558 on the first continuation ticket 722, the blackjack game outcome determination software may randomly select an additional playing card from the remaining cards in the standard deck and print the player's updated hand on a second dynamic continuation ticket 724. If the player elects to stand on the current hand, the player may mark the corresponding selection box 558 to complete the occurrence of the dynamic lottery blackjack game. When the second dynamic continuation ticket 724 is scanned in a lottery terminal unit 104, the stored record corresponding to the player's entry in the dynamic lottery blackjack game may be updated with information reflecting the final hand for the player for the occurrence of the dynamic lottery blackjack game, and the ticket printer 133 of the lottery terminal unit 104 may print a third continuation ticket 726 as shown in FIG. 19. At the end of a give day, the lottery network 100 may be configured to evaluate each of the records for the dynamic lottery blackjack game for that day to determine which entry or entries is closest to 21 without going over. The lottery network 100 may update the stored records for each winning entry to indicate that a prize amount should be paid when the corresponding third continuation ticket 726 is redeemed, or may be stored in a separate file of records for winning entries for the dynamic lottery blackjack game. When the third continuation ticket 726 is redeemed, the player may receive a corresponding prize award if the corresponding record has been identified by the lottery network 100 as a winning entry.

Figure 21:
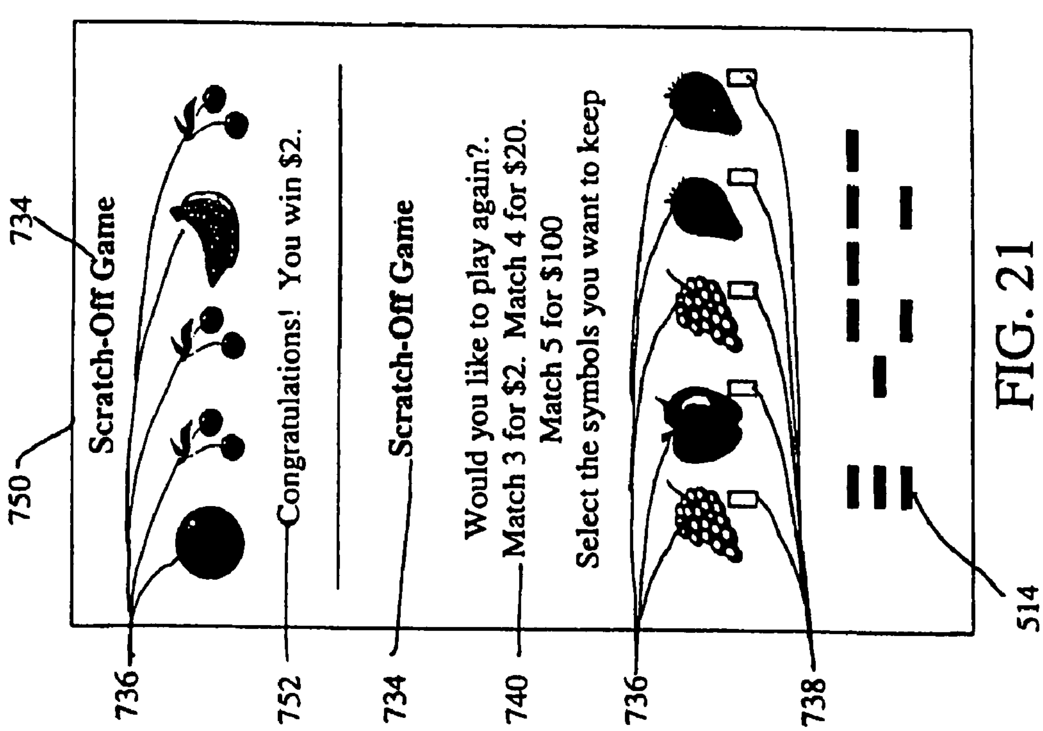
FIG. 21 illustrates an embodiment of a dynamic lottery continuation ticket corresponding to the dynamic lottery ticket of FIG. 20.
Figure 20:
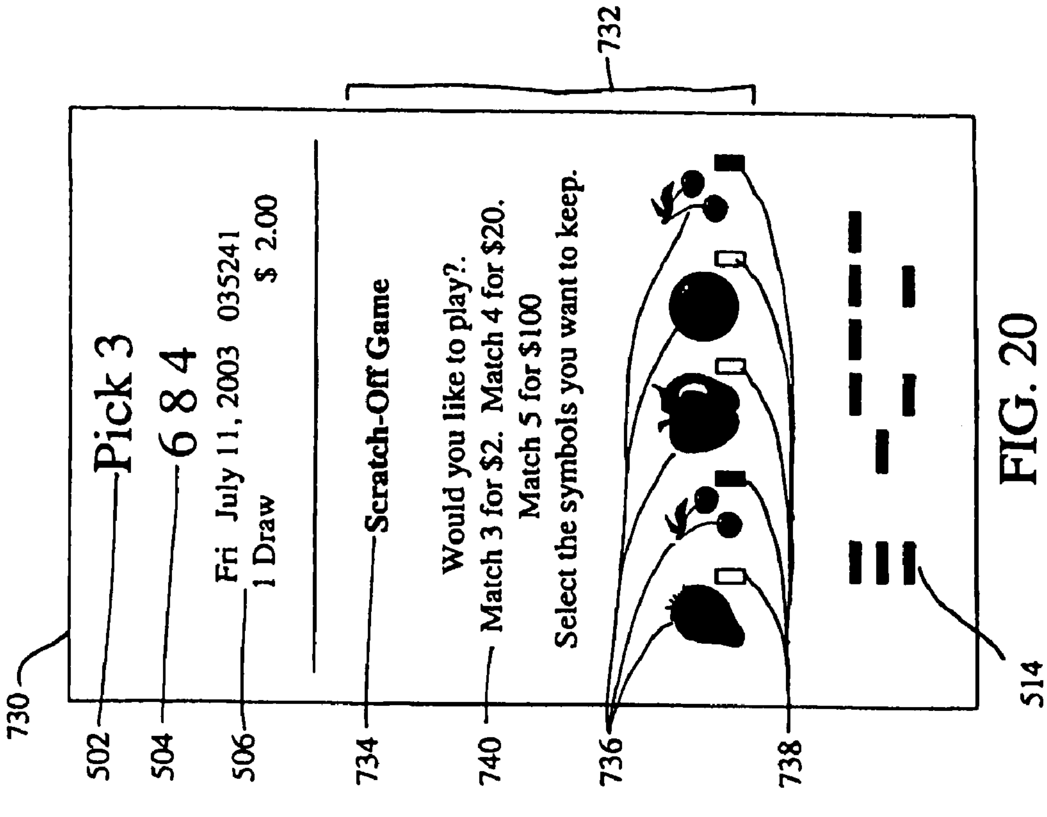
FIG. 20 illustrates an additional alternative embodiment of a dynamic lottery ticket including a dynamic scratch-off theme game.

In addition to card games as shown in the preceding embodiments, the dynamic lottery games may be any type of game that may be offered independently or in combination with a traditional base lottery game. The dynamic lottery tickets may offer games with scratch off themes, niche games, and the like. For example, FIGS. 20 and 21 illustrate an embodiment of a dynamic lottery scratch-off game in combination with a base Pick-3 lottery game. Referring to FIG. 20, a dynamic lottery ticket 730 may be similar to the dynamic lottery ticket 500 of FIG. 7 with the same reference numerals corresponding to similar indicia for the base lottery game in both drawing figures, including title indicia 502, game area indicia 504, status indicia 506 and graphical code indicia 514. In the illustrated embodiment, the scratch-off game, which may be depicted on the dynamic lottery ticket 730 by scratch-off game indicia 732, such as title indicia 734, game symbol indicia 736, selection indicia 738 and instruction indicia 740, may be similar to the previously-described draw poker game wherein a plurality of symbols may be selected for the player's initial entry, and the player may elect to hold certain symbols and discard the remaining symbols in favor of additional symbols in order to match predetermined combinations of winning symbols. As may be noted in the instruction indicia 740, a prize amount may be awarded to the dynamic lottery scratch-off entries matching three, four or five symbols.

The dynamic lottery game routine 600 may proceed as described above for the draw poker game, with the player marking the selection indicia 738 corresponding to the fruit symbols 736 that the player elects to hold. When the dynamic lottery ticket 730 is scanned by a lottery terminal unit 104 at block, the lottery network 100 may determine the outcome of the scratch-off game by selecting fruit symbols to replace the discarded fruit symbols 736 from the initial entry. The replacement fruit symbols may be randomly selected from the remaining available symbols, may be reverse mapped to a combination of fruit symbols corresponding to a randomly selected outcome from a pool of outcomes, or determined by any other desired method for determining the outcome of the scratch-off game. After the outcome is determined, the lottery terminal unit 104 may print and dispense a continuation ticket, such as the continuation ticket 750 of FIG. 21.

The continuation ticket 750 may function as the bearer instrument for the scratch-off game, and may include title indicia 734, game symbol indicia 736, outcome indicia 752, and graphical code indicia 514 corresponding to the player's entry in the scratch-off game. The continuation ticket 750 may be redeemed at a lottery terminal unit 104 and evaluated to determine whether the player's entry is a winning entry at block 630. A further initial entry for the dynamic lottery scratch-off game may also be provided on the dynamic continuation ticket 750 in lieu of allowing a player to replay the initial entry on the dynamic lottery ticket 730 multiple times. As illustrated in FIG. 21, the dynamic continuation ticket 750 may include title indicia 734, game symbols 736, selection indicia 738, and instruction indicia 740 corresponding to a second initial entry for the scratch-off game in addition to indicia corresponding to the first outcome of the scratch-off game. After the dynamic lottery ticket 730 is scanned at block 622, and in addition to determining the outcome of the dynamic lottery scratch-off game at block 624, the lottery terminal unit 104 or host computer 134 may determine the second dynamic lottery game initial entry as previously described at block 606, and print the second dynamic lottery game initial entry on the dynamic continuation ticket 750 in addition to the outcome of the first initial entry for the dynamic lottery game. If the player wishes to play an additional scratch-off game, the player may mark the selection indicia 738 on the dynamic continuation ticket 750, have the dynamic continuation ticket 750 scanned at a lottery terminal unit 104, and have a second dynamic continuation ticket 750 print out with the outcome of the scratch-off game corresponding to the second initial entry for the scratch-off game.

Figure 22:
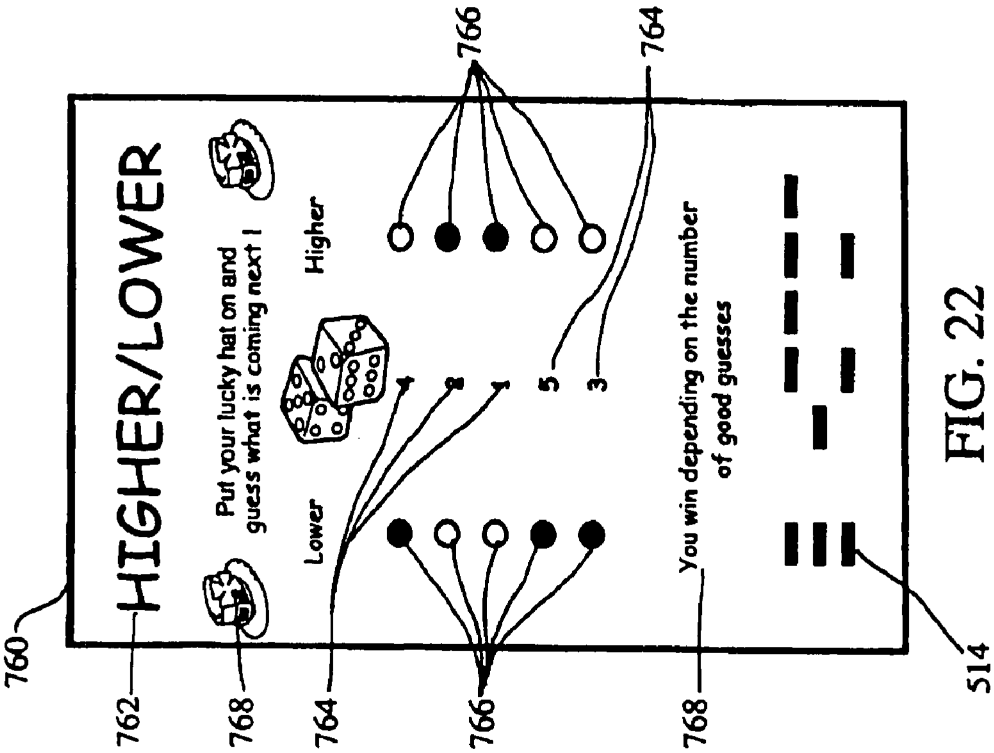
FIG. 22 illustrates a still further alternative embodiment of a dynamic lottery ticket including an alternative dynamic scratch-off theme game.
Figure 23:
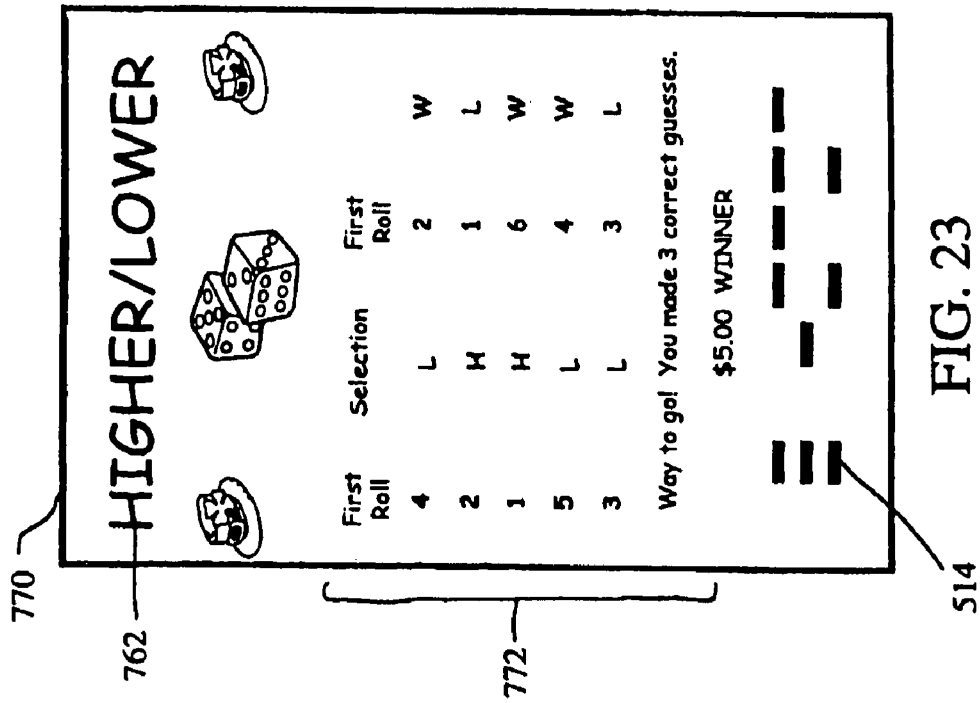
FIG. 23 illustrates an embodiment of a continuation ticket corresponding to the dynamic lottery ticket of FIG. 22.

Another embodiment of a dynamic scratch-off game is illustrated in FIGS. 22 and 23. In this embodiment, the dynamic scratch-off game may be in the form of a dice game wherein a series of numbers corresponding to rolled numbers for a die are listed, and the player may select whether a corresponding further roll of the die may have a higher or lower value than the listed number. The player may win the dynamic scratch-off game based on the number of selections correctly predicting the relative value of the further roll with respect to the original number. The dynamic lottery ticket 760 of FIG. 22 may have information printed thereon corresponding to the scratch-off game, including title indicia 762, game symbol, indicia 764, selection indicia 766, instruction indicia 768, and graphical code indicia 514, and the continuation ticket 770 may have information printed thereon corresponding to the selections on the dynamic lottery ticket 760, including title indicia 762, graphical code indicia 514, and outcome indicia 772 indicating the outcome of the dynamic scratch-off game and the amount of any corresponding prize award.

Figure 25:
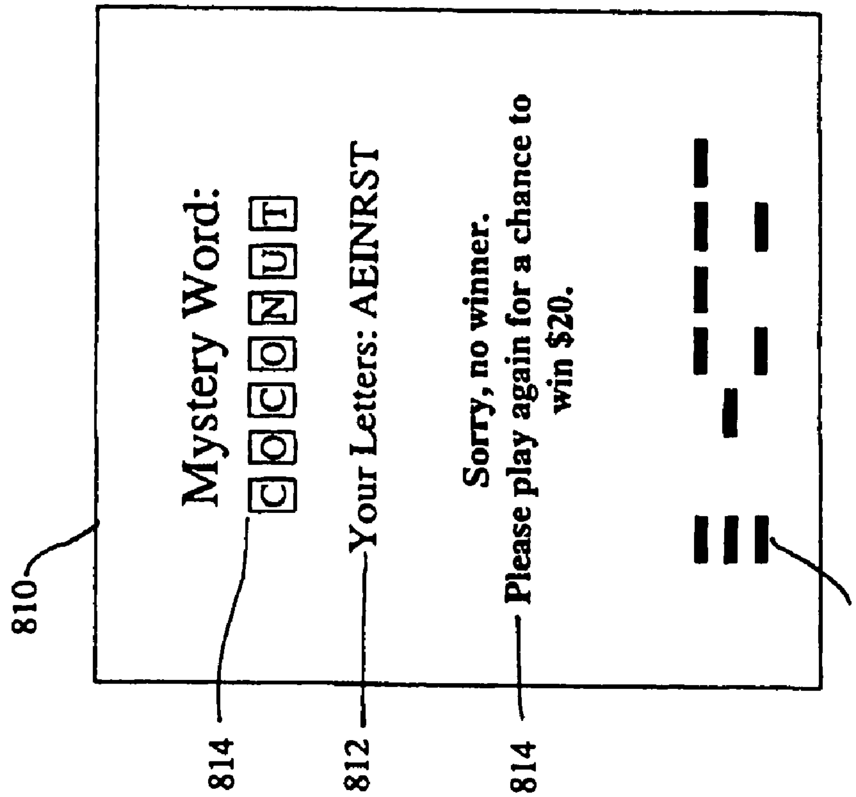
FIG. 25 illustrates an embodiment of a continuation ticket corresponding to the dynamic lottery ticket of FIG. 25.
Figure 24:
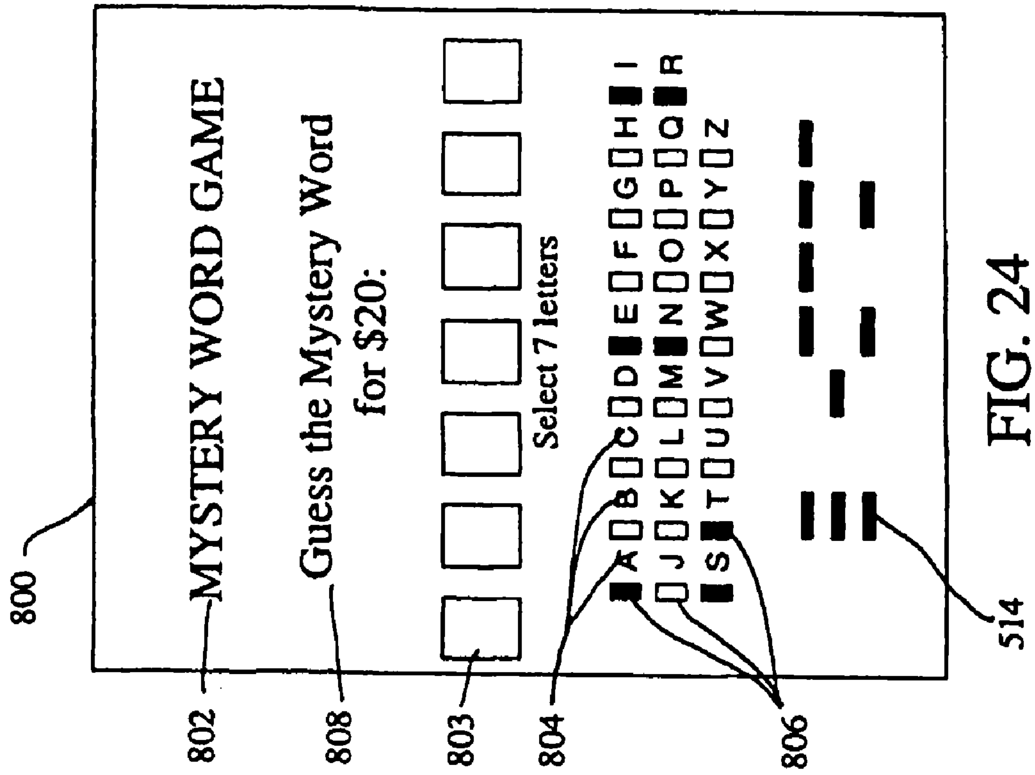
FIG. 24 illustrates an alternative embodiment of a dynamic lottery ticket including a dynamic word game.

FIGS. 24 and 25 illustrate an alternative embodiment of dynamic lottery tickets that may be used to provide a dynamic word game. In this embodiment, the dynamic word game may be offered as a stand-alone game, and may be similar to the bonus round from the game show Wheel of Fortune® wherein may select a predetermined plurality of letter of the alphabet in an attempt to spell out a mystery word. If the player succeeds in selecting all the letters of the mystery word, the player may be awarded a corresponding prize amount for the dynamic word game. Referring to FIG. 24, a dynamic lottery word game ticket 800 may include indicia corresponding to the dynamic lottery word game, such as title indicia 802, mystery word indicia 803, letter indicia 804, selection indicia 806, instruction indicia 808, and graphical code indicia 514. As indicated by the selection indicia 808, the player may select seven letters in an attempt to spell out the mystery word. The player may indicate the selected letters by marking the selection indicia 806 corresponding to the letter indicia 804. The mystery word for the occurrence of the dynamic lottery word game may be encoded in the graphical code 514, or may be stored in the lottery network 100 in a record corresponding to the occurrence of the dynamic lottery word game.

When the dynamic lottery game ticket 800 is scanned at the lottery terminal unit 104 at block 622, the letters selected by the player as identified by the marked selection indicia 806 may be compared to the letters of the mystery word stored in the graphical code 514 or corresponding record for the occurrence of the dynamic lottery word game at block 624 to determine whether the player wins the occurrence of the dynamic lottery word game. If the player selects all the letters of the mystery word, the player may be awarded a prize amount for the occurrence of the dynamic lottery word game. At block 626, the lottery terminal unit 104 may print and dispense a continuation ticket 810 for the dynamic lottery word game with indicia corresponding to the outcome of the occurrence of the dynamic lottery word game, such as entry indicia 812 reflecting the player's selections, outcome indicia 814 informing the player of the outcome of the occurrence of the dynamic lottery word game, and graphical code indicia 514. If the player successfully selects all the letters of the mystery word, the player may redeem the continuation ticket 810, which may constitute the bearer instrument for the dynamic lottery word game, at block 630, and have value corresponding to the prize amount for the dynamic lottery word game dispensed to the player.

Figure 26:
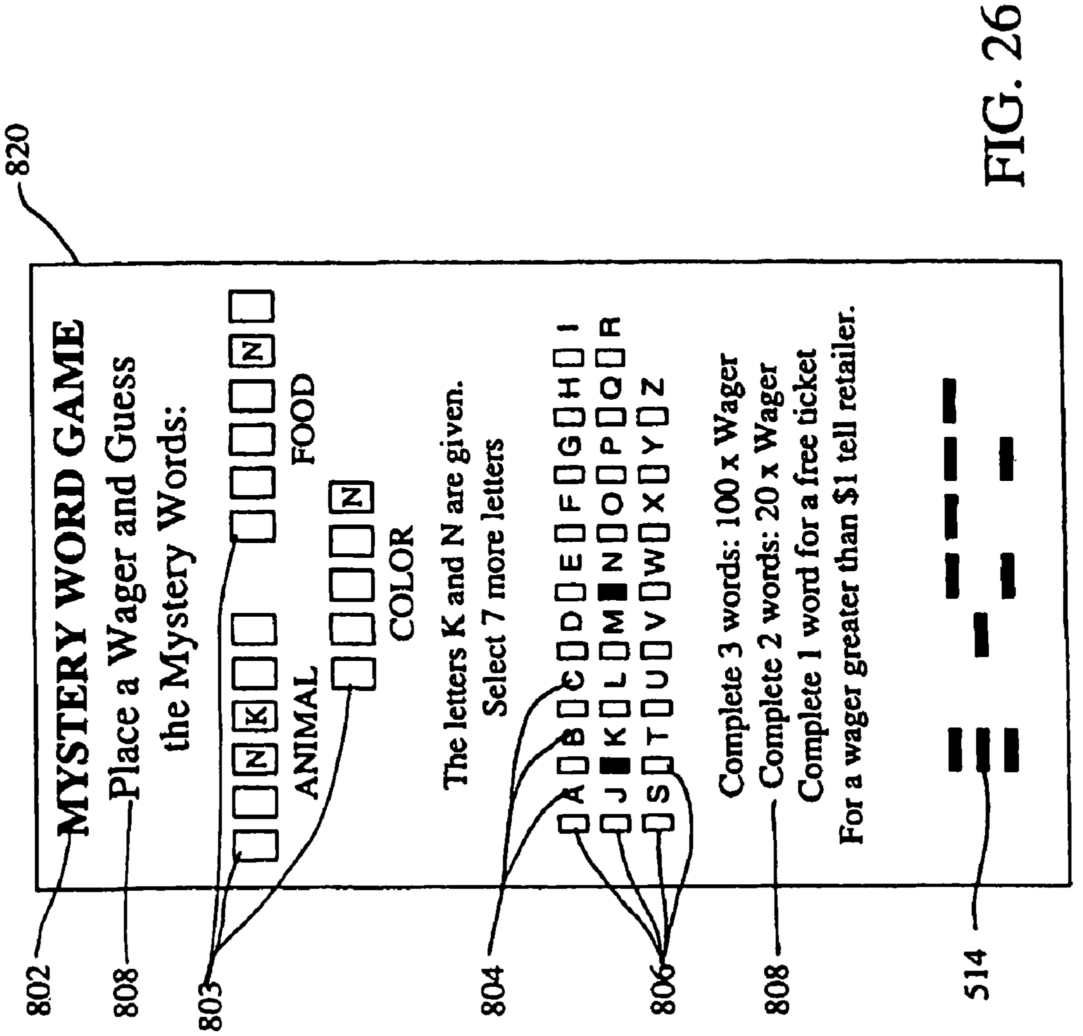
FIG. 26 illustrates an alternative embodiment of a dynamic lottery ticket including an alternative dynamic word game.

FIG. 26 illustrates an alternative embodiment of a dynamic lottery word game wherein the dynamic lottery ticket 820 my include a plurality of mystery word indicia 803, with the player's letter selections being compared to the letters in each of the plurality of mystery words. The mystery word indicia 803 may also include a clue or category corresponding to each of the words giving a player a hint for guessing the mystery word. Moreover, the player may be given one or more letters selected from the alphabet to further assist the player in guessing the mystery words. As with the previous example, the player may indicate the letter selections by marking the corresponding selection indicia 806 that may be read when the dynamic lottery ticket 820 is scanned at the lottery terminal unit 104. As indicated by the instruction indicia 808, a player may win varying prize amounts based on the number of mystery words completed by the selected letters.

Figure 28:
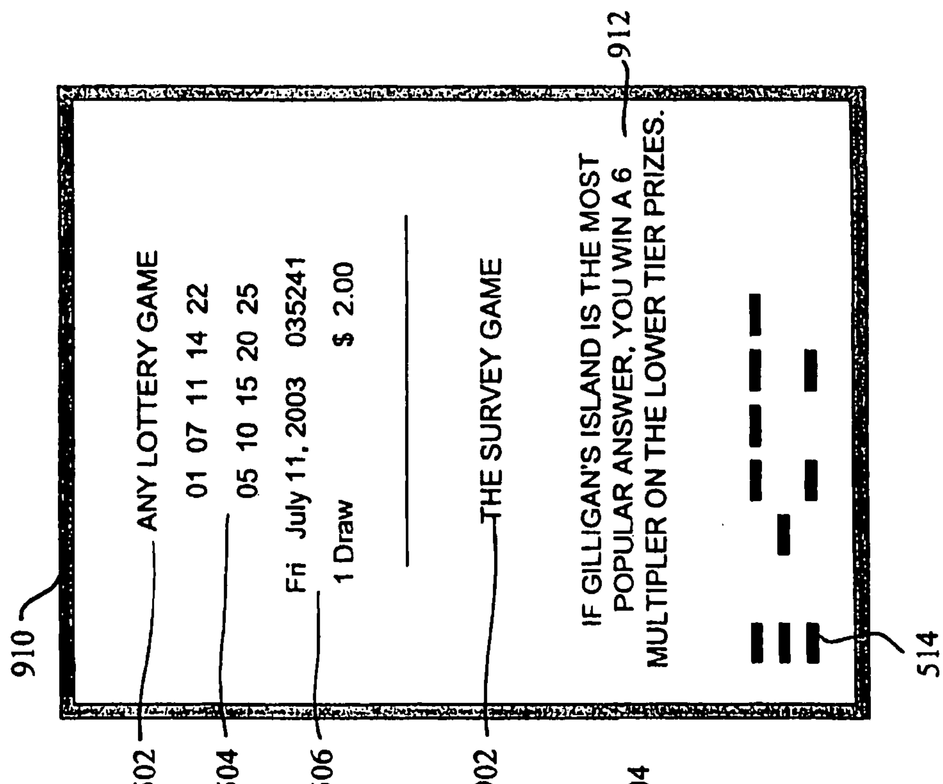
FIG. 28 illustrates an embodiment of a continuation ticket corresponding to the dynamic lottery ticket of FIG. 27.
Figure 27:
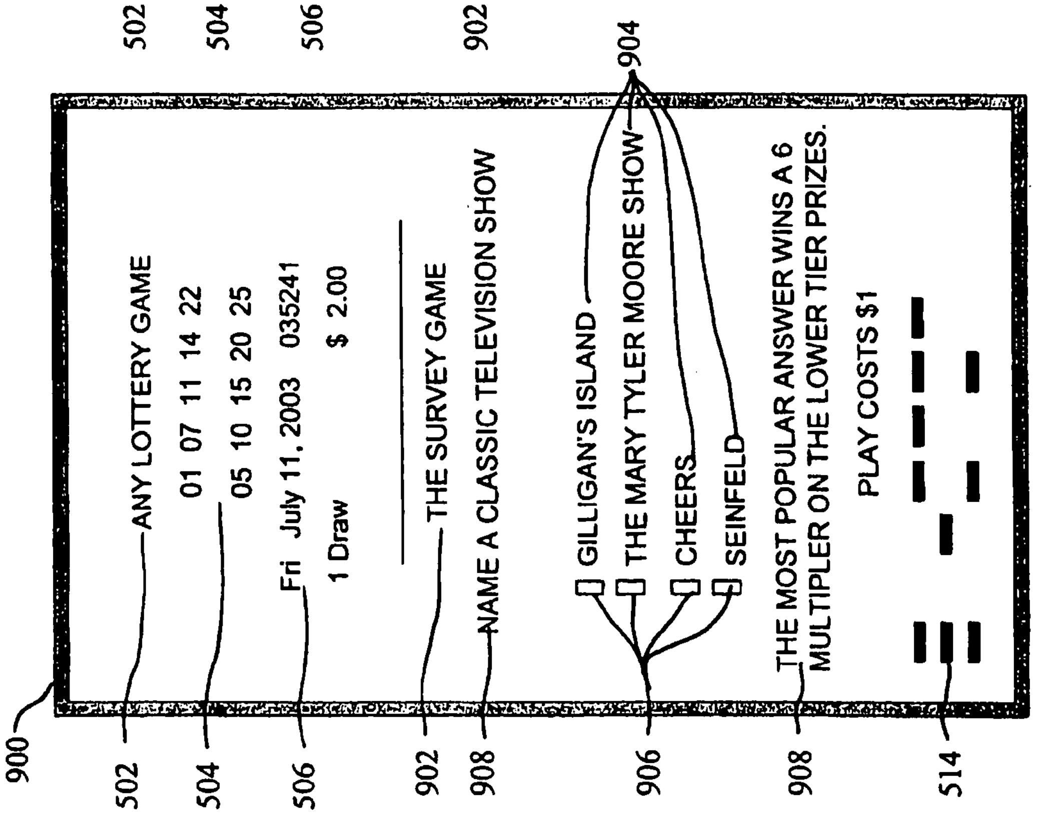
FIG. 27 illustrates an embodiment of a dynamic lottery ticket including a dynamic survey game.

As an alternative or in addition to offering dynamic lottery games separately or along with base lottery games, it may be desirable to offer dynamic lottery games in combination with base lottery games wherein the outcome of the dynamic lottery game may be partially determinative of the amount of any prize awarded for the base lottery game. As an example, FIGS. 27 and 28 illustrate a dynamic lottery ticket 900 with information for a base lottery game, such as title indicia 502, game area indicia 504, status indicia 506 and graphical code 514, along with information relating to a dynamic lottery game, such as title information 902, symbol indicia 904, selection indicia 906, and instruction indicia 908. In this embodiment, the dynamic lottery game may be in the form of a survey game wherein the player may select one of a plurality of alternative answers to a survey question, and with the outcome of the dynamic lottery game being determined based on the particular one of the plurality of alternative answers selected by the player.

As indicated by the instruction indicia 908, players selecting the most popular answer of the plurality of alternatives may receive a six times multiplier for any lower tier prizes awarded for the player's entry in the base lottery game. Referring back to the dynamic lottery game routine 600 of FIG. 8, at block 620, the player may mark the selection indicia 906 corresponding to the one of the plurality of alternative answers to the survey questions that the player believes may correctly answer the survey question. After the player marks the appropriate selection indicia 906 on the dynamic lottery ticket 900, the dynamic lottery ticket 900 may be scanned at one of the lottery terminal units 104 at block 622. In one embodiment, the outcome of the survey game may be based on an accumulation of the answers for all entries for the survey game, with the correct answer and the winning entries being determined only after the occurrence of the base lottery game. In such an implementation, when the dynamic lottery ticket 900 is scanned at the lottery terminal unit 104, the player's selection may be accumulated along with the selections made by other players for the occurrence of the survey game by the lottery network 100, with the correct answer for the survey game being the answer selected on the most player entries for that occurrence of the survey game. After the player's entry in the survey game may be accumulated by the lottery network 100, the lottery terminal unit 164 may print a continuation ticket 910 with the information for the base lottery game, such as indicia 502, 504, and 506, along with confirmation indicia 912 indicating the player's selection for the occurrence of the survey game.

Because the outcome of the survey game may be determined based on the accumulation of the responses for all the entries for the occurrence of the survey game, the outcome for an individual player's entry in the survey game may not be know at the time the continuation ticket 910 is printed. Consequently, the outcome of the survey game may be determined at the time of or after the drawing for the base lottery game. Once the drawing for the base lottery game occurs, the winning selection for the survey game may be determined and announced to the players. At the time the players redeem their continuation tickets 910 to claim any prize award for the occurrence of the base lottery game, the lottery network 100, at a host computer 134 or at the lottery terminal unit 104, may compare the player's selection in the survey game to the winning selection determined by the lottery network 100. If the player's selection for the survey game matches the winning selection for the survey game, the host computer 134 or lottery terminal unit 104 may enhance any prize awards for the base lottery game by the amount or factor corresponding to the winning selection for the survey game. If the player selection for the survey game does not match the winning selection, the player may be awarded any prize amount for the base lottery game without any further enhancements.

While the embodiment described herein awards an additional multiplier to players selecting the most popular selection, those skilled in the art will understand that multipliers and other enhancements to the base lottery game prize awards may be awarded based on any desired method. For example, the extension award may be awarded to the player selecting the least frequently chosen selection from the plurality of selections, or for a randomly determined one of the available selections, or for a combination of the available selections. Further, different extension awards may be awarded for each of the available plurality of selections, with the extension award being determined in whole or in part by the frequency with which each of the plurality of selections is marked on the entries for the survey game.

Figure 30:
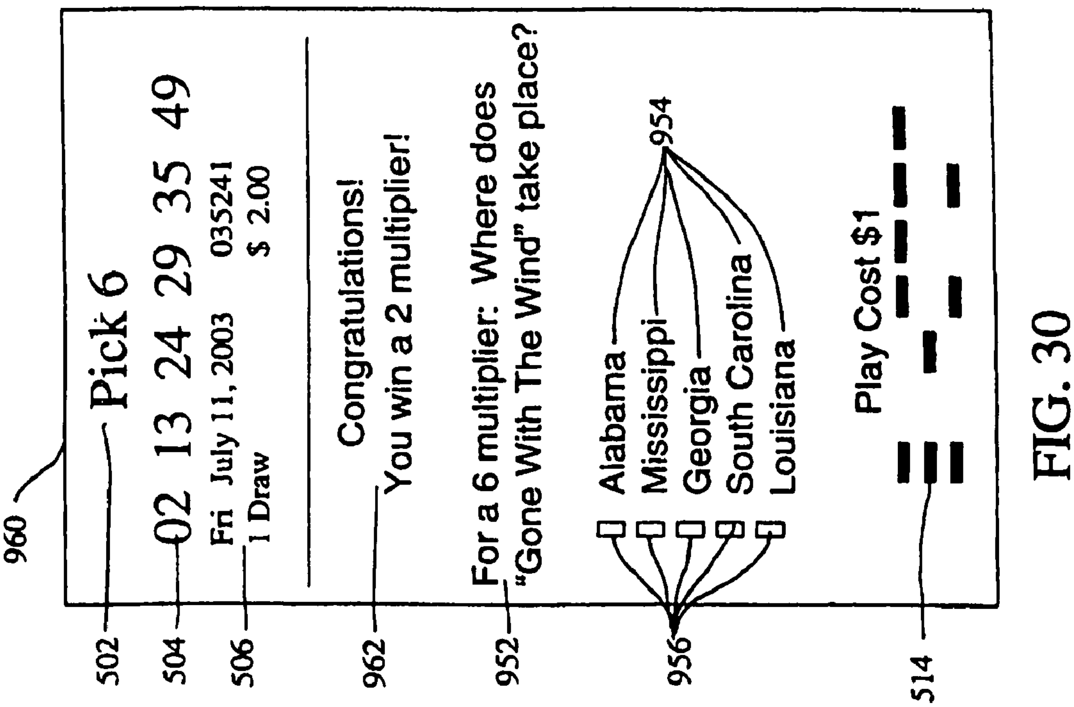
FIG. 30 illustrates an embodiment of a dynamic lottery continuation ticket corresponding to the dynamic lottery ticket of FIG. 29.
Figure 29:
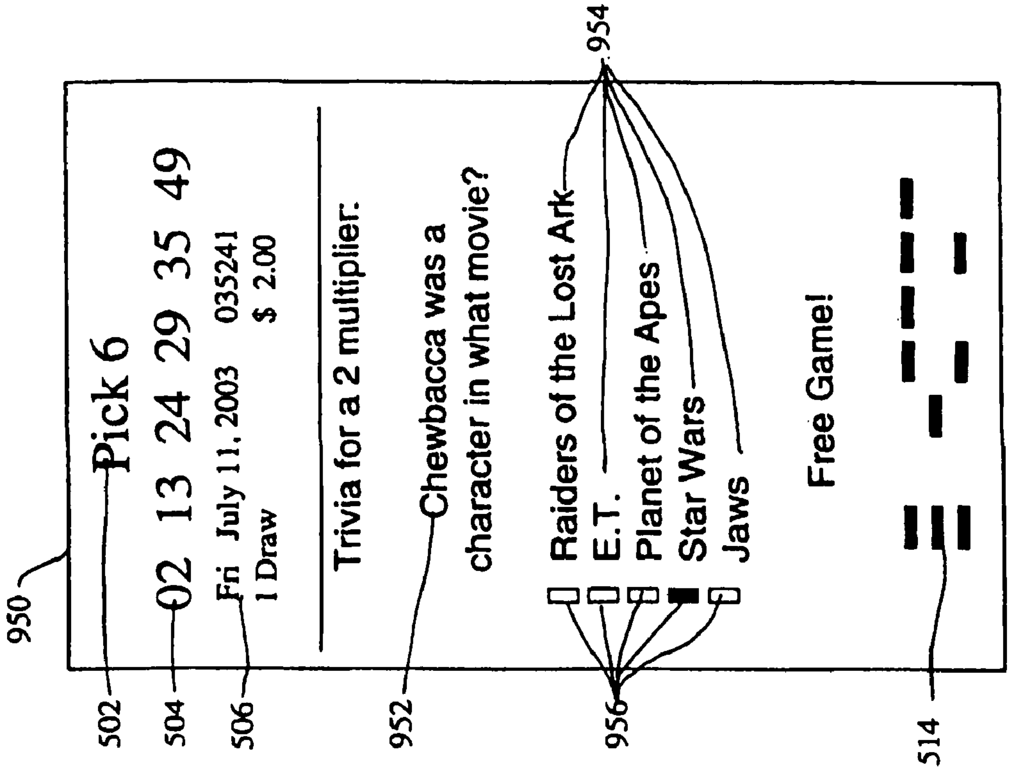
FIG. 29 illustrates an embodiment of a dynamic lottery ticket including a dynamic trivia game.

As another example of a dynamic lottery game wherein a winning outcome may result in the enhancement of any prize award for a base lottery game, FIGS. 29 and 30 illustrate dynamic lottery tickets corresponding to a dynamic lottery trivia game. In this embodiment, trivia questions may be posed to the player, and selection of correct answers to the trivia questions may result in the awarding of multipliers to be applied to prize amounts won in the base game. The dynamic lottery ticket 950 may include indicia corresponding to the player's base lottery game entry, such as title indicia 502, game area indicia 504, status indicia 506, and graphical code indicia 514, and indicia corresponding to the initial entry for the dynamic lottery trivia game, such as question indicia 952, answer indicia 954, and selection indicia 956. According to the indicia on the dynamic lottery ticket 950, correctly answering the trivia question results in a multiplier of 2 to be applied to any prize amount won for the base lottery game.

After the player marks the selection indicia 956 corresponding to the player's selected answer to the trivia game, the dynamic lottery ticket 950 may be scanned at a lottery terminal unit 104, with the player's selected answer being compared to the correct answer to the trivia question by the lottery network 100. After the outcome of the dynamic lottery trivia game by the lottery network 100, the lottery terminal unit 104 may print and dispense a dynamic continuation ticket 960. The dynamic continuation ticket 960 may include indicia corresponding to the player's entry for the base lottery game similar to the indicia on the dynamic lottery ticket 950, indicia corresponding to the outcome of the dynamic lottery trivia game, such as outcome indicia 962, and indicia corresponding to a further trivia question similar to the indicia on the dynamic lottery ticket 950. The further trivia question may be offered to the player as an additional chance to win a multiplier or, as shown on the dynamic continuation ticket 960, an opportunity to increase any multiplier that may have been won for correctly answering the initial trivia question. In this embodiment, because the total base game prize award may be determined by multiplying the base lottery game prize amount by the multiplier from the dynamic trivia game, the dynamic continuation ticket 960 may serve as the bearer instrument for redemption at a lottery terminal unit 104 to claim any prize award for the base lottery game.

Dynamic Bet Slips and Dynamic Betting Games

In addition to dynamic lottery games as described above, dynamic tickets may be used to implement other types of games wherein a dispensed dynamic ticket may be marked and redeemed to complete a player's entry in a lottery game. Another implementation of the dynamic tickets may be in the area of sports betting. In sports betting, the betting information for the sporting events frequently changes, such as point spreads for football and basketball games, money lines and starting pitchers for baseball games, betting odds and jockeys for horses in horse races, and the like. Due to the changes in betting information, it may be impractical to prepare bet slips for sporting events too far in advance of the occurrence of the sporting event. However, dynamic tickets in the form of dynamic bet slips may be well suited for sports betting wherein the most current information for the sporting event may be printed on dynamic bet slips reflecting the most current information. Depending on the implementation, such dynamic bet slips may be offered in conjunction with a base lottery game, or may be offered independently as a separate lottery game.

Figure 31:
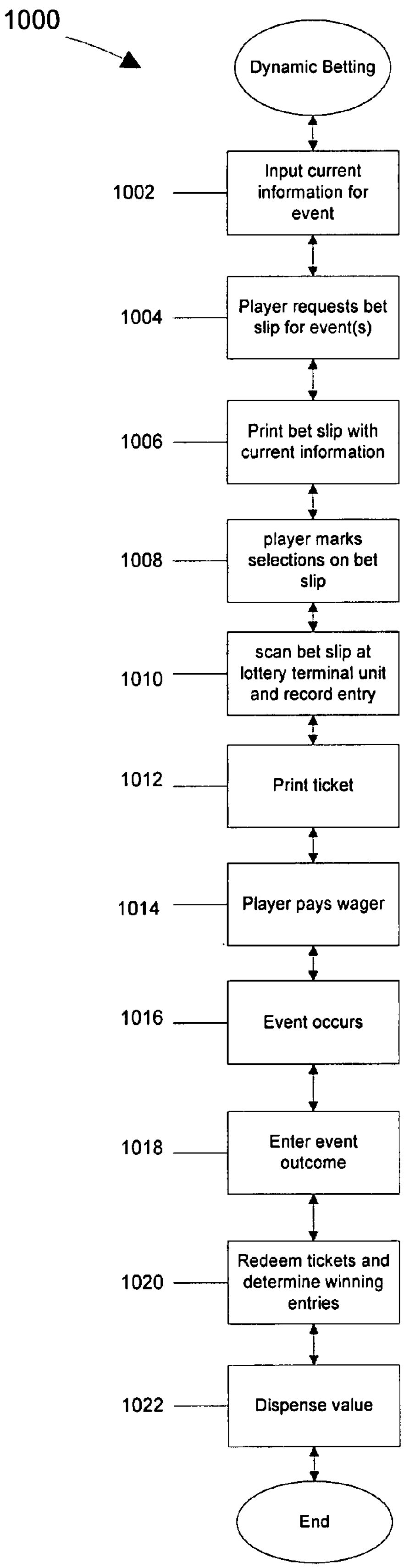
FIG. 31 is a flowchart of an embodiment of a dynamic betting game routine.

FIG. 31 is a flow chart outlining a sample process flow of a dynamic betting game routine that may be played in conjunction with a base lottery game, or that may be offered separately from any base lottery game in a manner described more fully below. The betting game may involve any sporting event upon which wagers may be made either on the final outcome or on intermediate events that may occur during the course of the sporting event, such as quarterly or halftime scores, or other intermediate point or statistical totals. Control within the dynamic betting game routine 1000 may pass to a block 1002 wherein current information for a sporting event for which the betting game may be offered may be entered into the lottery network 100.

The information may be entered into the lottery network 100 at any desired component within the lottery network 100, such as at a host computer 134 or one of the lottery terminal units 104. For example, input of the current information may be centralized at a host computer 134, with the information being entered via a peripheral I/O device 152 and stored at memory 138, database 154 or any other appropriate storage device. Once the current information is stored at the host computer 134, the current information may be transmitted to the lottery terminal units 104 and stored at memories 202 or other storage devices, or may be transmitted to the lottery terminal units 104 on an as-needed basis as players enter the betting game. Alternatively, the lottery network 100 may be configured such that current information for a sporting event may be input into the lottery network 100 at a location proximate the site of the sporting event, such as at a lottery terminal unit 104 or other remote terminal unit connected to the lottery network 106 that may be located at the site of the sporting event. Of course, those skilled in the art will understand that the lottery network 100 may be configured to facilitate input of the current information at any location that may be convenient for entry of the current information for the event, and such configurations are contemplated as having use with the betting game routine 1000.

At a time prior to the occurrence of the particular sporting event for which a betting game may be offered, at block 1004 a player may request a dynamic bet slip for the event containing the current information for the sporting event and allowing the player to make selections for the betting game. The player may request a dynamic bet slip at a sales agent location for the lottery network 100, and may do so by making the request to a sales agent or by making a necessary input selection in response to a prompt at the display 128 of a lottery terminal unit 104, and may specify the particular event of a plurality of available sporting events on which the player may desire to wager. Once the player's request is entered at a lottery terminal unit 104, the lottery terminal unit 104 may retrieve the current information for the requested sporting event from the corresponding memory 202, from the host computer 134, or from any other storage device at which the current information for the requested sporting event may be stored, and may cause the ticket printer 133 to print a dynamic bet slip at block 1006.

Figure 32:
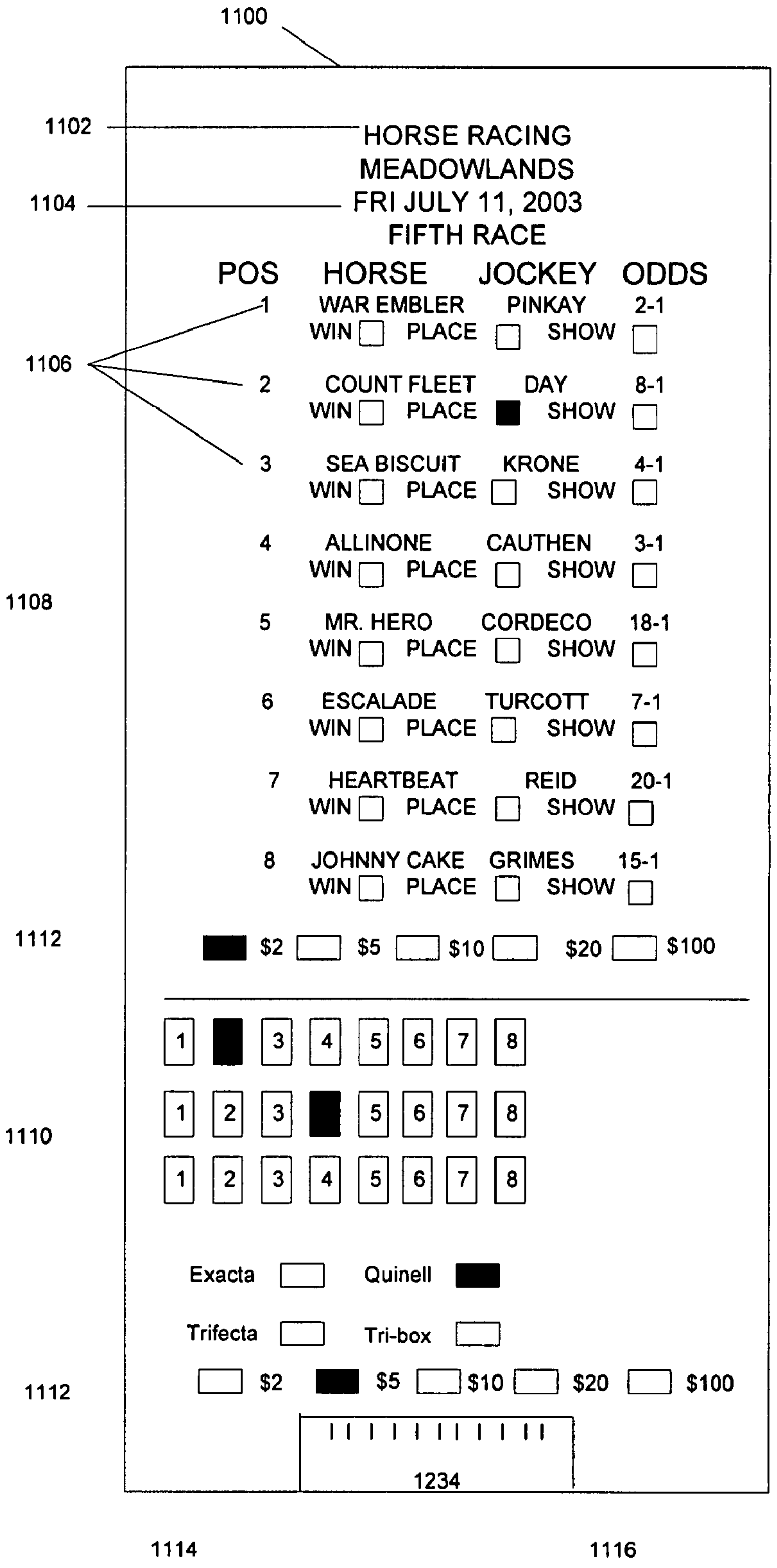
FIG. 32 illustrates an embodiment of a dynamic bet slip for a horse race.

One example of a dynamic bet slip 1100 that may be printed by a ticket printer 133 of a lottery terminal unit 104 for a betting game for horseracing is illustrated at FIG. 32. The dynamic bet slip 1100 may relate to wagers that may be placed on a single horse race on a given day at a given racetrack. In the hypothetical example, the dynamic bet slip 1100 may relate to the fifth race at the Meadowlands racetrack on Friday, Jul. 11, 2003. The dynamic bet slip 1100 may include indicia relating to the horse race for the betting game, such as sport identification indicia 1102, event identification indicia 1104, event participant indicia 1106 corresponding to the current information for the sporting event, such as the horses, jockeys and betting odds as shown, teams, points spreads and over/under lines for football or basketball games, teams, starting pitchers, and betting and money lines for baseball games, and the like, and selection indicia 1108 corresponding to the event participation indicia 1106 that the player may mark to identify the player's selections for the occurrence of the betting game. The dynamic bet slip 1100 may further include alternative wager indicia 1110 for indicating selections relating to other wagers that may be placed on a particular sporting event, such as exacta, quinella and trifecta wagering on a horse race, wager amount selection indicia 1112 whereat the player may indicate a wager amount corresponding to the player's selections for the betting game, and graphical code 1114 and tracking number indicia 1116 for identifying and tracking the player's entry in the betting game within the lottery network 100 in a similar manner as previously described herein.

After receiving the dynamic bet slip 1100, at block 1008 the player may mark the desired selections at the appropriate selection indicia 1108 and alternative wager indicia 1110 on the dynamic bet slip 1100, and mark the desired wager amounts at the appropriate wager amount selection indicia 1112. For example, the player may desire to make a $2.00 wager on the No. 2 horse to "PLACE" in the horse race (i.e. finish first or second), and to $5.00 quinella wager on the Nos. 2 and 4 horses (i.e. the No. 2 and 4 horses will finish first and second in either order). On the dynamic bet slip 1100, the player may mark the "PLACE" box 1108 for the No. 2 horse and the corresponding "$2.00" box 1112, and mark the appropriate "2" and "4" boxes of the alternative wager indicia 1110 and the corresponding "5.00" box 11112.

Once the player marks the desired selections on the dynamic bet slip 1100, the player may submit the completed dynamic bet slip 1100 at a lottery terminal unit 104 wherein the dynamic bet slip 1100 may be scanned by the corresponding ticket reader 132 at block 1010. The ticket reader 132 may be configured to detect the marks made by the player at the selection indicia 1108, alternative wager indicia 1110 and wager amount selection indicia 1112. The lottery terminal unit 104 may be configured to store the information indicated by the marked indicia 1108, 1110 and 1112 on the dynamic bet slip 1100, perhaps in a newly generated record for the player's entry or by updating a record for the player's entry previously generated at the time the dynamic bet slip 1100 was originally printed. The generated record may be utilized for validation and auditing purposes as desired or as may be dictated by regulatory requirements.

Figure 33:
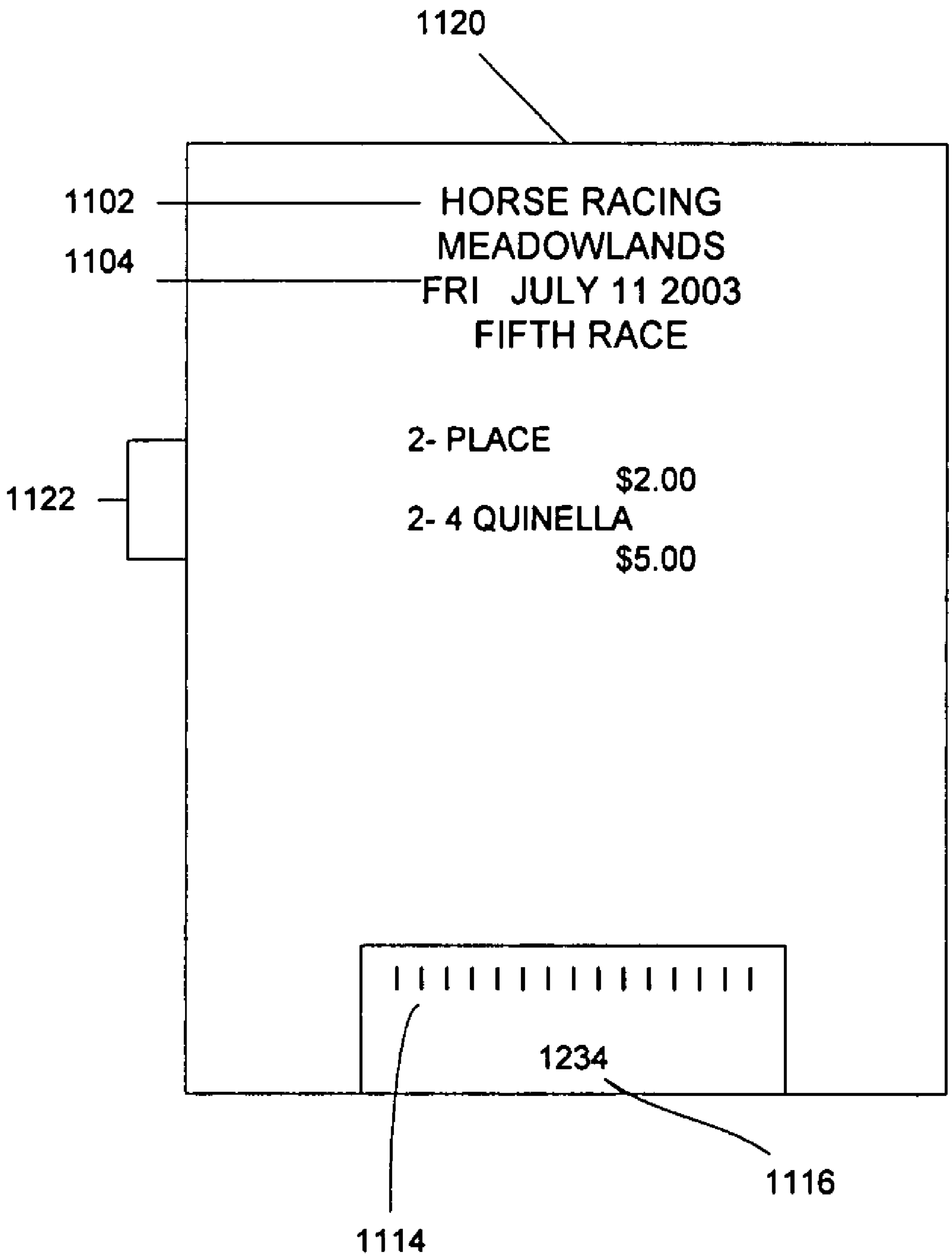
FIG. 33 illustrates an embodiment of a continuation ticket corresponding to the dynamic bet slip of FIG. 32.

After the dynamic bet slip 1100 is scanned and recorded in the lottery network 100 at block 1010, the ticket printer 133 at the corresponding lottery terminal unit 104 may print a continuation ticket for the betting game at block 1012, such as the continuation ticket 1120 of FIG. 33. The continuation ticket 1120 may include information identifying the sporting event corresponding to the player's entry in the betting game, such as sport indicia 1102, event indicia 1104, and graphical code 1114 and tracking number indicia 1116 as previously described for the dynamic bet slip 1100, along with wager confirmation indicia 1122 corresponding to the marked selections made by the player on the dynamic bet slip 1100. In the present example, the wager confirmation indicia 1122 may indicate that the player made a $2.00 wager on the No. 2 horse to "PLACE," and a $5.00 quinella wager on the Nos. 2 and 4 horses. Corresponding information may also be encoded within the graphical code 1114, or within the record stored within the lottery network 100 corresponding to the player's entry. At this time, the player may also be required to pay the wager amount corresponding to the selections made by the player on the dynamic bet slip 1100 at block 1014.

It should be noted at this point that the dynamic bet slips 1100 for two different entries for a sporting event may contain different participant indicia 1106 and, consequently, may alter the wagering options corresponding to the dynamic bet slips 1100 depending on the timing with which the dynamic bet slips 1100 may have been printed at a lottery terminal unit 104. For example, at the time the illustrated dynamic bet slip 1100 was printed, the current information for the sporting event may have indicated that eight horses were entered in the horse race. Subsequent to the printing of the dynamic bet slip 1100, the No. 2 horse may have been scratched from the race. At the time the No. 2 horse may have been scratched, the current information indicating that the No. 2 horse would not be running in the horse race may have been entered into the lottery network 100 in a manner such as one of those previously described. Once the information for the race is updated, subsequently printed dynamic bet slips 1100 may not include information relating to the No. 2 horse for the horse race, and the players may not be permitted to place wagers involving the No. 2 horse. If the dynamic bet slip 1100 of FIG. 32 is scanned after the current information scratching the No. 2 horse is entered into the lottery network 100, the lottery terminal unit 104 may be configured to compare the current information for the sporting event to the selections made on the dynamic bet slip 11100, determine that the player is attempting to make a wager inconsistent with the current information for the sporting event, and reject the dynamic bet slip 1100 while indicating the inconsistency between the player's selections and the current information for the sporting event. The lottery terminal unit 104 may make a similar determination when the confirmation ticket 1120 of FIG. 33 in which the player's entry may be inconsistent with the current information for the sporting event may be redeemed by the player as discussed more fully below. In this situation, prior entries containing selections inconsistent with the current information for the sporting event may be flagged by the lottery network 100 as being void, and the player may receive a refund at the time the inconsistent continuation ticket 1120 may be redeemed.

Returning to the routine 1000 of FIG. 31, the sporting event may occur at the scheduled time for the occurrence of the event at a block 1016. For the horse race of the present example, the fifth race may occur at a predetermined post time for the race on the particular day. At the scheduled time for the occurrence of the event, or at some point a predetermined period of time preceding the event, the lottery network 104 may cease accepting dynamic bet slips 1100 for that occurrence of the sporting event to prevent players from placing wagers on the sporting event after the outcome of the sporting event is determined. After the sporting event, such as the horse race, concludes, information corresponding to the outcome of the sporting event may be entered into the lottery network at a block 1018 in a manner that may be similar to the manner in which the current information for the sporting event may have been entered into the lottery network 100 at block 1002.

Once the outcome of the sporting event may be entered into the lottery network 100, the lottery network 100 may be configured to evaluate the player entries for the sporting event to determine which, if any, are winning entries for the event. If any winning entries exist, the lottery network 100 may be configured to flag records corresponding to the winning entries in the database in which the records are stored, generate a new database of winning entries for the sporting event, or otherwise indicate which entries are winning entries. Alternatively, the lottery network 100 may be configured to determine whether a given entry for the betting game is a winning entry only after a player redeems a continuation ticket 1120 at a lottery terminal unit 104 at block 1020. In either configuration or any other configuration for determining winning entries, the lottery network 100 may compare the event outcome information, to the information corresponding to the continuation ticket 1120 and the player's wager(s) on the sporting event.

If one or more of the player's wagers for the sporting event correspond to the actual outcome of the sporting event, value corresponding to a prize award won by the player for a winning wager may be dispensed to the player at block 1022. For example, if the No. 2 horse finished first or second in the horse race, the lottery terminal unit 104 may dispense value corresponding to the prize award for the player's winning $2.00 "PLACE" wager on the No. 2 horse may be dispensed to the player. Further, if the No. 4 horse also finished first or second in the horse race, the lottery terminal unit 104 may also dispense value corresponding to the prize award for the player's winning $5.00 quinella wager on the Nos. 2 and 4 horses. Depending on the sporting event and the desired implementation of the betting game for a particular sporting event, the prize awards corresponding to a given sporting event may be determined in any manner to achieve a desired payout rate for the betting game, such as fixed amount pay tables, pari-mutuel payouts, progressive jackpots, and the like.

Figure 34:
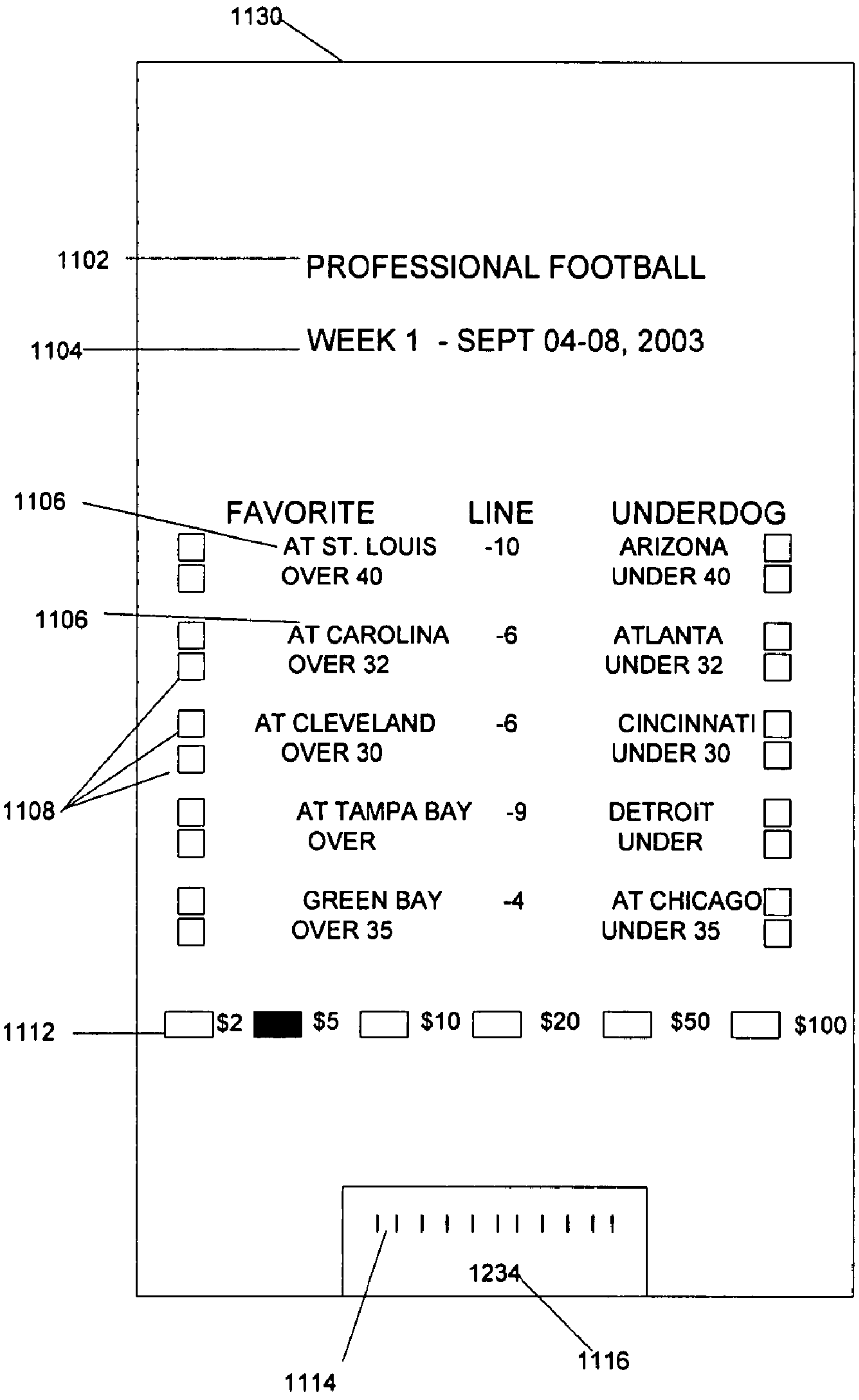
FIG. 34 illustrates an alternative embodiment of a dynamic bet slip for football games.
Figure 35:
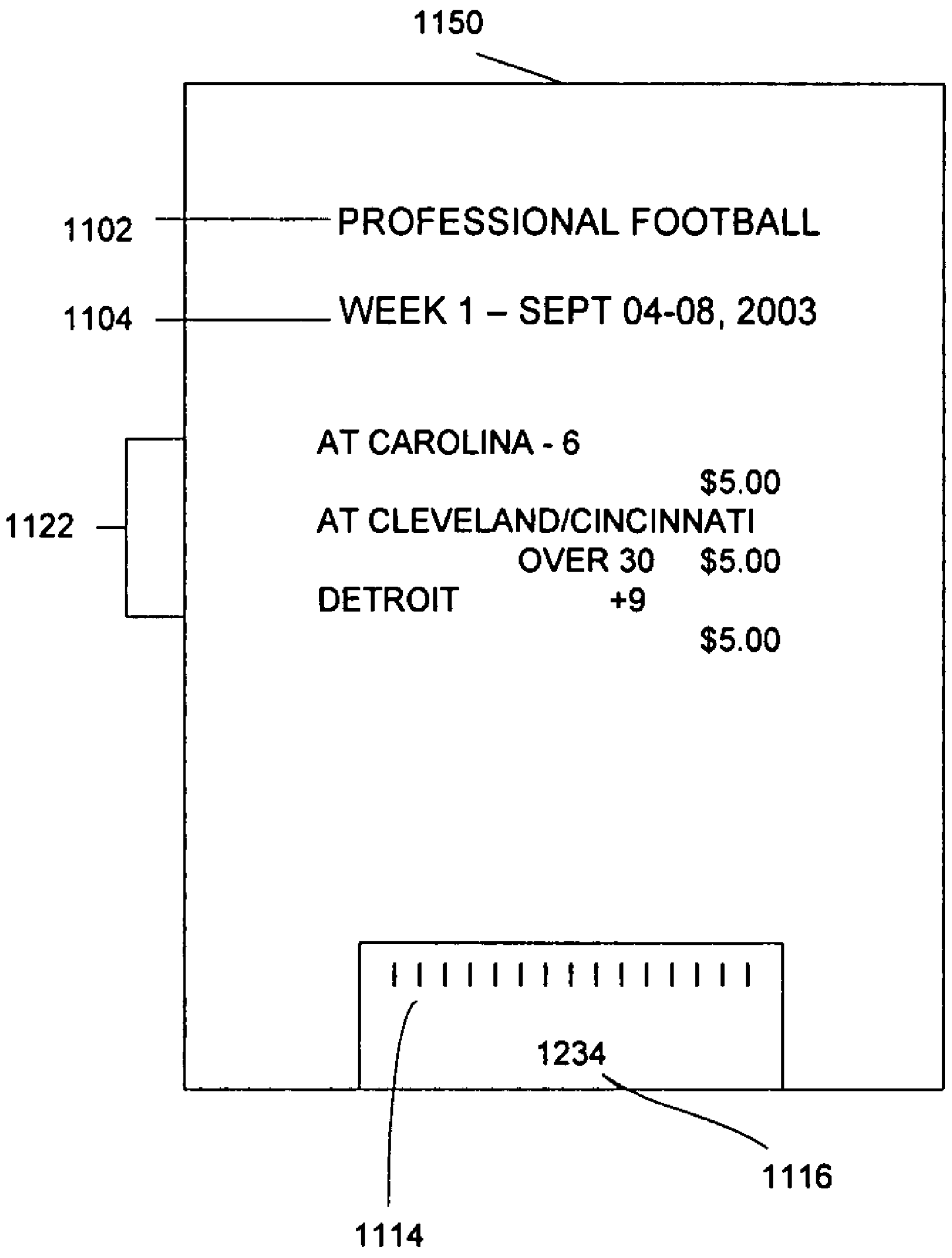
FIG. 35 illustrates an embodiment of a continuation ticket corresponding to the dynamic bet slip of FIG. 34.

While the previous example illustrates dynamic bet slips 1100 and continuation tickets 1120 for horseracing, those skilled in the art will understand that the dynamic betting routine 1000 of FIG. 31 may be applied to any desired sporting event or other event for which similar betting games may be desired. As a further example, FIGS. 34 and 35 illustrate a dynamic bet slip 1130 and continuation ticket 1150 for wagering on a full slate of football games for a given weekend. As with the dynamic bet slip 1100, the dynamic bet slip 1130 of FIG. 34, which may be printed at block 1006 may include information relating to the wagering options for the football games, including sport indicia 1102, event indicia 1104, participant indicia 1106, selection indicia 1108, wager amount selection indicia 1112, graphical code indicia 1114 and tracking number indicia 1116. The current information entered into the lottery network 100 for the football games at block 1002 may include the point spreads and over/under point totals for the games.

In the present example, at block 1008 the player may mark the selection indicia 1108 on the dynamic bet slip 1130 corresponding to wagers on Carolina minus six points, Cleveland and Cincinnati to score over thirty points, and Detroit plus nine points, and wager amount selection indicia 1112 corresponding to $5.00, wagers. After the dynamic bet slip 1130 may be scanned at block 1010, the lottery terminal unit 104 may print a continuation ticket 1150 that may include sport indicia 1102, event indicia 1104, graphical code indicia 1114, tracking number indicia 1116, and wager confirmation indicia 1122 corresponding the player's wagering selections marked on the dynamic bet slip 1130. After the football games are completed, the outcome information may be entered into the lottery network 100 at block 1018, and the continuation tickets 1150 may be redeemed and evaluated to determine winning entries at block 1020 and value dispensed at block 1022 in a similar manner as previously described.

What is claimed is:

1. A gaming system for conducting a dynamic lottery game, the gaming system comprising:
- a plurality of terminal units, each of the terminal units comprising:
  - an input device for inputting a plurality of input selections, the input device being capable of reading encoded information disposed on a substrate material;
  - a terminal unit memory device;
  - a currency-accepting mechanism that is capable of allowing a player to deposit a medium of currency;
  - a value-dispensing mechanism that is capable of dispensing value to the player;
  - an output device; and
  - a terminal unit controller operatively coupled to the input device, the terminal unit memory device, the currency-accepting mechanism, the value-dispensing mechanism, and the output device; and a host computer operatively coupled to the plurality of terminal units, the host computer comprising;

a host computer memory device; and a host computer controller operatively coupled to the host computer memory device, one of the terminal unit controller and the host computer controller being programmed to determine an opening entry for the player for the dynamic lottery game, the terminal unit controller being programmed to cause the output device to dispense a dynamic lottery game ticket to the player, the dynamic lottery game ticket having indicia disposed thereon corresponding to the opening entry for the player for the dynamic lottery game, the terminal unit controller being programmed to allow the input device to receive the dynamic lottery game ticket and to read player selection indicia on the dynamic lottery game ticket, wherein the player selection indicia on the dynamic lottery game ticket corresponds to a dynamic lottery game selection for the player, one of the terminal unit controller and the host computer controller being programmed to determine an outcome of the dynamic lottery game in response to the reading of the player selection indicia by the input device, the outcome being determined based on the player selection indicia, the terminal unit controller being programmed to cause the output device to dispense a continuation ticket to the player, the continuation ticket having indicia disposed thereon corresponding to the outcome of the dynamic lottery game for the player, the terminal unit controller being programmed to allow the input device to receive the continuation ticket and to read the indicia corresponding to the outcome of the dynamic lottery game for the player, one of the terminal unit controller and the host computer controller being programmed to determine whether the outcome of the dynamic lottery game is a winning outcome based on the indicia corresponding to the outcome of the dynamic lottery game for the player, and the terminal unit controller being programmed to cause the value-dispensing mechanism to dispense value to the player in response to the one of the terminal unit controller and the host computer controller determining that the outcome of the dynamic lottery game for the player is a winning outcome.

2. A gaming system for conducting a dynamic lottery game in accordance with claim 1, the terminal unit controller being programmed to allow the input device to receive the continuation ticket and to read player selection indicia on the continuation ticket, wherein the player selection indicia on the continuation ticket corresponds to a second dynamic lottery game selection for the player, one of the terminal unit controller and the host computer controller being programmed to determine a second outcome of the dynamic lottery game in response to the reading of the second player selection indicia by the input device, the second outcome being determined based on the second player selection indicia, the terminal unit controller being programmed to cause the output device to dispense a second continuation ticket to the player, the second continuation ticket having indicia disposed thereon corresponding to the second outcome of the dynamic lottery game for the player, the terminal unit controller being programmed to allow the input device to receive the second continuation ticket and to read the indicia corresponding to the second outcome of the dynamic lottery game for the player, one of the terminal unit controller and the host computer controller being programmed to determine whether the second outcome of the dynamic lottery game is a winning outcome based on the indicia corresponding to the second outcome of the dynamic lottery game for the player, and the terminal unit controller being programmed to cause the value-dispensing mechanism to dispense value to the player in response to the one of the terminal unit controller and the host computer controller determining that the second outcome of the dynamic lottery game for the player is a winning outcome.

3. A gaming system for conducting a dynamic lottery game in accordance with claim 1, the terminal unit controller being programmed to allow the input device, to receive the dynamic lottery game ticket a second time and to read player selection indicia on the dynamic lottery game ticket, one of the terminal unit controller and the host computer controller being programmed to determine a second outcome of the dynamic lottery game in response to the second reading of the player selection indicia by the input device, the outcome being determined based on the player selection indicia, the terminal unit controller being programmed to cause the output device to dispense a second continuation ticket to the player, the second continuation ticket having indicia disposed thereon corresponding to the second outcome of the dynamic lottery game for the player, the terminal unit controller being programmed to allow the input device to receive the second continuation ticket and to read the indicia corresponding to the second outcome of the dynamic lottery game for the player, one of the terminal unit controller and the host computer controller being programmed to determine whether the second outcome of the dynamic lottery game is a winning outcome based on the indicia corresponding to the second outcome of the dynamic lottery game for the player, and the terminal unit controller being programmed to cause the value-dispensing mechanism to dispense value to the player in response to the one of the terminal unit controller and the host computer controller determining that the second outcome of the dynamic lottery game for the player is a winning outcome.

4. A gaming system for conducting a dynamic lottery game in accordance with claim 1, the terminal unit controller being programmed to allow the player to enter a base lottery game entry at input device, the terminal unit controller being programmed to allow the player to enter a base lottery game wager at the currency-accepting mechanism, the terminal unit controller being programmed to cause the output device to dispense the dynamic lottery game ticket to the player, wherein the dynamic lottery game ticket has indicia disposed thereon corresponding to the entry in the base lottery game.

5. A gaming system for conducting a dynamic lottery game in accordance with claim 4, the terminal unit controller being programmed to allow the input device to read the indicia corresponding to the entry in the base lottery game on the dynamic lottery ticket, one of the terminal unit controller and the host computer controller being programmed to determine whether the entry for the base lottery game is a winning entry in response to the dynamic lottery ticket being received and read by the input device, and the terminal unit controller being programmed to cause the value-dispensing mechanism to dispense value to the player in response to the one of the terminal unit controller and the host computer controller determining that the entry for the base lottery game is a winning entry.

6. A gaming system for conducting a dynamic lottery game in accordance with claim 4, the terminal unit controller being programmed to cause the output device to dispense the continuation ticket to the player, wherein the continuation ticket has indicia disposed thereon corresponding to the entry in the base lottery game;

one of the terminal unit controller and the host computer controller being programmed to determine whether the entry for the base lottery game is a winning entry in response to the continuation ticket being received and read by the second input device, and the terminal unit controller being programmed to cause the value-dispensing mechanism to dispense value to the player in response to the one of the terminal unit controller and the host computer controller determining that the entry for the base lottery game is a winning entry.

7. A gaming system for conducting a dynamic lottery game in accordance with claim 4, wherein a winning outcome for the dynamic lottery game corresponds to a multiplier value to be applied to a prize amount for a winning entry for the base lottery game, the terminal unit controller being programmed to multiply the prize amount for the winning entry for the base lottery game by any multiplier value for a winning entry for the dynamic lottery game to determine a total base lottery game prize amount in response to determining that the entry in the base lottery game and the entry in the dynamic lottery game are winning entries, and the terminal unit controller being programmed to cause the value-dispensing mechanism to dispense value to the player corresponding to the total base lottery game prize amount in response to determining that the entry in the base lottery game and the entry in the dynamic lottery game are winning entries.

8. A gaming system for conducting a dynamic lottery game in accordance with claim 1, wherein the input device comprises a first device for inputting a plurality of input selections and a second device that is capable of reading encoded information disposed on a substrate material; the terminal unit controller being programmed to allow a request for a player to enter the dynamic lottery game to be input at the first device, the terminal unit controller being programmed to allow the second device to receive the dynamic lottery game ticket and to read player selection indicia on the dynamic lottery game ticket, and the terminal unit controller being programmed to allow the second device to receive the continuation ticket and to read the indicia corresponding to the outcome of the dynamic lottery game for the player.

9. A gaming system for conducting a dynamic lottery game in accordance with claim 1, the terminal unit controller being programmed to allow a request for a player to enter the dynamic lottery game to be input at the input device, wherein the opening entry for the player for the dynamic lottery game is determined in response to the input of the request at the input device.

10. A method for conducting a dynamic lottery game, comprising:

determining an opening entry for a player for the dynamic lottery game;

dispensing a dynamic lottery game ticket to the player, the dynamic lottery game ticket having indicia disposed thereon corresponding to the opening entry for the player for the dynamic lottery game;

reading player selection indicia on the dynamic lottery game ticket, wherein the player selection indicia on the dynamic lottery game ticket corresponds to a dynamic lottery game selection for the player;

determining an outcome of the dynamic lottery game, the outcome being determined based on the player selection indicia;

dispensing a continuation ticket to the player, the continuation ticket having indicia disposed thereon corresponding to the outcome of the dynamic lottery game for the player;

reading the indicia corresponding to the outcome of the dynamic lottery game for the player;

determining whether the outcome of the dynamic lottery game is a winning outcome based on the indicia corresponding to the outcome of the dynamic lottery game for the player; and dispensing value to the player in response to determining that the outcome of the dynamic lottery game for the player is a winning outcome.

11. A method for conducting a dynamic lottery game in, accordance with claim 10, comprising:

reading player selection indicia on the continuation ticket, wherein the player selection indicia on the continuation ticket corresponds to a second dynamic lottery game selection for the player;

determining a second outcome of the dynamic lottery game, the second outcome being determined based on the second player selection indicia;

dispensing a second continuation ticket to the player, the second continuation ticket having indicia disposed thereon corresponding to the second outcome of the dynamic lottery game for the player;

reading the indicia on the second continuation ticket corresponding to the second outcome of the dynamic lottery game for the player;

determining whether the second outcome of the dynamic lottery game is a winning outcome based on the indicia corresponding to the second outcome of the dynamic lottery game for the player; and dispensing value to the player in response to determining that the second outcome of the dynamic lottery game for the player is a winning outcome.

12. A method for conducting a dynamic lottery game in accordance with claim 10, comprising:

reading the player selection indicia on the dynamic lottery game ticket a second time;

determining a second outcome of the dynamic lottery game in response to the second reading of the player selection indicia, the outcome being determined based on the player selection indicia;

dispensing a second continuation ticket to the player, the second continuation ticket having indicia disposed thereon corresponding to the second outcome of the dynamic lottery game for the player;

reading the indicia of the second continuation ticket corresponding to the second outcome of the dynamic lottery game for the player;

determining whether the second outcome of the dynamic lottery game is a winning outcome based on the indicia corresponding to the second outcome of the dynamic lottery game for the player; and dispensing value to the player in response to determining that the second outcome of the dynamic lottery game for the player is a winning outcome.

13. A method for conducting a dynamic lottery game in accordance with claim 10, comprising:

receiving a base lottery game entry from the player;

receiving a base lottery game wager from the player;

dispensing the dynamic lottery game ticket to the player, wherein the dynamic lottery game ticket has indicia disposed thereon corresponding to the entry in the base lottery game.

14. A method for conducting a dynamic lottery game in accordance with claim 13, comprising:

reading the indicia corresponding to the entry in the base lottery game on the dynamic lottery ticket;

determining whether the entry for the base lottery game is a winning entry based on the indicia disposed on the dynamic lottery ticket; and dispensing value to the player in response to determining that the entry for the base lottery game is a winning entry.

15. A method for conducting a dynamic lottery game in accordance with claim 13, comprising:

dispensing the continuation ticket to the player, wherein the continuation ticket has indicia disposed thereon corresponding to the entry in the base lottery game;

determining whether the entry for the base lottery game is a winning entry based on the indicia disposed on the continuation ticket; and dispensing value to the player in response to determining that the entry for the base lottery game is a winning entry.

16. A method for conducting a dynamic lottery game in accordance with claim 13, wherein a winning outcome for the dynamic lottery game corresponds to a multiplier value to be applied to a prize amount for a winning entry for the base lottery game, the method comprising:

determining a total base lottery game prize amount by multiplying the prize amount for the winning entry for the base lottery game by any multiplier value for a winning entry for the dynamic lottery game in response to determining that the entry in the base lottery game and the entry in the dynamic lottery game are winning entries; and dispensing value to the player corresponding to the total base lottery game prize amount in response to determining that the entry in the base lottery game and the entry in the dynamic lottery game are winning entries.

17. A method for conducting a dynamic lottery game in accordance with claim 10, comprising:

receiving a request from a player to enter the dynamic lottery game; and determining the opening entry for the player for the dynamic lottery game in response to the request to enter the dynamic lottery game.

18. A terminal unit for conducting a dynamic lottery game, comprising:

an input device for inputting a plurality of input selections, the input device being capable of reading encoded information disposed on a substrate material;

a terminal unit memory device;

a currency-accepting mechanism that is capable of allowing a player to deposit a medium of currency;

a value-dispensing mechanism that is capable of dispensing value to the player;

an output device; and a terminal unit controller operatively coupled to the input device, the terminal unit memory device, the currency-accepting mechanism, the value-dispensing mechanism and the output device, the terminal unit controller being programmed to determine an opening entry for the player for the dynamic lottery game, the terminal unit controller being programmed to cause the output device to dispense a dynamic lottery game ticket to the player, the dynamic lottery game ticket having indicia disposed thereon corresponding to the opening entry for the player for the dynamic lottery game, the terminal unit controller being programmed to allow the input device to receive the dynamic lottery game ticket and to read player selection indicia on the dynamic lottery game ticket, wherein the player selection indicia on the dynamic lottery game ticket corresponds to a dynamic lottery game selection for the player, the terminal unit controller being programmed to determine an outcome of the dynamic lottery game in response to the reading of the player selection indicia by the input device, the outcome being determined based on the player selection indicia, the terminal unit controller being programmed to cause the output device to dispense a continuation ticket to the player, the continuation ticket having indicia disposed thereon corresponding to the outcome of the dynamic lottery game for the player, the terminal unit controller being programmed to allow the input device to receive the continuation ticket and to read the indicia corresponding to the outcome of the dynamic lottery game for the player, the terminal unit controller being programmed to determine whether the outcome of the dynamic lottery game is a winning outcome based on the indicia corresponding to the outcome of the dynamic lottery game for the player, and the terminal unit controller being programmed to cause the value-dispensing mechanism to dispense value to the player in response to the terminal unit controller determining that the outcome of the dynamic lottery game for the player is a winning outcome.

19. A terminal unit for conducting a dynamic lottery game in accordance with claim 18, the terminal unit controller being programmed to allow the input device to receive the continuation ticket and to read player selection indicia on the continuation ticket, wherein the player selection indicia on the continuation ticket corresponds to a second dynamic lottery game selection for the player, the terminal unit controller being programmed to determine a second outcome of the dynamic lottery game in response to the reading of the second player selection indicia by the input device, the second outcome being determined based on the second player selection indicia, the terminal unit controller being programmed to cause the output device to dispense a second continuation ticket to the player, the second continuation ticket having indicia disposed thereon corresponding to the second outcome of the dynamic lottery game for the player, the terminal unit controller being programmed to allow the input device to receive the second continuation ticket and to read the indicia corresponding to the second outcome of the dynamic lottery game for the player, the terminal unit controller being programmed to determine whether the second outcome of the dynamic lottery game is a winning outcome based on the indicia corresponding to the second outcome of the dynamic lottery game for the player, and the terminal unit controller being programmed to cause the value-dispensing mechanism to dispense value to the player in response to the terminal unit controller determining that the second outcome of the dynamic lottery game for the player is a winning outcome.

20. A terminal unit for conducting a dynamic lottery game in accordance with claim 18, the terminal unit controller being programmed to allow the input device to receive the dynamic lottery game ticket a second time and to read player selection indicia on the dynamic lottery game ticket, the terminal unit controller being programmed to determine a second outcome of the dynamic lottery game in response to the second reading of the player selection indicia by the input device, the outcome being determined based on the player selection indicia, the terminal unit controller being programmed to cause the output device to dispense a second continuation ticket to the player, the second continuation ticket having indicia disposed thereon corresponding to the second outcome of the dynamic lottery game for the player, the terminal unit controller being programmed to allow the input device to receive the second continuation ticket and to read the indicia corresponding to the second outcome of the dynamic lottery game for the player, the terminal unit controller being programmed to determine whether the second outcome of the dynamic lottery game is a winning outcome based on the indicia corresponding to the second outcome of the dynamic lottery game for the player, and the terminal unit controller being programmed to cause the value-dispensing mechanism to dispense value to the player in response to the terminal unit controller determining that the second outcome of the dynamic lottery game for the player is a winning outcome.

21. A terminal unit for conducting a dynamic lottery game in accordance with claim 18, the terminal unit controller being programmed to allow the player to enter a base lottery game entry at input device, the terminal unit controller being programmed to allow the player to enter a base lottery game wager at the currency-accepting mechanism, and the terminal unit controller being programmed to cause the output device to dispense the dynamic lottery game ticket to the player, wherein the dynamic lottery game ticket has indicia disposed thereon corresponding to the entry in the base lottery game.

22. A terminal unit for conducting a dynamic lottery game in accordance with claim 21, the terminal unit controller being programmed to allow the input device to read the indicia corresponding to the entry in the base lottery game on the dynamic lottery ticket, the terminal unit controller being programmed to determine whether the entry for the base lottery game is a winning entry in response to the dynamic lottery ticket being received and read by the input device, and the terminal unit controller being programmed to cause the value-dispensing mechanism to dispense value to the player in response to the terminal unit controller determining that the entry for the base lottery game is a winning entry.

23. A terminal unit for conducting a dynamic lottery game in accordance with claim 21, the terminal unit controller being programmed to cause the output device to dispense the continuation ticket to the player, wherein the continuation ticket has indicia disposed thereon corresponding to the entry in the base lottery game, the terminal unit controller being programmed to determine whether the entry for the base lottery game is a winning entry in response to the continuation ticket being received and read by the second input device, and the terminal unit controller being programmed to cause the value-dispensing mechanism to dispense value to the player in response to the terminal unit controller determining that the entry for the base lottery game is a winning entry.

24. A terminal unit for conducting a dynamic lottery game in accordance with claim 21, wherein a winning outcome for the dynamic lottery game corresponds to a multiplier value to be applied to a prize amount for a winning entry for the base lottery game, the terminal unit controller being programmed to multiply the prize amount for the winning entry for the base lottery game by any multiplier value for a winning entry for the dynamic lottery game to determine a total base lottery game prize amount in response to determining that the entry in the base lottery game and the entry in the dynamic lottery game are winning entries, and the terminal unit controller being programmed to cause the value-dispensing mechanism to dispense value to the player corresponding to the total base lottery, game prize amount in response to determining that the entry in the base lottery game and the entry in the dynamic lottery game are winning entries.

25. A terminal unit for conducting a dynamic lottery game in accordance with claim 18, wherein the input device comprises a first device for inputting a plurality of input selections and a second device that is capable of reading encoded information disposed on a substrate material, the terminal unit controller being programmed to allow a request for a player to enter the dynamic lottery game to be input at the first device, the terminal unit controller being programmed to allow the second device to receive the dynamic lottery game ticket and to read player selection indicia on the dynamic lottery game ticket, and the terminal unit controller being programmed to allow the second device to receive the continuation ticket and to read the indicia corresponding to the outcome of the dynamic lottery game for the player.

26. A terminal unit for conducting a dynamic lottery game in accordance with claim 18, the terminal unit controller being programmed to allow a request for a player to enter the dynamic lottery game to be input at the input device, wherein the opening entry for the player for the dynamic lottery game is determined in response to the input of the request at the input device.

27. A gaming system for conducting a dynamic betting game corresponding to the occurrence of a sporting event, the gaming system comprising:

a plurality of terminal units, each of the terminal units comprising:

an input device for inputting a plurality of input selections, the input device being capable of reading encoded information disposed on a substrate material;

a terminal unit memory device;

a currency-accepting mechanism that is capable of allowing a player to deposit a medium of currency;

a value-dispensing mechanism that is capable of dispensing value to the player;

an output device; and a terminal unit controller operatively coupled to the input device, the terminal unit memory device, the currency-accepting mechanism, the value-dispensing mechanism, and the output device; and:

a host computer operatively coupled to the plurality of terminal units, the host computer comprising;

a host input device;

a host computer memory device; and a host computer controller operatively coupled to the host input device and the host computer memory device, one of the terminal unit controller and the host computer controller being programmed to allow the entry of current information for the occurrence of the sporting event at a corresponding one of the terminal input device and the host input device, and to store the current information at least one of the terminal unit memory device and the host computer memory device, the terminal unit controller being programmed to cause the output device to dispense a dynamic bet slip to the player, the dynamic bet slip having indicia disposed thereon corresponding to the current information for the occurrence of the sporting event stored at the at least one of the terminal unit memory device and the host computer memory device, the terminal unit controller being programmed to allow the terminal input device to receive the dynamic bet slip and to read player selection indicia on the dynamic bet slip, wherein the player selection indicia on the dynamic bet slip corresponds to the player's entry for the dynamic betting game for the occurrence of the sporting event, the terminal unit controller being programmed to allow the currency-accepting mechanism to receive a wager from the player corresponding to the player's entry for the dynamic betting game for the occurrence of the sporting event, the terminal unit controller being programmed to cause the output device to dispense a continuation ticket to the player, the continuation ticket having indicia disposed thereon corresponding to the player's entry for the dynamic betting game for the occurrence of the sporting event, one of the terminal unit controller and the host computer controller being programmed to allow the entry of outcome information for the occurrence of the sporting event at a corresponding one of the terminal input device and the host input device, and to store the outcome information at least one of the terminal unit memory device and the host computer memory device, the terminal unit controller being programmed to allow the input device to receive the continuation ticket and to read the indicia corresponding to the player's entry for the dynamic betting game for the occurrence of the sporting event, one of the terminal unit controller and the host computer controller being programmed to determine whether the player's entry for the dynamic betting game for the occurrence of the sporting event is a winning entry based on a comparison of the player's entry to the outcome information for the occurrence of the sporting event, and the terminal unit controller being programmed to cause the value-dispensing mechanism to dispense value to the player in response to the one of the terminal unit controller and the host computer controller determining that the player's entry for the dynamic betting game is a winning entry.

28. A gaming system for conducting a dynamic betting game corresponding to an occurrence of a sporting event in accordance with claim 27, the terminal unit controller being programmed to allow the player to enter a base lottery game entry at the input device, the terminal unit controller being programmed to allow the player to enter a base lottery game wager at the currency-accepting mechanism, the terminal unit controller being programmed to cause the output device to dispense the dynamic bet slip to the player, wherein the dynamic bet slip has indicia disposed thereon corresponding to the entry in the base lottery game.

29. A gaming system for conducting a dynamic betting game corresponding to an occurrence of a sporting event in accordance with claim 28, the terminal unit controller being programmed to allow the input device to read the indicia corresponding to the entry in the base lottery game on the dynamic bet slip, one of the terminal unit controller and the host computer controller being programmed to determine whether the entry for the base lottery game is a winning entry in response to the dynamic bet slip being received and read by the second input device, and the terminal unit controller being programmed to cause the value-dispensing mechanism to dispense value to the player in response to the one of the terminal unit controller and the host computer controller determining that the entry for the base lottery game is a winning entry.

30. A gaming system for conducting a dynamic betting game corresponding to an occurrence of a sporting event in accordance with claim 28, the terminal unit controller being programmed to cause the output device to dispense the continuation ticket to the player, wherein the continuation ticket has indicia disposed thereon corresponding to the entry in the base lottery game, one of the terminal unit controller and the host computer controller being programmed to determine whether the entry for the base lottery game is a winning entry in response to the continuation ticket being received and read by the input device, and the terminal unit controller being programmed to cause the value-dispensing mechanism to dispense value to the player in response to the one of the terminal unit controller and the host computer controller determining that the entry for the base lottery game is a winning entry.

31. A gaming system for conducting a dynamic betting game corresponding to an occurrence of a sporting event in accordance with claim 28, wherein a winning outcome for the dynamic betting game corresponds to a multiplier value to be applied to a prize amount for a winning entry for the base lottery game, the terminal unit controller being programmed to multiply the prize amount for the winning entry for the base lottery game by any multiplier value for a winning entry for the dynamic betting game to determine a total base lottery game prize amount in response to determining that the entry in the base lottery game and the entry in the dynamic betting game are winning entries, and the terminal unit controller being programmed to cause the value-dispensing mechanism to dispense value to the player corresponding to the total base lottery game prize amount in response to determining that the entry in the base lottery game and the entry in the dynamic betting game are winning entries.

32. A gaming system for conducting a dynamic betting game corresponding to an occurrence of a sporting event in accordance with claim 28, wherein the input device comprises a first device for inputting a plurality of input selections and a second device that is capable of reading encoded information disposed on a substrate material, the terminal unit controller being programmed to allow a request for a player to enter the dynamic betting game to be input at the first device, the terminal unit controller being programmed to allow the second device to receive the dynamic bet slip and to read player selection indicia, on the dynamic bet slip, and the terminal unit controller being programmed to allow the second device to receive the continuation ticket and to read the indicia corresponding to the player's entry for the occurrence of the sporting event.

33. A gaming system for conducting a dynamic betting game corresponding to an occurrence of a sporting event in accordance with claim 27, the terminal unit controller being programmed to allow a request for a player to enter the dynamic betting game for the occurrence of the sporting event to be input at the input device.

34. A method for conducting a dynamic betting game corresponding to the occurrence of a sporting event, comprising:

storing current information for the occurrence of the sporting event at a computer memory device;

dispensing a dynamic bet slip to a player, the dynamic bet slip having indicia disposed thereon corresponding to the current information for the occurrence of the sporting event stored at the computer memory device;

reading player selection indicia on the dynamic bet slip, wherein the player selection indicia on the dynamic bet slip corresponds to the player's entry for the dynamic betting game for the occurrence of the sporting event;

receiving a wager from the player corresponding to the player's entry for the dynamic betting game for the occurrence of the sporting event;

dispensing a continuation ticket to the player, the continuation ticket having indicia disposed thereon corresponding to the player's entry for the dynamic betting game for the occurrence of the sporting event;

storing outcome information for the occurrence of the sporting event at a computer memory device;

reading the indicia on the continuation ticket corresponding to the player's entry for the dynamic betting game for the occurrence of the sporting event;

determining whether the player's entry for the dynamic betting game for the occurrence of the sporting event is a winning entry based on a comparison of the player's, entry to the outcome information for the occurrence of the sporting event; and dispensing value to the player in response to determining that the player's entry for the dynamic betting game is a winning entry.

35. A method for conducting a dynamic betting game corresponding to an occurrence of a sporting event in accordance with claim 34, comprising:

receiving an entry for the player for a base lottery game;

receiving a wager for the player for the base lottery game; and dispensing the dynamic bet slip to the player, wherein the dynamic bet slip has indicia disposed thereon corresponding to the entry in the base lottery game.

36. A method for conducting a dynamic betting game corresponding to an occurrence of a sporting event in accordance with claim 35, comprising:

reading the indicia corresponding to the entry in the base lottery game on the dynamic bet slip;

determining whether the entry for the base lottery game is a winning entry; and dispensing value to the player in response to determining that the entry for the base lottery game is a winning entry.

37. A method for conducting a dynamic betting game corresponding to an occurrence of a sporting event in accordance with claim 35, comprising:

dispensing the continuation ticket to the player, wherein the continuation ticket has indicia disposed thereon corresponding to the entry in the base lottery game;

determining whether the entry for the base lottery game is a winning entry; and dispensing value to the player in response to determining that the entry for the base lottery game is a winning entry.

38. A method for conducting a dynamic betting game corresponding to an occurrence of a sporting event in accordance with claim 35, wherein a winning outcome for the dynamic betting game corresponds to a multiplier value to be applied to a prize amount for a winning entry for the base lottery game, the method comprising:

determining total base lottery game prize amount by multiply the prize amount for the winning entry for the base lottery game by any multiplier value for a winning entry for the dynamic betting game in response to determining that the entry in the base lottery game and the entry in the dynamic betting game are winning entries; and dispensing value to the player corresponding to the total base lottery game prize amount in response to determining that the entry in the base lottery game and the entry in the dynamic betting game are winning entries.

39. A method for conducting a dynamic betting game corresponding to an occurrence of a sporting event in accordance with claim 34, comprising receiving a request for a player to enter the dynamic betting game for the occurrence of the sporting event to be input at the input device.

40. A terminal unit for conducting a dynamic betting game corresponding to the occurrence of a sporting event, the terminal unit comprising:

an input device for inputting a plurality of input selections, the input device being capable of reading encoded information disposed on a substrate material;

a terminal unit memory device;

a currency-accepting mechanism that is capable of allowing a player to deposit a medium of currency;

a value-dispensing mechanism that is capable of dispensing value to the player;

an output device; and a terminal unit controller operatively coupled to the input device, the terminal unit memory device, the currency-accepting mechanism, the value-dispensing mechanism, and the output device, the terminal unit controller being programmed to allow the entry of current information for the occurrence of the sporting event at the terminal input device, and to store the current information at the terminal unit memory device, the terminal unit controller being programmed to cause the output device to dispense a dynamic bet slip to the player, the dynamic bet slip having indicia disposed thereon corresponding to the current information for the occurrence of the sporting event stored at the terminal unit memory device, the terminal unit controller being programmed to allow the terminal input device to receive the dynamic bet slip and to read player selection indicia on the dynamic bet slip, wherein the player selection indicia on the dynamic bet slip corresponds to the player's entry for the dynamic betting game for the occurrence of the sporting event, the terminal unit controller being programmed to allow the currency-accepting mechanism to receive a wager from the player corresponding to the player's entry for the dynamic betting game for the occurrence of the sporting event, the terminal unit controller being programmed to cause the output device to dispense a continuation ticket to the player, the continuation ticket having indicia disposed thereon corresponding to the player's entry for the dynamic betting game for the occurrence of the sporting event, the terminal unit controller being programmed to allow the entry of outcome information for the occurrence of the sporting event at the terminal input device, and to store the outcome information at the terminal unit memory device, the terminal unit controller being programmed to allow the input device to receive the continuation ticket and to read the indicia corresponding to the player's entry for the dynamic betting game for the occurrence of the sporting event, the terminal unit controller being programmed to determine whether the player's entry for the dynamic betting game for the occurrence of, the sporting event is a winning entry based on a comparison of the player's entry to the outcome information for the occurrence of the sporting event, and the terminal unit controller being programmed to cause the value-dispensing mechanism to dispense value to the player in response to the terminal unit controller determining that the player's entry for the dynamic betting game is a winning entry.

41. A terminal unit for conducting a dynamic betting game corresponding to an occurrence of a sporting event in accordance with claim 40, the terminal unit controller being programmed to allow the player to enter a base lottery game entry at the input device, the terminal unit controller being programmed to allow the player to enter a base lottery game wager at the currency-accepting mechanism, the terminal unit controller being programmed to cause the output device to dispense the dynamic bet slip to the player, wherein the dynamic bet slip has indicia disposed thereon corresponding to the entry in the base lottery game.

42. A terminal unit for conducting a dynamic betting game corresponding to an occurrence of a sporting event in accordance with claim 41, the terminal unit controller being programmed to allow the input device to read the indicia corresponding to the entry in the base lottery game on the dynamic bet slip, the terminal unit controller and being programmed to determine whether the entry for the base lottery game is a winning entry in response to the dynamic bet slip being received and read by the second input device, and the terminal unit controller being programmed to cause the value-dispensing mechanism to dispense value to the player in response to the terminal unit controller determining that the entry for the base lottery game is a winning entry.

43. A terminal unit for conducting a dynamic betting game corresponding to an occurrence of a sporting event in accordance with claim 41, the terminal unit controller being programmed to cause the output device to dispense the continuation ticket to the player, wherein the continuation ticket has indicia disposed thereon corresponding to the entry in the base lottery game, the terminal unit controller being programmed to determine whether the entry for the base lottery game is a winning entry in response to the continuation ticket being received and read by the input device, and the terminal unit controller being programmed to cause the value-dispensing mechanism to dispense value to the player in response to: the terminal unit controller determining that the entry for the base lottery game is a winning entry.

44. A terminal unit for conducting a dynamic betting game corresponding to an occurrence of a sporting event in accordance with claim 41, wherein a winning outcome for the dynamic betting game corresponds to a multiplier value to be applied to a prize amount for a winning entry for the base lottery game, the terminal unit controller being programmed to multiply the prize amount for the winning entry for the base lottery game by any multiplier value for a winning entry for the dynamic betting game to determine a total base lottery game prize amount in response to determining that the entry in the base lottery game and the entry in the dynamic betting game are winning entries, and the terminal unit controller being programmed to cause the value-dispensing mechanism to dispense value to the player corresponding to the total base lottery game prize amount in response to determining that the entry in the base lottery game and the entry in the dynamic betting game are winning entries.

45. A terminal unit for conducting a dynamic betting game corresponding to an occurrence of a sporting event in accordance with claim 41, wherein the input device comprises a first device for inputting a plurality of input selections and a second device that is capable of reading encoded information disposed on a substrate material, the terminal unit controller being programmed to allow a request for a player to enter the dynamic betting game to be input at the first device, the terminal unit controller being programmed to allow the second device to receive the dynamic bet slip and to read player selection indicia on the dynamic bet slip, and the terminal unit controller being programmed to allow the second device to receive the continuation ticket and to read the indicia corresponding to the player's entry for the occurrence of the sporting event.

46. A terminal unit for conducting a dynamic betting game corresponding to an occurrence of a sporting event in accordance with claim 40, the terminal unit controller being programmed to allow a request for a player to enter the dynamic betting game for the occurrence of the sporting event to be input at the input device.

* * * * *